US011676366B1

(12) United States Patent
Cooke et al.

(10) Patent No.: US 11,676,366 B1
(45) Date of Patent: Jun. 13, 2023

(54) METHODS TO DETECT IMAGE FEATURES FROM VARIABLY-ILLUMINATED IMAGES

(71) Applicant: Ramona Optics Inc., Durham, NC (US)

(72) Inventors: Colin Cooke, Durham, NC (US); Jaehee Park, Durham, NC (US); Mark Harfouche, Durham, NC (US)

(73) Assignee: Ramona Optics Inc., Durham, NC (US)

( * ) Notice: Subject to any disclaimer, the term of this patent is extended or adjusted under 35 U.S.C. 154(b) by 242 days.

(21) Appl. No.: 17/092,177

(22) Filed: Nov. 6, 2020

Related U.S. Application Data

(60) Provisional application No. 62/931,717, filed on Nov. 6, 2019.

(51) Int. Cl.
| | |
|---|---|
| *G06V 10/60* | (2022.01) |
| *G02B 21/36* | (2006.01) |
| *G06V 10/44* | (2022.01) |
| *G06V 10/46* | (2022.01) |
| *G06F 18/23213* | (2023.01) |

(52) U.S. Cl.
CPC .......... *G06V 10/60* (2022.01); *G02B 21/367* (2013.01); *G06F 18/23213* (2023.01); *G06V 10/443* (2022.01); *G06V 10/462* (2022.01)

(58) Field of Classification Search
CPC .... G06V 10/60; G06V 10/462; G06V 10/433; G06V 10/443; G06K 9/6223; G02B 21/367; G06F 18/23213
See application file for complete search history.

(56) References Cited

U.S. PATENT DOCUMENTS

| | | | |
|---|---|---|---|
| 2020/0285037 A1* | 9/2020 | Horstmeyer | ....... H04N 5/23229 |
| 2022/0043251 A1* | 2/2022 | Moore | ................. G02B 27/58 |

FOREIGN PATENT DOCUMENTS

WO   WO-2017172819 A1 * 10/2017 ......... G01B 11/2545

* cited by examiner

*Primary Examiner* — Casey L Kretzer
(74) *Attorney, Agent, or Firm* — patent2ip LLC; Tue Nguyen

(57) ABSTRACT

Image features are extracted from multiple variably-illuminated images, with the images acquired from a multi-camera array microscope. A sequence of images per camera is captured, with the illumination pattern varied between each image capture. After image capture, a post-processing algorithm finds keypoints of interest within the images captured by each camera. These features can be used to assist with stitching together images from the multi-camera array, in addition to image compression, object tracking or other automated tasks.

20 Claims, 22 Drawing Sheets

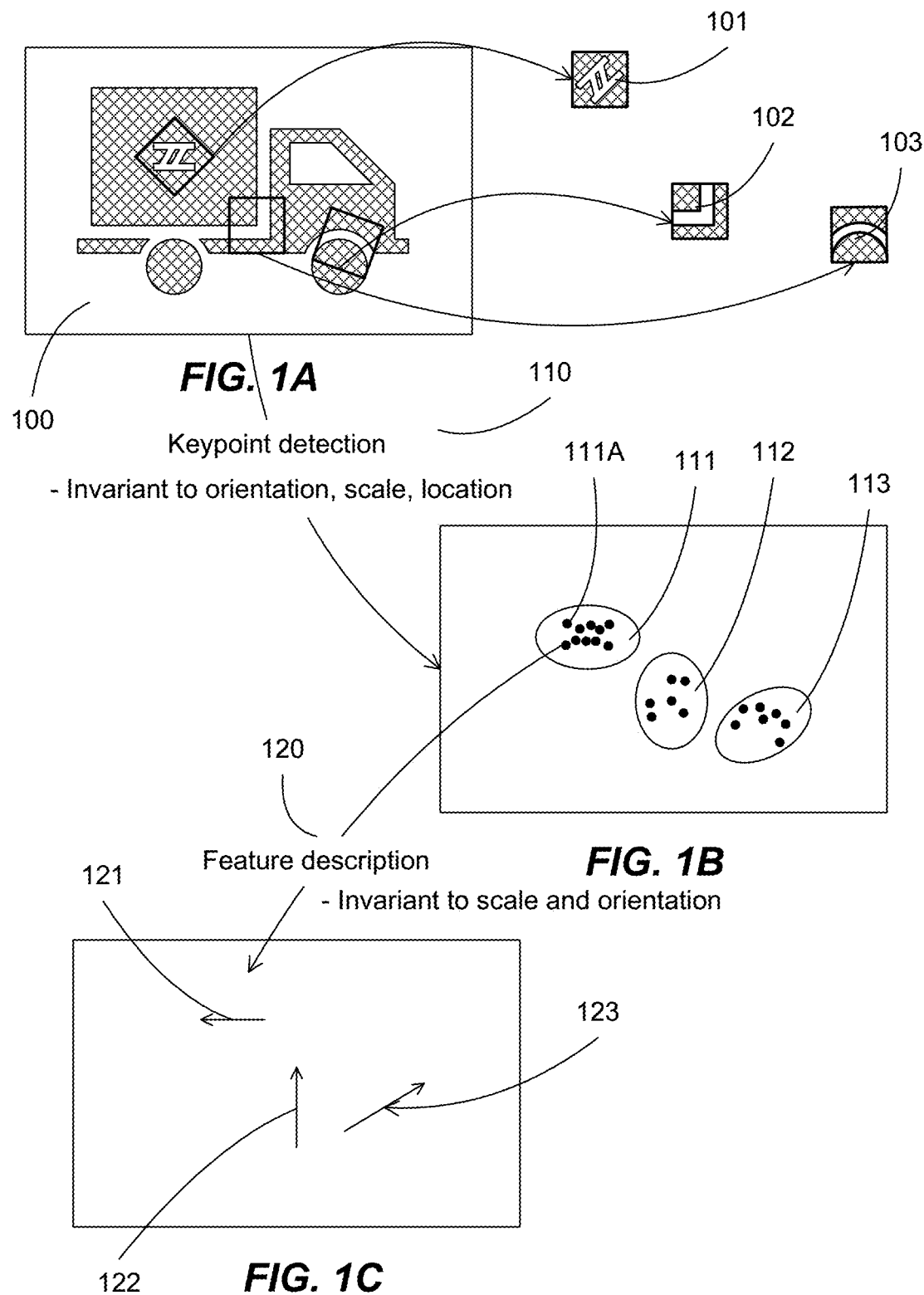

Pruning sets of feature descriptors having a number of descriptors less than a threshold value
1300

FIG. 13A

Generating feature descriptors for the keypoints of each set of keypoints
1320

Optionally pruning sets of feature descriptors according to a distance threshold value and based on a distance metric of a Hamming distance for binary descriptors or an L2 norm for continuous descriptors
1330

Optionally pruning sets of feature descriptors according to a number threshold value
1340

Synthesizing feature descriptors for each set of feature descriptors using a synthesizing process based on a Hamming distance for binary descriptors or an L2 norm for continuous descriptors
1350

FIG. 13B

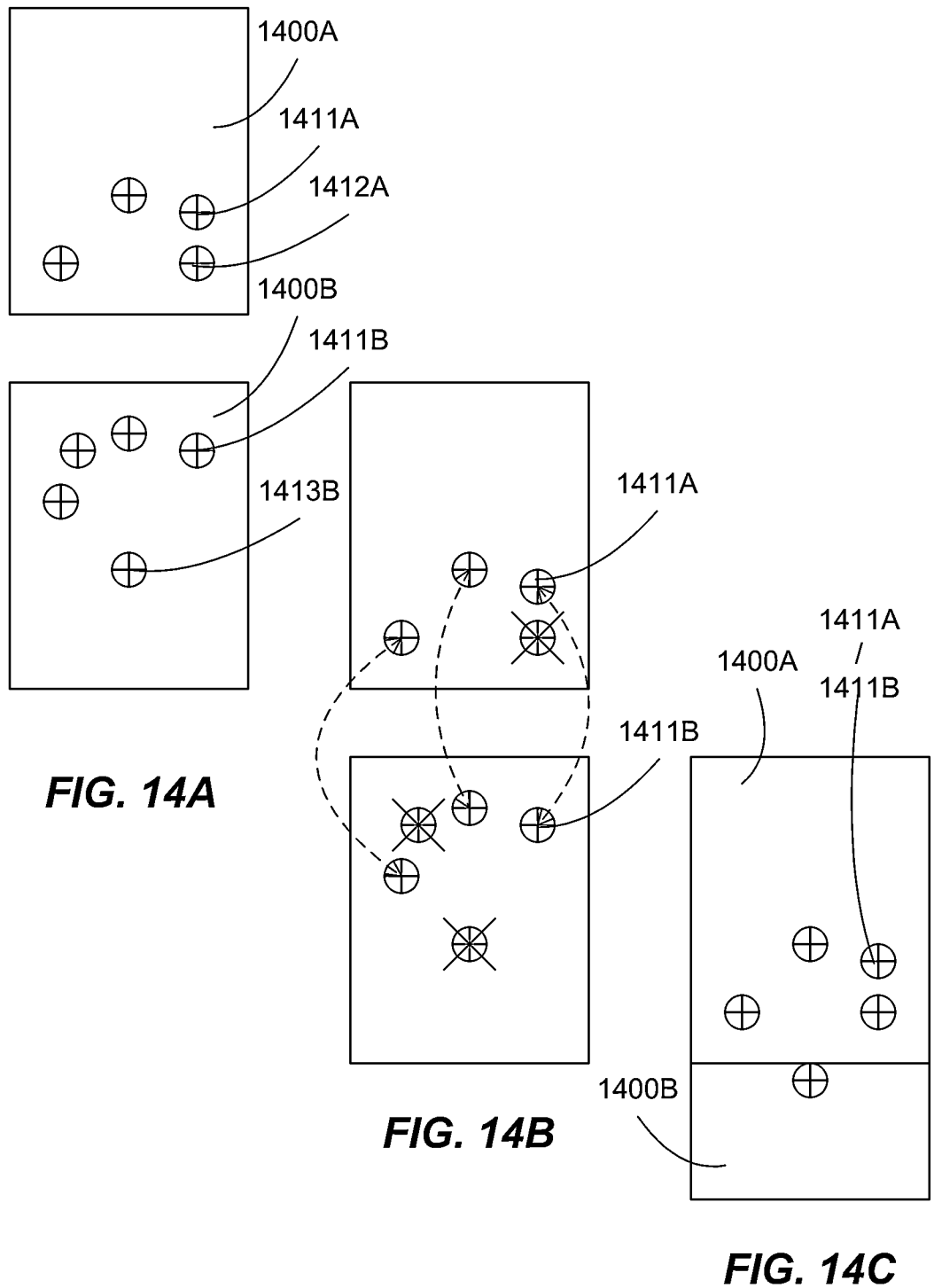

METHODS TO DETECT IMAGE FEATURES FROM VARIABLY-ILLUMINATED IMAGES

The present patent application claims priority from U.S. Provisional Patent Applicant Ser. No. 62/931,717, filed on Nov. 6, 2019, entitled "A method to detect image feature from variably-illuminated images", of the same inventors, hereby incorporated by reference in its entirety.

BACKGROUND OF THE INVENTION

Feature extraction is a fundamental step in automated image analysis and provides the underpinnings for many advanced computer vision applications. The process of feature extraction can be split into two connected steps: keypoint detection and feature description. When used together, these two steps can accurately identify salient content within large image datasets to assist with data reduction, image stitching and object tracking, among other common post-processing tasks.

As the first step of feature extraction, keypoint detection looks for areas of an image that contain high amounts of information that are likely to contain objects or features of interest. Once such an area has been identified, this image area, which consists of more than one image pixel, is described using a feature description algorithm to form a feature descriptor. Example feature description algorithms include SIFT, ORB, BRIEF, FAST, and LIFT. Existing feature description algorithms focus mostly describing image areas within natural images, taken outdoors or within open spaces, and are not often used in microscopy. As such, feature description algorithms often focus on being robust across multiple viewpoints and natural lighting changes—that is, changes that are happening due to naturally changing events that one does not have control over, which is common in outdoor/open-space photographs. Common methods to improve robustness in feature description algorithms include repeatedly smoothing images to encourage illumination invariance, performing spatial clustering, looking at multiple frames within a video to improve feature extraction, and using Gaussian pyramids to try to identify scale and illumination invariant features. There are also approaches to improve robustness with respect to image noise. Abstractly, a feature descriptor should be robust across these types of uncontrolled changes within the scene, as well as other possible degrees of freedom or variations of the objects of interest themselves, such as motion and occlusion.

SUMMARY OF THE EMBODIMENTS

In some embodiments, the present invention discloses a method for extracting image features from multiple variably-illuminated images. The illumination patterns can be controlled to improve the extraction of features, such as to provide features which are illumination-invariant.

The method can include detecting keypoints in a set of images, with the set of images including images captured under different illumination patterns using a same camera having a same view on a same substrate area. The keypoint detection process can use a corner response function or a blob response function, applying on each image in the set of image to identify the keypoints, such as identifying the spatial locations of the keypoints.

The detected keypoints can be grouped into multiple sets of keypoints, with the keypoints in a set of keypoints having same spatial locations. Thus, each keypoint in a set of keypoints are detected from a different image in the set of images.

The multiple sets of keypoints can be pruned to remove sets of keypoints that are not illumination invariant. For example, if a set of the keypoints having too few keypoint members, this indicates that the set of keypoints contains illumination specific keypoints, namely keypoints that can only be detected under specific illumination patterns. Thus, the set of keypoints can be pruned from the multiple sets of keypoints. After the pruning process, the pruned sets of keypoints can be more robust with regard to illumination changes.

Each image area represented by a keypoint in a pruned set of keypoints can be described, by a feature description process, to form a feature descriptor. A feature descriptor can include scale and orientation information, together with the location of the keypoint image area. For example, orientation of a keypoint can be calculated by image gradients within the keypoint image area. The pruned sets of keypoints thus can be described to form multiple sets of feature descriptors, with each feature descriptor corresponded to a keypoint in the pruned sets of keypoints, and with each set of feature descriptors corresponded to a pruned set of keypoints.

The multiple sets of feature descriptors can be optionally pruned, for example, to remove sets of feature descriptors that are not illumination invariant. The optional pruning process can include two steps. In a first step, the feature descriptors in a set of feature descriptors can be clustered according to a distance metric, and the feature descriptors separated from other feature descriptors at a distance larger than a distance threshold value can be removed from the set of feature descriptors.

In a second step, if a set of the feature descriptors having too few descriptor members, the set of feature descriptors can be pruned from the multiple sets of feature descriptors. After the pruning process, the pruned sets of feature descriptors can be more robust.

The multiple sets of feature descriptors, or optionally, the multiple pruned sets of feature descriptors, can be synthesized to form multiple synthesized feature descriptors. The synthesizing process can be an average process, with consideration for constraints or limits of the feature descriptors. The features in the set of multiple variably-illuminated images are then represented by the synthesized feature descriptors.

In some embodiments, the present invention discloses a method, and a microscope system using the method, to operate a microscope system using a feature extraction process from multiple variably-illuminated images.

A microscope can include a camera array having multiple cameras, with each camera configured to capture images of a different area of a sample. The cameras can also be configured so that an area having the images captured by a camera is partially overlapped with one or more areas having the images captured by other cameras. The microscope can also include an illumination source having multiple light sources, with the illumination source configured to provide multiple illumination patterns to the sample, by activating the light sources in different configurations.

The microscope can include a controller configured to activating the illumination source and the camera array to capture images of the sample under multiple illumination patterns. The images can be grouped into multiple sets of images, with each set of images having images of a different area of the sample captured by a different camera, and with each image of a set of images is captured under a different illumination pattern.

The controller can also be configured to extract features from the sets of images, and to synthesize synthesized feature descriptors for the features that are robust under illumination changes.

The controller can also be configured to fuse images in each set of images taken by a camera, and then stitch the fused images into a final image.

BRIEF DESCRIPTION OF THE DRAWINGS

FIG. 1A-1C illustrate a feature extraction process in computer vision applications.

FIG. 13A-13B illustrate flow charts for forming feature descriptors according to some embodiments.

FIGS. 14A-14C illustrate a stitching process for two images according to some embodiments.

DETAILED DESCRIPTION OF THE EMBODIMENTS

Figures 2A, 2B, 2C, 2D:
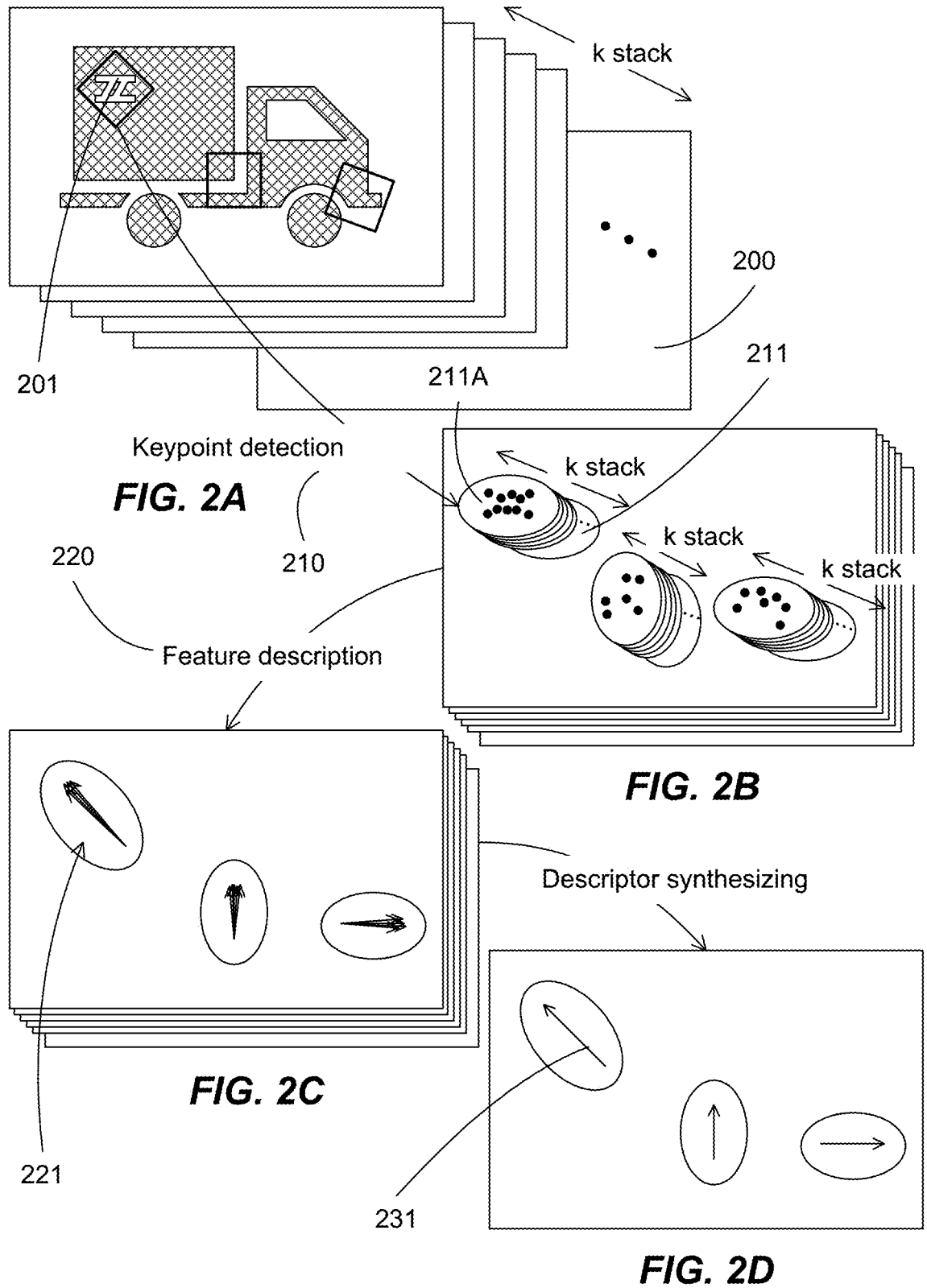
FIGS. 2A-2D illustrate a process to extract features to form synthesize feature descriptors according to some embodiments.

In some embodiments, the present invention discloses methods for extracting image features from variably-illuminated images. For example, a camera can capture a sequence of images of the substrate area under different illumination patterns, e.g., with the illumination pattern varied between each image capture. The sets of corresponding image features from the sequence of images, e.g., the same image features detected in the image sequence, can be processed, such as clustering and pruning, to produce synthesized feature descriptions for each set of corresponding image features. The resulting synthesized feature descriptions, which, as a resulting of obtaining under variable illumination conditions, together with proper clustering and pruning to eliminate illumination specific outliers, is proven to be invariant across lighting conditions.

The synthesized feature descriptions can be used for image stitching, image compression, object tracking or a wide variety of other automated tasks. Further, the synthesized feature descriptions can be used to assist with stitching images from multiple micro-cameras to form an image composite in a computational microscope known as a micro-camera array microscope (MCAM).

The feature extraction process can be well suited for imaging small specimens with a microscope, which can provide the unique ability to control many possible degrees of freedom that effect image formation. Example degrees of freedom within the microscope include the optical imaging pathway, the sample illumination, and sample position, which are highly controllable. The present feature extraction process can have significant advantages over widely employed prior art feature extractors, since the prior art feature extractor were developed to account for unknown variations, such as in natural images, and thus are not ideal for many microscope imaging scenarios.

For example, the illumination angle and color is likely the most important degree of freedom that impacts specimen feature appearance, such as in bright-field microscopy. By slightly changing the incident illumination angle, a standard image can be converted into a phase-contrast-type image or a dark field image, where the intensity relationship between the specimen and background is completely reversed.

In some embodiments, the feature extraction process uses the microscope illumination configurations to improve the detection algorithms. For example, a set of images under variable illumination conditions that are carefully controlled, are acquired before processing the set of images jointly to extract features. The feature extraction process performed on a set of images under variable illumination configurations can be more robust and accurate than from performing feature extraction on just a single image.

FIG. 1A-1C illustrate a feature extraction process in computer vision applications. The feature extraction process includes a step of keypoint detection (FIG. 1A-FIG. 1B), followed by a step of feature description (FIG. 1B-FIG. 1C).

In the keypoint detection process, an image 100 can be processed to detect keypoints 101, 102, and 103. The keypoints 101-103 are locations in the image 100 that can allow identification even when the image is shifted, rotated, or enlarged, e.g., the keypoints are the locations on the image that are at least invariant to location, orientation, and scale.

A keypoint can include multiple pixels or points on the image. For example, area 101 can be processed to generate keypoint 111, which include multiple points 111A. Thus, the keypoint detection process produces locations of points of the keypoints.

After the detection of keypoints, e.g., finding locations of points on the image that are invariant to location, orientation, and scale, the keypoints are further processed to generate feature descriptors, which have descriptions of the features identified by the keypoints to allow identification of the features in other images. A feature descriptor is generally invariant to scale and orientation. For example, a feature descriptor 121, representing keypoint 111, can include orientation 121A, to allow matching with feature descriptor in another image through a rotation process.

Feature extraction is a reduction process in which a set of large data, such as an image, is reduced to a group of smaller data, such as a group of features. Feature extraction basically helps to get the best features from the large data set, effectively reducing the amount of data into features. These features are easy to process, and still able to describe the actual data set with high accuracy.

The features extraction process can be used to detect shaped, edges, or motion in a digital image or video. A general and basic approach to finding features is to first find unique keypoints, e.g., finding the locations of the most distinctive features, on each image. Then, the image areas around the keypoints are normalized to allow the computation of feature descriptors, e.g., calculating the scale and orientation, that describe the visual appearance of the keypoints. The feature descriptors in different images are then compared to match areas of the images.

As the first step of feature extraction, keypoint detection looks for areas of an image that contain high amounts of information that are likely to contain objects or features of interest. Once such an area has been identified, this image patch, which consists of more than one image pixel, is described to provide information about the image patch to allow subsequent processing, such as to compare with other areas for stitching.

A feature description algorithm can be used to describe the image patch, such as to calculate scale and orientation of the image patch so that the image patch can have location, scale and orientation, which can uniquely identify the image patch within the image.

In some embodiments, the present invention discloses a feature description algorithm suitable for imaging small specimens with a microscope with the unique ability to control many possible degrees of freedom that effect image formation. Example degrees of freedom within the microscope include the optical imaging pathway, the sample illumination, and sample position, for example. All of these degrees of freedom are highly controllable, leading to a better feature description algorithm.

In some embodiments, the feature description includes at least a controlled variation in sample illumination, for example, using multiple illumination patterns with each pattern resulting in an image of the sample. The multiple illumination patterns can improve many microscope imaging scenarios, for example, by at least eliminating the unknown variation of lighting in natural images. The multiple illumination patterns can offer improvements as compared to existing feature description algorithms, which focus mostly on describing patches within natural images, taken outdoors or within open spaces, and are not often without lighting controls, such as being robust across multiple viewpoints and broad uncontrollable lighting changes that is common in outdoor or open-space photographs.

The illumination-controlled feature description can be robust across multiple uncontrolled changes within the scene, as well as other possible degrees of freedom or variations of the objects of interest themselves, such as motion and occlusion. The illumination-controlled feature description can reduce the need for issue fixing corrections, such as repeatedly smoothing images to encourage illumination invariance, performing spatial clustering, looking at multiple frames within a video to improve feature extraction, using Gaussian pyramids to try to identify scale and illumination invariant features, and noise improvement.

With multiple illumination patterns, standard bright field images can be converted into phase-contrast type images or dark field images by having illumination patterns with different incident illumination angles, which can reverse the intensity relationship between the specimen and the background.

In some embodiments, the present invention discloses a method of illumination-controlled feature description, which includes a feature extraction from a stack of images with illumination configurations being the only variable. For example, the stack of images can include multiple images taken from a configuration involving a same substrate area and a same camera, with each image having a different pattern of illumination, such as front side illumination, back side illumination, head on illumination, side illumination, or any combination.

The keypoints detected from the feature extraction process in the stack of images can be pruned to remove noise, and then synthesized to form individual feature descriptors that correspond to the similarity for a particular feature. By pruning and synthesizing, the feature descriptors can be more robust and accurate, for example, than keypoints detected from just a single image. The method can also function as a test for illumination invariance of the keypoint detection function. Further, the illumination pattern can be optimized for robust and stable feature extraction, and different illumination patterns can be used for different classes of images.

In some embodiments, the illumination-controlled feature description can take advantage of the microscope illumination to improve feature detection algorithms. For example, a set of images can be acquired under variable illumination conditions that are carefully controlled via a programmable illumination system. This set of images is processed jointly to perform feature extraction in a more robust and accurate manner than from performing feature extraction on just a single image. In some embodiments, the illumination-controlled feature description process can be used in computational microscopes such as micro-camera array microscopes (MCAM). An MCAM can include an array of cameras focused on a large sample under the illumination of an array of light sources such as LEDs. A controller can be used to control the illumination system to provide different illumination patterns to the sample.

Each camera in the camera array can focus on a sample area, with overlapping areas with nearby cameras to allow for stitching. Each camera can acquire multiple images under different illumination conditions. Using the illumination-invariant features, the stitching process can be improved over the process of feature extraction from a single image under standard illumination. In addition, the illumination-invariant features can be used to help crop videos to specific regions-of-interest to reduce the amount of saved image data. Accordingly, high-quality detection and extraction of illumination-invariant features is a highly advantageous in this type of computational microscope design.

There are two aspects of feature extraction, which are keypoint detection and keypoint description. The detection of keypoints determines the stable keypoints in the image, e.g., the areas in the image that are invariant from image to image. The keypoints are characterized by their locations on the image. To assist in describing the keypoint, the corresponding scale and the appropriate neighborhood also need to be determined.

The description of a keypoint involves building a unique descriptor for each keypoint by describing it and its neighboring regions. The description has to be distinctive and invariant under various transformations, such as due to viewpoint change, rotation, scaling, and illumination change, to allow the matching of feature descriptors across multiple images. For example, a feature descriptor can include location, scale and orientation information of the keypoint, e.g., of the area in the image that will be served as a distinct feature for the image.

In an image, keypoints, which include interesting points on an object, can be extracted, e.g., detected and described, to provide a feature of the interesting points on the object. The feature, characterized by its description, can then be used to identify the object in the image or in another image. To perform reliable identification, the extracted features extracted should be recognizable under changes in image scale, image shifting, noise and illumination.

The keypoints are interesting in the sense that they can allow reliable recognition no matter how the image changes. Thus the keypoints should be found easily in an image that has been rotated, shrunk or expanded, shifted, or distorted. A keypoint detection process can determine the locations and optional scales of the keypoints with accurate localization, with invariance against shift, rotation, scale, brightness change, with high repeatability, and with robustness against noise, e.g., allowing estimation of the necessary transformation to align images.

After detecting the locations of the keypoints, the keypoints are then described, e.g., the characteristics of the keypoints, such as their scale and orientations, in addition to their locations, are formulated into the feature descriptors. In general, after the keypoints are detected, the keypoints contain information about their general characteristics, such as their locations, and sometimes their scale, e.g., their coverage area in the image. The general characteristics of the detected keypoints are not adequate to recognize or identify the keypoints, e.g., not adequate to distinguish the different keypoints.

Thus, additional information are described for the keypoints, to form feature descriptors, which provide keypoint orientation, e.g., the direction with the most changes in brightness intensity, or the distribution of the directions. The keypoint descriptors can also provide keypoint scale, e.g., a description to the areas in the image covered by the keypoints. In general, feature descriptors are primarily concerned with both the scale and the orientation of the keypoints.

The keypoint scale can be determined by decomposing the image into multiple scales, and then by checking for the interesting points of the keypoint at each scale, followed by combining all of the interesting points together. The scale of the keypoint relates to the scale at which the keypoint is detected.

The keypoint orientation can be determined based on the local gradients of the pixels around the keypoint area. The orientation can be calculated from the magnitude and orientation of the pixel gradients around the keypoint locations, or from the orientation histograms relating the pixel gradient magnitudes with the orientations. For example, a best orientation for each keypoint region can be calculated. Alternatively, histogram of local gradient directions at a selected scale can be generated, and major orientation directions can be assigned to the peaks of the gradient histogram. There can be one or more major orientation directions and one or more minor orientation directions.

The feature descriptors can be used for comparing keypoints in images taken from different cameras in the MCAM system. For example, in the microscope, camera 1 and camera 2 can have an overlapped area with one or more keypoints. From each camera, feature descriptors for the keypoints can be calculated and compared. If they are similar, the keypoints will be matched, the image coordinates associated with the feature descriptors are used for image stitching.

FIGS. 2A-2D illustrate a process to extract features to form synthesize feature descriptors according to some embodiments. Features can be detected as sets of corresponded keypoints 211 from in similar locations in a stack of images captured by a camera of a substrate area generated under multiple illumination patterns. The sets of keypoints 211 can be pruned to remove less robust keypoints. The pruned sets of keypoints can be described, for example, in a feature description process, to form feature descriptors 221. The sets of corresponded feature descriptors can be optionally pruned. Synthesized feature descriptors 231 can be synthesized from each set of feature descriptors. The synthesized feature descriptors are representative of the features, and can be much more robust against image transformation, such as due to illumination changes.

The feature extraction process from variably-illuminated images starts by capturing a k-stack of variably-illuminated images. A k-stack of images has k unique images, with each image captured from the same camera and viewpoint, but with each image taken under a different illumination configuration. In some embodiments, different illumination configurations can be provided by a programmable array of light sources, with different sets of one or more light sources activated to emit optical radiation to illuminate the sample for each captured image. The programmable light source array can include light sources that are at different positions above or below the sample, as well as light sources that emit different frequencies (i.e., colors) of radiation. The light sources can include light emitting diodes (LEDs), individual lasers, laser diodes, spatial light modulators or other electronically controllable light emission elements.

In FIG. 2A, a stack of images, such as k images 200 forming a k stack of images, can be obtained using a same camera setting on a same substrate area, but with different illumination patterns. For example, a first image can be captured with a direct light source, and a second image can be captured with an angled light source, with the light sources positioned in an illumination source having the individual light sources controlled by a controller, such as an illumination controller.

The process of feature extraction from the stack of images 200 first includes a detection step, which provides the identification of points in areas 201 within the images that may contain high-value information, called keypoints. The keypoints 211 can be generated by applying a keypoint detection response function to each image of the stack of images. Each keypoint 211 can include one or more points 211A in an image. For the majority of image classes, corners represent areas of high interest. Therefore, keypoint detection algorithms can use a corner response function, which is applied over the entire image to generate corner keypoints.

To find keypoint candidates within the variably illuminated k-stack of images, a response function such as a corner response function can be applied across the entire k-stack. For example, a corner response function in a keypoint detection process can be applied to a function representative of an image of the image stack 200. This application of the corner response function to each image of the k-stack will yield pixel coordinates, e.g., points in the image, that are likely the locations of corners in each image in the k-stack. The pixel points can be grouped, for example, by a statistical clustering process, to produce the keypoints 211, each with one or more pixel points 211A.

In FIG. 2B, the keypoint detection process 210 can generate one or more points 211A for an area of interest 201. The points 211A can be grouped, for example, by a statistic clustering process, to generate a keypoint 211. Multiple keypoints 211 can be detected in an image of the k stack 200.

Since the viewpoint for the images in the k-stack has not changed, e.g., the camera and the substrate area viewed by the camera are not moved during the capturing of the images in the k-stack, each keypoint in an image can have corresponding keypoints in other images in the k-stack. Thus, the detection process applied to the k-stack can produce multiple sets of keypoints, with each set of keypoints containing up to k corresponding keypoints across the k-stack of images, e.g., the number of keypoints in each set of keypoints is equal or less than the number of images in the k-stack of images. The reason that the number of keypoints in a particular set of keypoints can be less than the number of images in the k stack is that under certain illumination patterns, the keypoints might not be detected, for example, due to the lighting conditions of the illumination patterns.

As shown, there are 3 sets of keypoints, with each set of keypoints containing corresponding keypoints in the k stack, e.g., keypoints representing same features at same locations in the images of the k stack.

Since each feature of an image is represented by a set of k keypoints, this can allow the detected key-points to be clustered and pruned, using statistical clustering algorithms across the entire set of keypoints, to produce a more robust representation of the feature, e.g., a set of pruned keypoints. For example, each set of keypoints, which corresponds to a group of same keypoint features detected in the k-stack of images, can be pruned to remove keypoints that are not robust, such as not invariant against an image transformation, such as not invariant against illumination changes. In some embodiments, the keypoints in each set of keypoints can be first clustered, and the outliers, e.g., keypoints outside the cluster, can be removed as noise. Then the sets of keypoints having too few numbers of members can be pruned. The keypoint removal process can strengthen the invariant of the keypoints, for example, against the change in illumination patterns, for example, by removing the keypoints that are illumination specific, e.g., only occur at certain illumination patterns such as at certain images in the k-stack.

The clustering process can be group the keypoints in the set of keypoints according to a similarity metric, such as placing similar keypoints closer to each other and different keypoints further apart. In some embodiments, a criterion for a similarity metric for a cluster process includes at least a threshold number of the keypoints. For example, a clustering process for the sets of keypoints can cluster only keypoint sets having at least n keypoints in the cluster, with n less than k. This criterion can improve the robustness of the keypoints, since if a keypoint set is not present under a wide variety of illumination scenarios, e.g., occurring n times in k images, that particular keypoint set might not be reliably reconstructed, such as being detected by a different keypoint detector response function, being detected in another image, or being detected from a different camera.

In some embodiments, a keypoint can be detected if the keypoint has at least a number of pixel points in the keypoints. The keypoint detection function, when applied to an image, can yield multiple pixel points that meet the criteria of the keypoint detection function. For example, an edge detection function can find pixel points around the edges of objects in the image. The pixel points around a single edge can be clustered to form a keypoint, which represents the edge.

Thus, a clustering process can form a distribution of the sets of keypoints based on the number of keypoints in the sets. Keypoint sets having similar numbers of keypoints can be clustered near each other, while keypoints having a markedly different number of keypoints, typically a smaller number of keypoints due to different illumination conditions, can be spaced apart from other keypoint sets.

After clustering, a pruning process can be performed, to remove keypoint sets that are considered as noise. For example, keypoint sets having a number of keypoints less than a threshold value can be removed. The threshold value can be adjusted based on the criterion of similarity metric, such as adjusted until the remaining keypoint sets in the keypoint cluster is at least a predetermined number. The threshold value can be at least $n<k$ keypoints for the k-stack.

By pruning non-robust keypoint sets away, subsequent use of the keypoint sets for more accurate camera-to-camera correspondence within our MCAM device, for example, is made easier and the chances of an erroneous camera-to-camera correspondence can be reduced.

The pruning process can address the impact of illumination on a substrate surface, for example, depending on the substrate surface qualities. For a translucent substrates illuminated in transmissive mode, small variations in illumination can change how the elements within the substrate appear to the camera detectors. The same is true with opaque (i.e., semi-reflective) substrates illuminated in a reflection geometry. For opaque, non-scattering substrates, it is beneficial to place the individual illumination elements are placed above the sample. For these types of opaque substrates, the light not only impacts the substrate features, but also impacts the type of illumination artifacts. These illumination artifacts are unwanted and can trigger false positive pixel correspondence when an array of cameras is used. Due to the nonlinear relationship between the optical intensity that is detected, and the absorption and phase shifting nature of the sample as it interacts with the partially coherent radiation provided by the variable illumination, an iterative process can be used to predict which illumination patterns result in highlighted features and/or unwanted artifacts. Accordingly, in some embodiments, the feature extraction process with pruning characteristics can detect illumination patterns that result in few detected keypoints, e.g., illumination specific patterns, or result in many detected keypoints, e.g., invariant with illumination changes. The process can provide an algorithm for the computer to find features within the plurality of detected images via a modified keypoint extraction algorithm and feature description step.

In FIG. 2C, a feature description process 220 can be applied to the keypoints in the sets of keypoints 211. Feature descriptors 221 can be formed from the pruned keypoints 211, with each feature descriptor 221 corresponded to a keypoint 211 in an image. The feature descriptors 221 can be grouped into sets of feature descriptors, with each set of feature descriptors corresponded to a pruned set of keypoints. Thus, there can be a number of feature descriptor sets corresponded to same keypoint sets in the image stack.

For example, once a keypoint has been extracted, for example, by a detector response function, followed by being clustered and pruned, the image area at the keypoint location can be described, for example, via a compact numerical description process, to form a feature descriptor. The feature description process takes in an area of an image, centered at the keypoint pixel location and extending across more that one pixel, and returns a high dimensional vector which represents an encoding of the image area. The image area encoding can include at least the scale and orientation of the image area, which can allow matching of feature descriptors through scaling and rotational transformation. The vector is constructed such that it is invariant across common, naturalistic image transforms. These can include viewpoint change and naturalistic lighting changes.

The sets of feature descriptors can be optionally pruned. For example, the sets of feature descriptors can be clustered, and the outliers can be removed.

In some embodiments, a feature descriptor is created for each patch, e.g., area of an image represented by a keypoint, of each image of the k-stack of images. A set of feature descriptors can be created for a set of keypoints, meaning for all corresponded keypoints in the k-stack. Thus, the feature descriptors in the set of feature descriptors all describe a same feature in all images of the k-stack, with each feature descriptor describing the same feature in an image. For example, for the keypoint sets that are not pruned, then a set of keypoints can contain up to k keypoints, with each keypoint corresponded to a same feature in an image of the k-stack. After creating the feature descriptors, there are also up to k feature descriptors corresponded to the up to k keypoints, e.g., the set of feature descriptors contains a same number of feature descriptors as the set of keypoints.

Once the sets of feature descriptors, for example, in the form of high dimensional vector feature descriptors, have been constructed for all features in the images, an optional round of descriptor clustering and pruning can be done on the sets of feature descriptors.

The descriptor clustering process can test the illumination invariance of the descriptor algorithm through an observation that the descriptors form a tight cluster with each descriptor similar to other descriptors. For example, by comparing the descriptor vectors in a set of descriptors, which represent the feature at exact the same spatial location, but captured under various different lighting conditions, the cluster formation of the descriptors can be assessed. The comparison can be performed by computing a similarity metric between descriptors in the set of descriptors.

The descriptor pruning process can improve the illumination invariance of the descriptor algorithm by removing descriptors that are much different from other descriptors in the set of feature descriptors, for example, as outliers in a descriptor cluster. Then the sets of feature descriptors having few number of feature descriptors can also be pruned. While in theory, the feature descriptor process is designed to be invariant across lighting conditions, this invariance can breaks down, for example, for microscope images captured under variably-illuminated images. By generating a set of feature descriptors for each feature, with the number of feature descriptors in the set can be as large as practical, the set of feature descriptors, after being pruned, can robustly represent the feature, especially under illumination variations.

The descriptor process can form either a binary or a continuous vector for a feature. Different similarity metric can be used for different types of descriptor vectors, such as a Hamming distance metric for binary vectors, and an L2 norm metric for continuous vectors. The smaller the Hamming distance or the L2 norm, the more similar the vectors are. Thus, a threshold value can be set for the distance between feature descriptors in a set of feature descriptors. A feature descriptor having a distance larger than the threshold value with a representative feature descriptor, such as an average feature descriptor, can be discarded, e.g., pruned away. The representative feature descriptor can be iteratively chosen so that there is a large number of remaining feature descriptors. After being pruned, the sets of feature descriptors can be further pruned to remove sets of feature descriptors having two few members, e.g., too few descriptors in the sets due to a high number of removed descriptors.

In FIG. 2D, each set of feature descriptors can be synthesized to form a synthesized feature descriptor, which can be a representation of the feature. The synthesis process is dependent on the type of feature descriptor used, e.g., different synthesis process is used for binary descriptors and for continuous descriptors.

The goal of the feature synthesis process is to generate a single synthesized feature descriptor for each feature, e.g., for each set of image patches having the locations pointed to by the keypoints in a set of keypoints. In some embodiments, the feature synthesis process can be an average process, e.g., calculating an average feature descriptor for the feature descriptors in a set of feature descriptors. In some embodiments, the feature synthesis process can be a modified average process, e.g., calculating an average feature descriptor for the feature descriptors in a set of feature descriptors after considerations of any limitations and constraints of the descriptors. For example, if the descriptor vectors are constrained be binary vectors, the synthesis process is a modified average, such as a rounded average.

The average synthesized feature descriptor can allow feature matching between two sets of images by assuming each set of images as a single entity. For example, a first synthesized feature descriptor can be found on the first set of images, and a second synthesized feature descriptor can be found on the second set of images. If the two synthesized feature descriptors match, corresponding images in the first and second sets of images can be stitched together so that the two synthesized feature descriptors overlap each other. For example, the first image in the first set of images can be stitched with the first image of the second set of images at the location of the matched synthesized feature descriptors, regardless whether or not there is any found feature descriptor at the location of stitching.

In some embodiments, the feature synthesis process can be a concatenation process in which the feature descriptors in a set of feature descriptors are put together, e.g., concatenating the feature descriptors. The concatenation synthesized feature descriptor can be a set of feature descriptors, instead of a single feature descriptor. The concatenation can have weight factors for the concatenated feature descriptors. For example, if 5 feature descriptors are close to each other (as measured by a distance metric), this group of feature descriptors can have more weight than another group of feature descriptors that only has 3 close feature descriptors. For example, the concatenation process can include a distance metric histogram of the feature descriptors in the set of feature descriptors, with the weight factors proportional to the number of feature descriptors.

The concatenation synthesized feature descriptor can allow feature matching between two sets of images by assuming that each image in each set of images is a single entity. The concatenation synthesized feature descriptor can be viewed as a set of feature descriptors. For example, a first feature descriptor of the concatenation synthesized feature descriptor can be found on the first image of the first set of images. A second feature descriptor of the concatenation synthesized feature descriptor can be found on the first image of the second set of images. If the first feature descriptor matches with the second feature descriptor, the first image of the first set can be stitched with the first image of the second set, so that the first feature descriptor overlaps the second descriptor. In other words, two concatenation synthesized feature descriptors match when at least one feature descriptor member of the concatenation synthesized feature descriptors matches. The image matching for the two sets of images can be continued for the remaining images in the two sets.

For binary descriptor vectors, the similarity metric between the descriptor vectors can be the Hamming distance. The Hamming distance between two strings of equal length is the number of positions at which the corresponding symbols are different. For binary vectors, e.g., the symbols are either 0 or 1. The Hamming distance measures the minimum number of substitutions required to change one vector into the other vector, or the minimum distance that is needed to transform one vector into the other vector.

To measure the Hamming distance between two binary vectors, the number of bits that differ between the vectors can be counted. A hardware or software operation includes XOR the two vectors and then counts the number of 1 bits in the result. For a set of feature descriptors, the Hamming distance of the set can be the minimum distance between any pair of the feature descriptors in the set.

Let Z be the synthesized feature descriptor, and k the dimensionality of the descriptor space. For N descriptors, Z is the argument that minimizes the Hamming distance between Z and every descriptor.

$$Z = \underset{x \in \{0,1\}^k}{\operatorname{argmin}} \left( \sum_{i=1}^{N} \|x \otimes F_i\| \right)$$

Here the encircled symbol represents an XOR operation. This synthesized feature descriptor can be considered as an average synthesized feature descriptor.

For continuous descriptor vectors, the similarity metric between the descriptor vectors can be the L2 norm, which is the distance in 2 or 3 dimensional Euclidean vector space. L2 norm is a standard method to compute the distance between two vectors, by calculating the length of the difference vector, e.g., the square root of the sum of all squares of the coordinate differences. The L2 norm measures the difference between two vectors. For a set of feature descriptors, the L2 norm of the set can be the minimum distance between any pair of the feature descriptors in the set.

Let Z be the synthesized feature descriptor, and k the dimensionality of the feature descriptor space. For N feature descriptors, Z is the argument that minimizes the L2 norm between Z and every feature descriptor.

$$Z = \underset{x \in \mathbb{R}^k}{\operatorname{argmin}} \left( \sum_{i=1}^{N} \|x - F_i\|_2 \right)$$

This synthesized feature descriptor can be considered as an average synthesized feature descriptor.

Thus, after the synthesis step, each feature can be described by a synthesized descriptor. The synthesized descriptor can be more robust to changes in illumination as compared to feature vectors extracted from standard microscope images. The synthesized feature vectors can then be used for a variety of different tasks. In some embodiments, the synthesized feature vectors can be used to stitch together images captured from different micro-cameras within an MCAM system.

In some embodiments, the image stitching process, for example, in an MCAM system, can involve finding pairs of synthesized descriptors in two adjacent images that are similar. The similarity metric can be a low distance metric, such as the Hamming distance or the L2 norm, as discussed above, depending on the types of the descriptor vectors, e.g., binary or continuous. To match synthesized feature vectors, feature pairs between adjacent images can be computed via the above standard metrics, and rank the quality of the matches to find and select the best match candidates.

The pairs of synthesized descriptors can be two average synthesized descriptors, in the case of an average synthesizing process. The pairs of synthesized descriptors can be two feature descriptors, with each feature descriptor being a member of a concatenation synthesized descriptor, in the case of a concatenation synthesizing process. In other words, the concatenation synthesized feature descriptor is a set of one or more members, with each member being a feature descriptor.

In addition, if the sample being imaged is flat, an affine transformation can be assumed to be a suitable transformation to apply to each image before image stitching, to ensure the final stitched result is high-quality. Using knowledge of the restrictions from the transform a final denoising step can be applied. For example RANSAC can be used to find a set of points that agrees upon the transform through random sampling of the matching point set. Using the features matches and optionally the geometric transform restrictions, pixel correspondence can be found. This correspondence can be used for a variety of applications such as depth detection and defect detection, in addition to image stitching.

Figure 3:
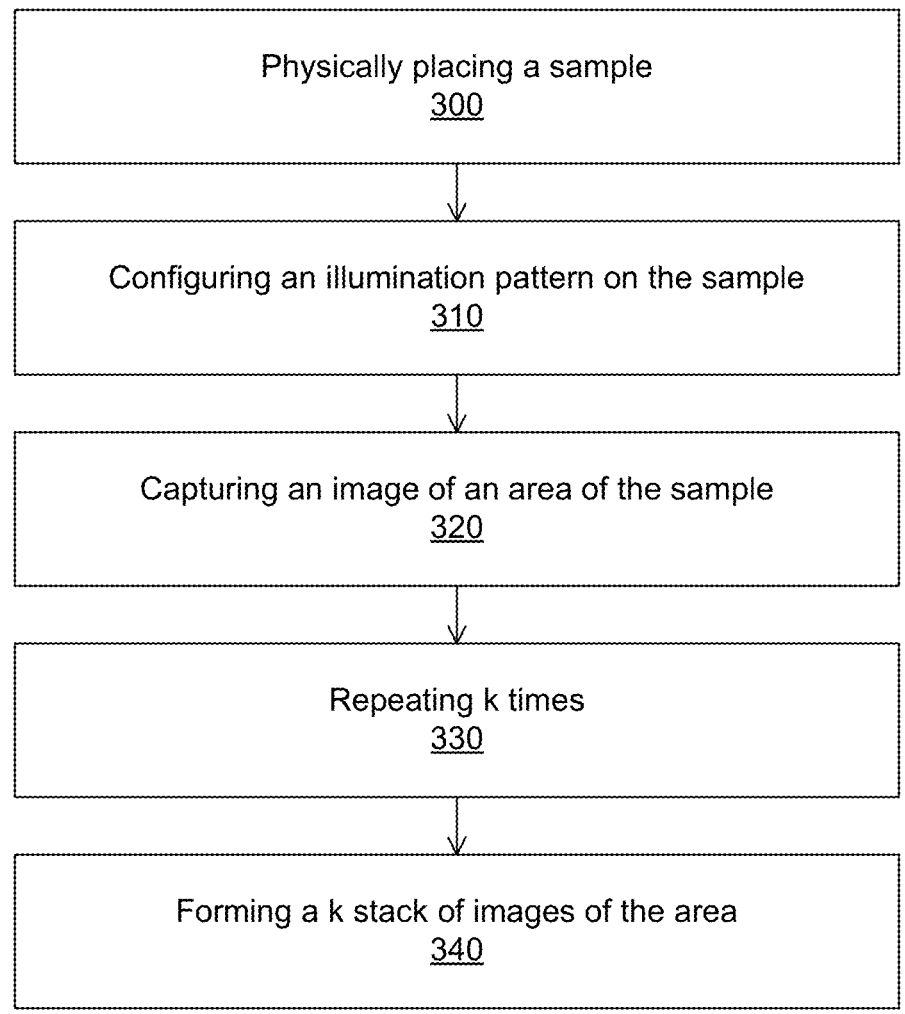
FIG. 3 illustrates a flow chart for forming a k stack of images according to some embodiments.

FIG. 3 illustrates a flow chart for forming a k stack of images according to some embodiments. The k stack of images can include k images captured by a same camera at a same view point to a same substrate area, with each image captured under a different illumination pattern, for k different illumination patterns.

Operation 300 physically places a sample, for example, to a sample holder in a microscope.

Operation 310 configures an illumination pattern on the sample. The illumination pattern can be selected from k illumination patterns, from an illumination source having multiple light sources that are individually controlled by a controller.

Operation 320 captures an image of an area of the sample, for example, by a camera of a camera array. Operation 330 repeats configuring an illumination pattern and capturing an image. The repeat can be for k different illumination patterns, thus the process can be repeated k times, for a total of k mages, or a stack of k images, or a k stack of images.

Operation 340 forms a k stack of images of the area from the repeating illumination and capturing images.

The k stack of images can be processed, such as by a feature extraction process, to extract features of the images of the sample. The features can allow stitching of the sample images, to allow depth detection of the sample image, or can allow defect detection on the sample based on the sample images.

Figure 4:
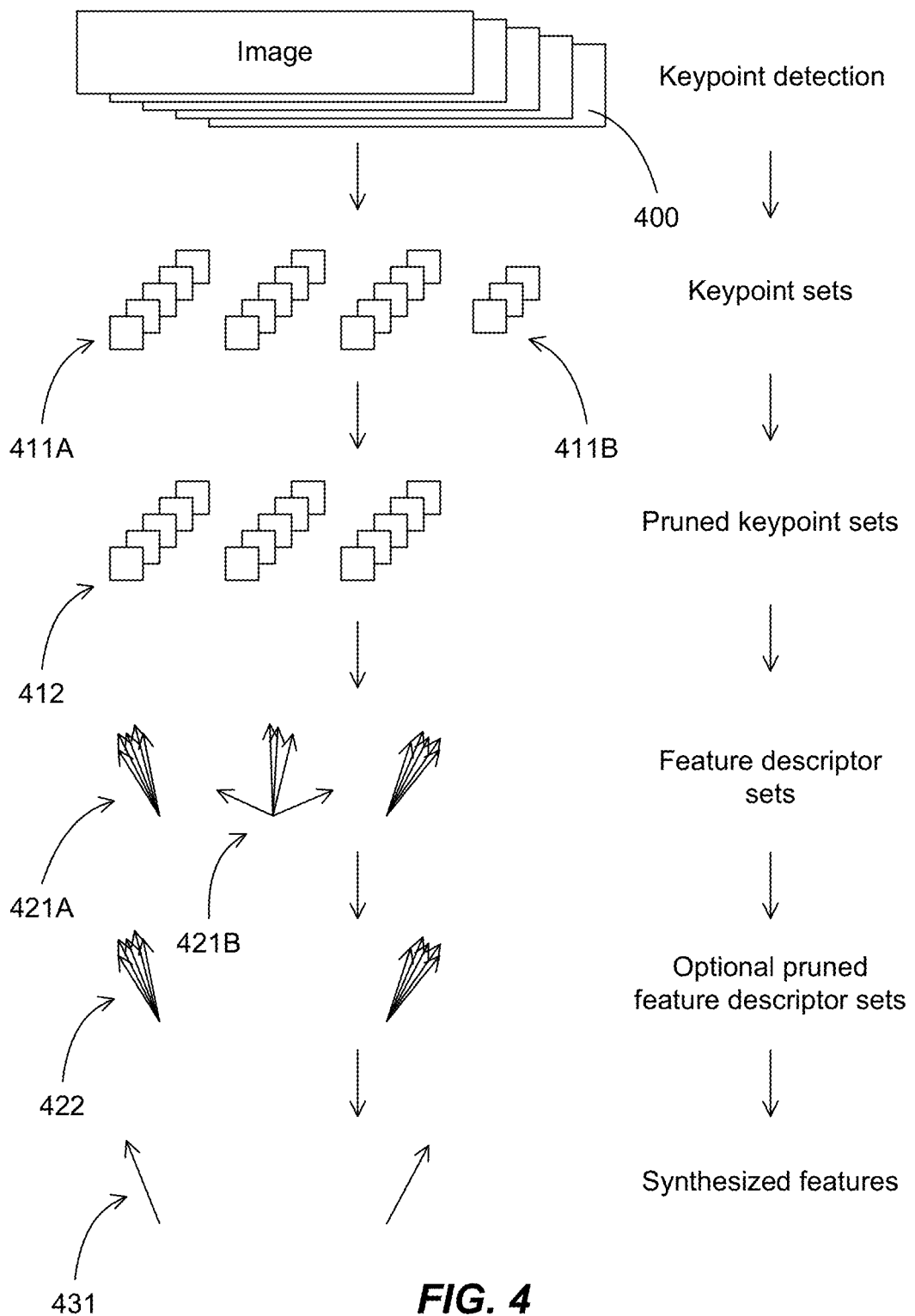
FIG. 4 illustrates a method for extract features from a set of images according to some embodiments.

FIG. 4 illustrates a method for extract features from a set of images according to some embodiments. A set of images 400 can include multiple images of an area of a substrate, which are captured by a camera in a camera array under multiple illumination patterns. The images in the set of images 400 are captured by a same camera n the camera array, with each mage captured under a different illumination pattern. Thus, the images in the set of images are images of a same area, which can look different due to the different illumination patterns. For example, an image can be a bright field image for a direct illumination pattern. Another image can be a dark field image for a scattering illumination pattern.

The images in the set of images 400 can be subjected to a keypoint detection process. For example, a keypoint detection response function, such as a corner response function or a Gaussian blob response function, can be applied on all images of the set of images. The keypoint detection process can generate multiple points or area in each image of the set of images. The points or images can be clustered to form keypoints, with a keypoint including one or more detected points or areas in the images. The keypoints can be identified by locations of the keypoints in the images. The keypoints can include points or areas in the images that are invariant to at least an image transformation, such as scale transformation or rotation transformation.

The keypoints can be grouped into sets of keypoints 411A and 411B according to location in the images, e.g., each set of keypoints containing keypoints detected from a same location in the images of the set of images. Since the images in the set of images are all captured of a same substrate area, in general, a keypoint detected in an image can be detected in other images of the set of images, also at a same location on each image. Thus, a set of keypoints can contain a same feature of the image, e.g., containing the keypoints representing a same feature, meaning at a same location, in each image of the set of images.

A keypoint can be detected in all images of the set of images, resulting in a set of keypoints 411A having k keypoints, e.g., the number of keypoints in the set of keypoints is the same as the number of images in the set of images. A keypoint can be detected in less than all images, e.g., the keypoint is not detected in one or more images in the set of images, due to the lighting of the illumination pattern. The keypoint not detected in one or more images can result in a set of keypoints 411B having less than k keypoints, e.g., the number of keypoints in the set of keypoints 411B is less than the number of images in the set of images.

The sets of keypoints can be pruned, for example, according to the number of the keypoints in the sets of keypoints. The pruning process can include clustering the keypoints in the set of keypoints and removing the keypoints outside the cluster of keypoints according to a distance metric. For example, the pruning process can include removing illumination-specific keypoints in the set of keypoints, e.g., keypoints that are detected only under specific illumination patterns. The pruning process can include removing keypoints detected under specific illumination patterns of the multiple illumination patterns. The pruning process can include removing keypoints detected in a number of images of the set of images, with the number of images less than or equal to a threshold value. The pruning process can include removing keypoints detected in the set of images for less than a number of images, with the number of images less than or equal to a threshold value.

For example, if a set of keypoints has less than a number threshold value, such as n keypoints with n less than k, the set of keypoints can be pruned, e.g., removed from further consideration. The number threshold value can be a fraction of k, such as less than 100%, less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, or less than or equal to 30% of k, which is the number of images in the set of images. As shown, the set of keypoints 411B is pruned because the keypoints are not detected from all images, e.g., detected from less than 100% of the total images in the set of images.

The keypoint pruning process can allow the remaining sets of keypoints 412 to be robust against illumination changes, since the remaining sets of keypoints contain keypoints detected from many illumination patterns. The removed sets of keypoints contain keypoints detected from a number of images that is less than an acceptable threshold value, meaning the removed sets of keypoints containing keypoints having illumination specific, e.g., only detected under specific illumination patterns.

After being pruned, each keypoint in the pruned sets of keypoints can be described, by a feature description algorithm, to form feature descriptors. A feature descriptor can include descriptions of a feature in the image, with the description configured to identify the feature in the image, or in other images. The feature descriptors can be identified at least by locations and orientations. The feature descriptors can include a binary vector format or a continuous vector format.

A set of feature descriptors 421A and 421B can be formed from each pruned set of keypoints. The sets of descriptors can be optionally pruned, for example, according to a distance metric to form pruned sets of descriptors 422. For example, the sets of feature descriptors can be pruned by clustering the feature descriptors in the sets of feature descriptors and removing the feature descriptors outside the cluster of feature descriptors according to a distance metric. The sets of feature descriptors can be pruned by removing feature descriptors in a set of feature descriptors having a distance metric larger than a distance threshold value, followed by removing sets of feature descriptors having a number of feature descriptors less than a number threshold value.

For example, the descriptors in a set of descriptors can be clustered, and the descriptors separated from other descriptors can be removed. Alternatively, a distance metric, such as a Hamming distance for binary descriptors and an L2 norm for continuous descriptors, can be calculated on the descriptors in a set of descriptors. The descriptors having the distance metric larger than a distance threshold value can be removed from the descriptor cluster. The distance threshold value can be a fraction of an average distance values between the descriptors, such as greater or equal to 5%, greater or equal to 10%, greater or equal to 15%, greater or equal to 20%, greater or equal to 25%, greater or equal to 30%, greater or equal to 35%, greater or equal to 40%, greater or equal to 45%, greater or equal to 50%, greater or equal to 55%, greater or equal to 60%, greater or equal to 65%, greater or equal to 70%, or greater or equal to 75% of the average distance values between the descriptors.

After the distance metric, the sets of descriptors can be optionally pruned according to a number metric. For example, if a set of descriptors has a number of descriptors less than a number threshold value, then the set of descriptors is pruned, e.g., removed from consideration. The number of descriptors can depend on the number of keypoints, since each keypoint is described to form a descriptor. The number of descriptors can depend on the distance metric, since descriptors having a large distance metric from other descriptors are removed from the set of descriptors. The number threshold value can be a fraction of k, such as less than 100%, less than or equal to 95%, less than or equal to 90%, less than or equal to 85%, less than or equal to 80%, less than or equal to 75%, less than or equal to 70%, less than or equal to 65%, less than or equal to 60%, less than or equal to 55%, less than or equal to 50%, less than or equal to 45%, less than or equal to 40%, less than or equal to 35%, or less than or equal to 30% of k, which is the number of images in the set of images.

The descriptors in each pruned set of descriptors can be synthesized to form a synthesized descriptor for the set of descriptors, e.g., for the feature represented by the set of keypoints and described by the set of descriptors. For example, a set of feature descriptors can be synthesized by averaging the feature descriptors in the set of feature descriptors, with or without considerations for constraints or limitations of the feature descriptors, such as subjected to constraints or limitations of the feature descriptors. A set of feature descriptors can be synthesized by concatenate the feature descriptors in the set of feature descriptors.

Figure 5:
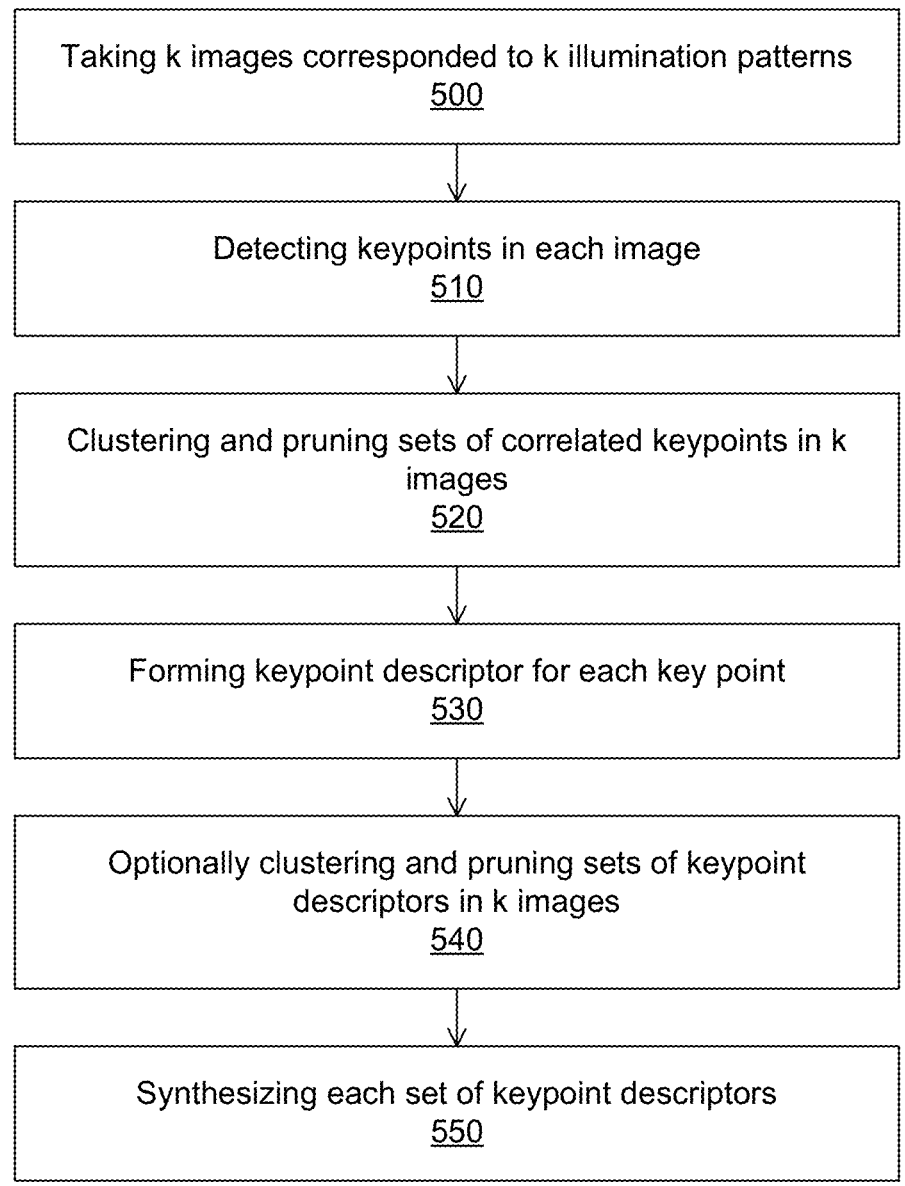
FIG. 5 illustrates a flow chart to produce synthesized feature descriptors according to some embodiments.

FIG. 5 illustrates a flow chart to produce synthesized feature descriptors according to some embodiments. Operation 500 takes k images corresponded to k different illumination patterns. The illumination patterns can include light sources, such as LED lights, above or below the substrate area. The illumination patterns can also include light sources providing lights at different angles to the substrate area. In some embodiments, the different illumination patterns are chosen to optimize the feature extraction process, such as illumination patterns that can produce keypoints that are stable, robust, and invariant to image transformations.

Operation 510 detects keypoints in each image. For example, the images from the stack of k images can be subjected to a response function, such as a corner response function or a blob response function, to identify points, e.g., locations of one or more pixels in the images, which are invariant to image transformations. The identified points can be clustered to form one or more keypoints, e.g., each keypoint is distinct from other keypoints, and each keypoint can include multiple points.

Operation 520 clusters and then prunes sets of correlated keypoints in the stack of k images. A set of correlated keypoints includes a same keypoint in each image of the stack of images, e.g., including all keypoints corresponded to a same area of the substrate area. Since the images are taken under different illumination patterns, the keypoints in the set of keypoints should all be similar, and any difference in the keypoints in the set of keypoints should be caused by the difference in illumination. For example, a maximum number of keypoints in a set of keypoints is the same as the number of images, e.g., a keypoint is detected in an image. If the number of keypoints in a set of keypoints is much less than the number of images, it means that the keypoints are illumination specific, e.g., only being detected at certain illumination patterns and appear at the images corresponded to the illumination patterns. The sets of keypoints thus can be pruned according to the number of images in which the keypoints are detected. If the set of keypoints has a number of detected keypoints less than a threshold value, such as a value less than or equal; to the number of images n the set of images, the set of keypoints are pruned, e.g., removed.

Operation 530 forms a feature descriptor for each keypoint. The feature descriptors can form sets of feature descriptors, with each set of feature descriptors corresponding to a set of keypoints.

Operation 540 optionally clusters and prunes the sets of feature descriptors. Operation 550 synthesizes each set of feature descriptors to form synthesized feature descriptors, which can represent the features detected and described with the keypoints.

In some embodiments, the present invention discloses a feature extraction process for multiple images under varied illumination configurations to obtain robust keypoints, e.g., keypoints less susceptible to image transformation. The multiple illumination configurations can test the illumination invariance characteristics of the response function of samples, together with allowing suitable and optimal illumination configurations for different types of samples.

Feature extraction is a computerized process to identify distinct features in an image. The features from a feature extraction process have many applications, including image alignment, motion tracking, 3D reconstruction, depth map formation, object detection, object recognition, robot navigation, and indexing and data retrieval. A common application of feature extraction is for image stitching, e.g., combining at two images into one larger image. A stitching process can include extracting features from the images to be stitched, matching features from two or more images to be stitches, and aligning the images such that matched features overlap with one another on a common coordinate system, to then form a combined larger image. The formation of the combined larger image can involve an image fusion process, in which pixels from different images that correspond to the same location on the common coordinate system are merged (added in a linear or non-linear manner) to produce the value of the pixel within the combined larger image at the same location on the common coordinate system.

A second common application of feature extraction is for joint image stitching and height map generation, typically achieved with photogrammetry software methods. In this application, similar to image stitching, joint image stitching and height map generation combines two or more images into one large image. In addition, it also creates a map of height values at multiple locations across the image, where the height denotes the extent of the sample or object of interest in the direction perpendicular to the spatial coordinates at the sample plane. Photogrammetry is one method of generating the height map from more than one image which have overlapping fields-of-view (that is, that each contain image measurements from the same location along the sample or object of interest). A photogrammetry method applies a unique transformation to one or more of images which have overlapping fields-of-view to create an accurate combined larger image for image stitching. The photogrammetry method simultaneously uses information about the unique transformations applied to the one or more images to estimate the height of the sample or object of interest at one or more spatial locations. A transformation can include a displacement of more than one pixel, a shearing of more than one pixel, a coordinate transformation of more than one pixel, or a general non-linear transformation of the values of more than one pixel. The transformation can take in to account a model of the camera used to form the image, from which values related to distortion and projection distortion may be estimated. The transformations applied to more than one camera may also be utilized in a process of triangulation to determine the height of the sample or object at each location of interest, in which the point of intersection of two rays in a common coordinate system can be estimated from the inverse of the transformation applied to each image to minimize the difference between the pixel values within each image when overlapped on a common coordinate system. The minimization process can involve an optimization algorithm that minimizes the mean squared error (the sum of the squares of the difference) between more than one image overlapped on a common coordinate system, with respect to the parameters used in the transformation of the more than one images, which is also referred to as bundle adjustment. Bundle adjustment may also refine the height of the sample at more than one location, along with the parameters describing each camera, to minimize the difference of the true and observed projected images captured by each camera. Once complete, this bundle adjustment process in particular and a photogrammetry method in general will output both a stitched large image and a map of height values at multiple locations across the image that were jointly derived by the bundle adjustment minimization process.

Another common application of feature extraction is for object detection, which is the process of automatically identifying objects of interest within captured image data. The input of an object detection algorithm is the image data captured by one or more cameras, and the output of object detection is a set of spatial coordinates that define the location of one or more boxes, and the width and height of these one or more boxes, which surround the objects of interest within the image data. The object detection process can start with a definition of the object category of interest, which can be comprised of one or more features that the object can exhibit within captured image data, one or more keypoint features or keypoint descriptors that the object can exhibit within captured image data, one or more feature descriptors that the object can exhibit within captured image data, one or more corner response functions that the object can exhibit within captured image data, or one or more orientation histograms that the object can exhibit within captured image data. With this definition, the object detection process can then execute a search across the captured image data to identify the spatial location of each object that matches the definition via some metric (e.g., mean-squared error) within some defined threshold. The identification of each matching object can be summarized by a set of spatial coordinates that define the location of a box that would surround the object, and the width and height of this box, which is then returned as output.

The definition of the object category of interest can also be derived from another set of image data captured of similar objects. This other set of image data can be acquired with the same or a different imaging system and can be used to form a supervised image dataset to train a supervised machine learning algorithm with. After the supervised machine learning algorithm has been trained, it can then be used to process captured image data, by taking in each captured image, or image k-stack, or multiple image k-stacks as input, and then returning one or more s spatial coordinates that define the location of one or more boxes, and the width and height of these one or more boxes. In the present invention, the use of patterned illumination from one or more light sources to capture a k-stack to then derive final keypoints or feature descriptors that are more robust to illumination changes can help to improve the accuracy of object detection, by making the identification of features of interest that are indicative of the object of interest more invariant to variations in object or sample illumination.

In some embodiments, the present invention discloses a feature extraction process for multiple images under varied illumination configurations to obtain robust keypoints, e.g., keypoint less susceptible to image transformation. The multiple illumination configurations can test the illumination invariance characteristic of the response function, together with allowing suitable and optimal illumination configurations for different types of samples.

Feature extraction is a computerized process to identify distinct features in an image. The features from a feature extraction process have many applications, including image alignment, motion tracking, 3D reconstruction, object recognition, robot navigation, and indexing and data retrieval. A common application of feature extraction is for image stitching, e.g., combining at two images into one larger image. A stitching process can include extracting features from the images, matching features from two images, and aligning the images to form a combined image.

An important first step of feature extraction is to identify keypoints, which typically have multiple points on an image that are detected by a detecting algorithm. The keypoints can represent the image area, such as containing pixel coordinates to identify the image area that contains the features. For example, the keypoints should be repeatable, meaning the same keypoints can be found in several images even though the images have been transformed, such as geometric and photometric transformations. The keypoints should also be standout and noticeable, meaning each keypoint can have a distinctive description. The keypoints should also be compact, meaning there are not too many keypoints on the image, which can allow for an efficient extraction. The keypoints should also be local, meaning the keypoints can occupy a small area of the image, and should be robust to cluster and occlusion.

A simple keypoint detection function can be a corner response function, since image corners are repeatable and distinctive. A concept of image corner is that in the region around a corner, the image gradient has two or more dominant directions. An algorithm for finding corner could be by looking through a small window. Shifting the window in any direction should give a large change in intensity, e.g., a large image gradient. In contrast, a flat region would exhibit no intensity change in any direction. An edge would exhibit no intensity change along the edge direction.

The corner response function is invariant to image rotation, and partially invariant to affine intensity changes. However, the corner response function is not invariant to scaling. For example, in a small scale, the small window can see a corner, e.g., the corner response function can detect intensity changes in any direction. In a much larger scale, the same small window can see only an edge portion of the corner, thus all detected points will be classified as edges.

A more complicated keypoint detection function that is scale invariant is a blob response function. A blob is an object having no distinct shape; and in the context of image, a blob is an area surrounded by edges. Thus, a blob can be considered as a superposition of two edges in any direction.

A concept of the blob response function is that using a Laplacian response, the magnitude of the Laplacian response will achieve a maximum at the center of the blob, if the scale of the Laplacian response is matched to the scale of the blob. Thus, a scale-normalization Laplacian response is convolving with the image at different scales to achieve a maximum response. The reason for the scale normalization is because the Laplacian response decays as scale increases, thus a scale normalized Laplacian response includes a scale square factor.

Comparing to the corner response function, the blob response function is more robust in term of scale invariance, but is more time consuming due to the need to detecting keypoints at different image scales.

In some embodiments, the present feature extraction process uses a corner response function for simplicity, which can result in faster response. The effect of non-scale invariance can be eliminated or minimized, since the images in a k-stack of images are from a same view point setting, e.g., from a same camera focusing on a same sample area, under k different illumination patterns. Under this setup, the images in the k-stack all have a same scale. Further, for image stitching of nearby images in an MCAM system, the magnifications of the different micro-cameras focusing of adjacent areas of the sample could be calibrated to obtain nearly identical magnification. Thus the keypoints detected by the non-scale invariant corner response function could be adequate for the multiple illumination patterns and for the MCAM system image stitching application.

In some embodiments, the keypoints from the images taken under varied illumination configurations can be pruned to remove noise, e.g., keypoints markedly different from the majority of other keypoints. A pruning process can start with the keypoints being clustered, and the outliers, e.g., keypoints outside the keypoint cluster, are identified for removal. Alternatively, a pruning process can use a comparator metric to remove outliers, e.g., keypoints classified as noise.

Clustering is the process of grouping a set of keypoints in such a way that keypoints in the cluster group are more similar to each other than to those outside the cluster group. The clustering process can be an iterative process until a desired or appropriate clustering result is achieved. After the keypoints are clustered, the keypoints outside the cluster can be removed.

Figures 6A, 6B, 6C:
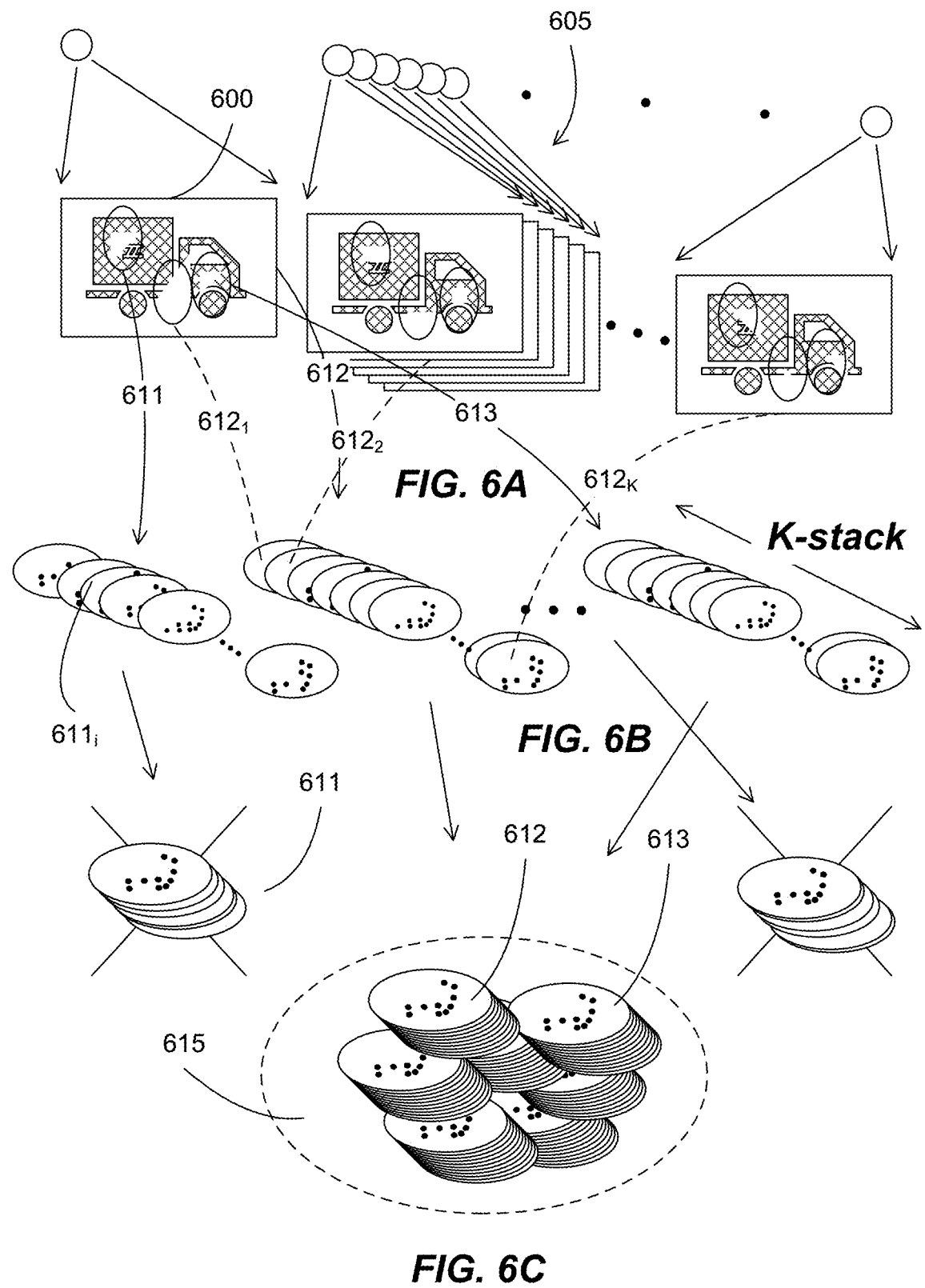
FIG. 6A-6C illustrate a process to provide pruned sets of keypoints according to some embodiments.

FIG. 6A-6C illustrate a process to provide pruned sets of keypoints according to some embodiments. Multiple illumination patterns 605 can be used to produce a stack of images 600 for a same substrate area taken from a same camera setting.

A response function is applied to each image of the stack of images, e.g., to a function representative of the image, such as a function relating the levels of brightness to each pixel coordinates in the images. The levels of brightness can be black and white, or can be an RGB set for 3 colors of red, green and blue. The response function can be an edge or a corner response function, which can produce extremas at the edges or corners of the images. The response function can be a Gaussian blob function, which can produce extremas and scales at block patterns of the images.

The detected extremas, or points on the images, can be clustered to generate keypoints, e.g., each keypoint can correspond to a group of nearby points. For example, keypoint 611 generated by applying a keypoint detection process 610 to an image 600, can include multiple points $611_i$ clustering together. There can be other keypoints on the same image, such as keypoints 612 and 613 (FIG. 6A-6B).

The same keypoint on each image of the stack of images can be grouped together form a set of keypoints, with the number of keypoint in the set of keypoints equaling to or less than the number of images in the stack of images. For example, three different keypoints in an image of the set of images 600 can be grouped together to form three sets of keypoints 611, 612, and 613. The set of keypoints 612 can include keypoint $612_1$ in image 1, keypoint $612_2$ in image 2, until keypoint $612_k$ in image k of the set of images having k images. The keypoints $612_{1-k}$ are corresponded keypoints, meaning keypoints detected from a same area of an image, and keypoint characterizing a same feature in the image, e.g., each keypoint in the set of keypoints corresponds to a same feature on the image (FIG. 6A-6B).

The number of keypoint in the set of keypoints can be equaled to the number of images in the stack of images. For example, if the keypoints are detected in every image in the stack of images, there are k keypoints for k images. The number of keypoint in the set of keypoints can be less than the number of images in the stack of images. For example, if one or more keypoints are not detected in some images in the stack of images, the number of keypoints in a set of keypoints is less than k for k images.

The sets of keypoints can be pruned, e.g., the sets of keypoints that are not invariant to illumination changes can be removed, for example, to provide more robust and stable sets of keypoints that characterize the features in the images. The invariant characteristic can be viewed as detectable under most illumination patterns. Thus the invariant metric can be a threshold number of illumination patterns, which corresponds to the number of images in the set of images in which the keypoints are detected.

For example, the sets of keypoints 612 and 613 have a large number of keypoints, and thus the keypoints 612 and 613 can be detected in many illumination patterns, and thus the keypoints 612 and 613 are considered to be invariant against changes in lighting conditions, and thus are considered stable and robust features (FIG. 6A-6B).

In contrast, the set of keypoints 611 has a fewer number of keypoints, and thus the keypoints 611 cannot be detected in many illumination patterns, and thus the keypoints 611 are considered to be illumination specific, e.g., only being detected in certain illumination patterns, and thus are not invariant against illumination changes. The set of keypoints 611 can be pruned, or removed, to provide a group 615 of multiple sets of keypoints that are more robust and stable (FIG. 6A-6B).

The keypoints 615A that occur only at certain illumination patterns are considered to be noise, and are removed from the keypoint sets (FIG. 6C).

Figure 7A:
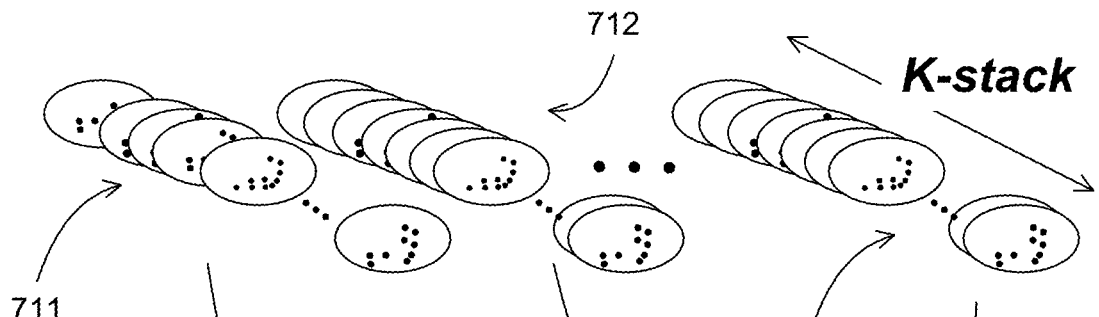
FIGS. 7A-7C illustrate a pruning process for sets of keypoints according to some embodiments.
Figure 7B:
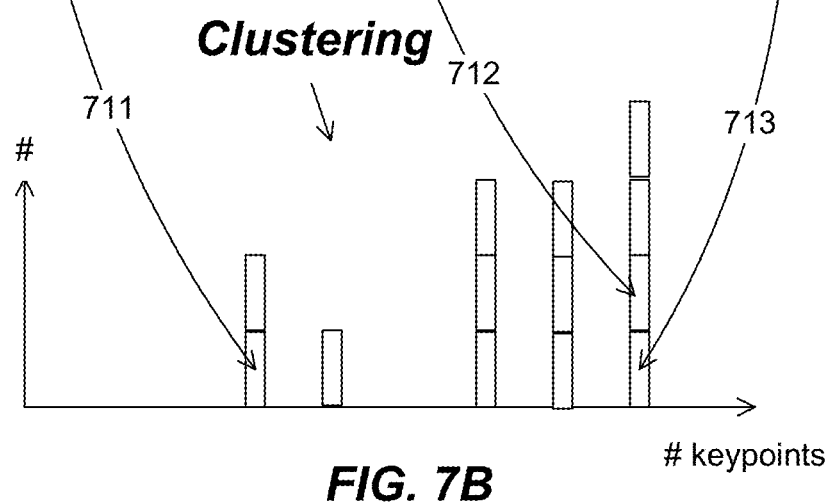
Figure 7C:
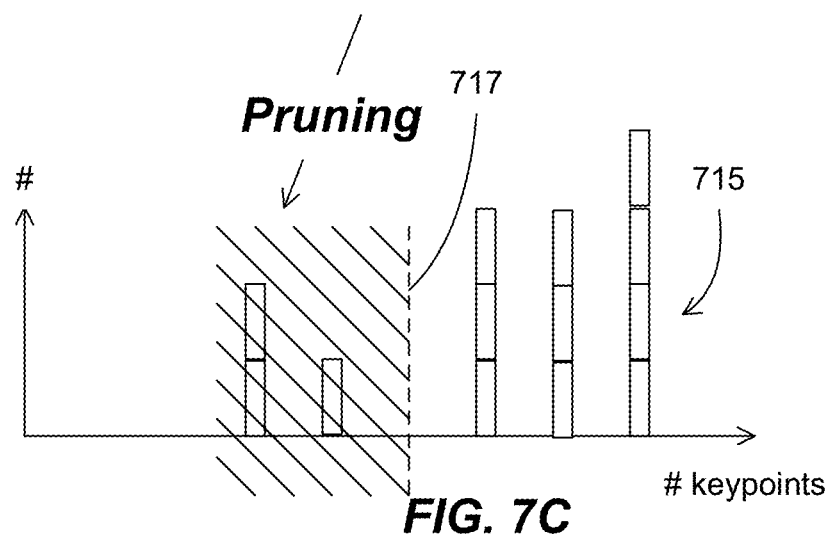

FIGS. 7A-7C illustrate a pruning process for sets of keypoints according to some embodiments. In FIG. 7A, a set of keypoints 711 can a smaller number of keypoints, as compared the number of images in the stack of images, e.g., the number of illuminations patterns. Sets of keypoints 712 and 713 can have a same number of keypoints, which is the same as the number of images in the stack of images.

In FIG. 7B, a clustering process can be performed for the sets of keypoints using a cluster metric of the number of keypoints in the sets of keypoints. A histogram can be provided, plotting the number of sets against the number of keypoints in the sets of keypoints. For example, the sets of keypoints 711, 712 and 713 can be positioned according to the number of keypoints in the sets.

In FIG. 7C, the histogram can be pruned. For example, a pruning criterion can be a relationship to the number of illumination patterns, which can be characterized by the number of keypoints in the sets of keypoints. If the number of keypoints is low, it means that the keypoints are not detected in a good number of illumination patterns. It also means that the keypoints is illumination-specific, e.g., detected only under a few illumination patterns in the stack of images.

The pruning process thus can be performed by clustering the sets of keypoints according to the number of keypoints in the sets of keypoints. The sets of keypoints having the number of points less than a threshold value can be removed, keeping only the sets of keypoints having a number of keypoints equal or greater than the threshold value, such as removing any sets of keypoints below a threshold value 717. For example, the set of keypoints 711 is removed, while the sets of keypoints 712 and 713 remained after the pruning process.

Figure 8:
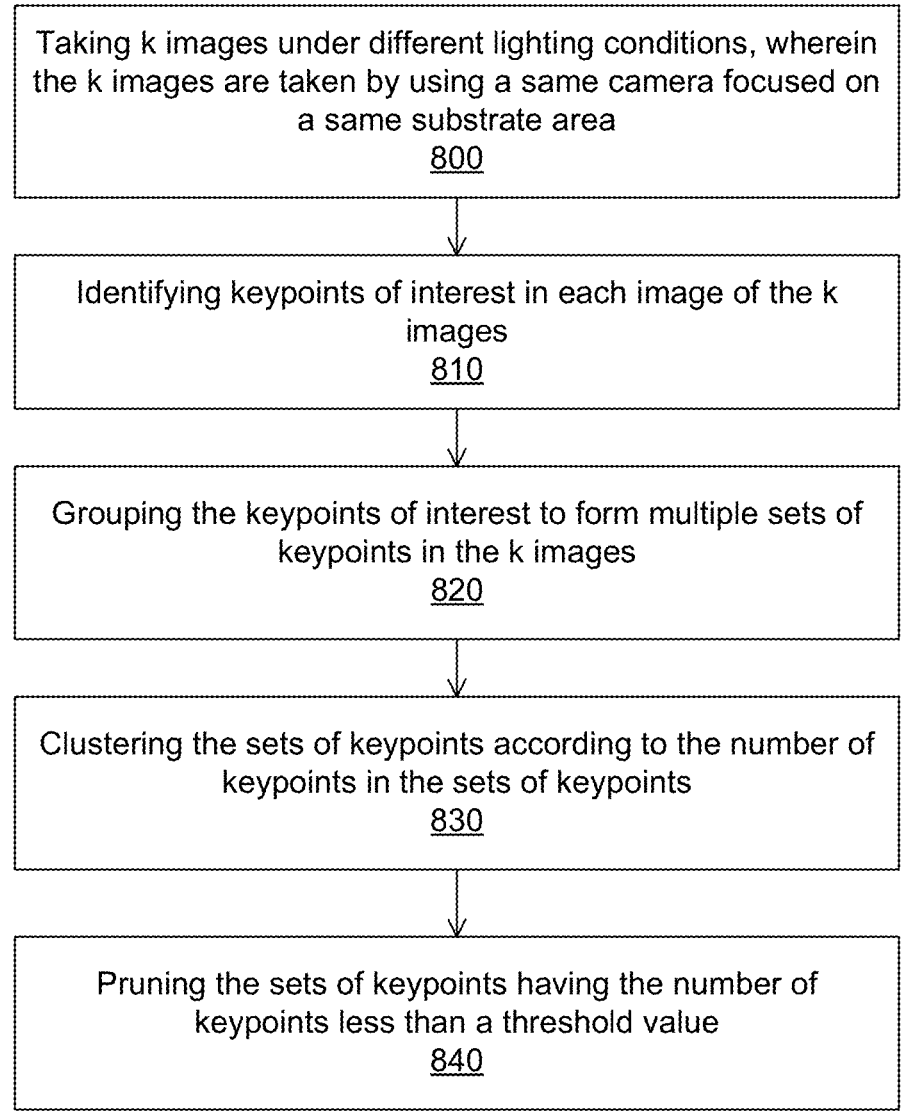
FIG. 8 illustrates a flow chart for forming pruned sets of keypoints according to some embodiments.

FIG. 8 illustrates a flow chart for forming pruned sets of keypoints according to some embodiments. Operation 800 takes multiple images, each under a different lighting pattern. The multiple images can form a stack of images, with the number of images in the stack of images equal to the number of lighting patterns, e.g., one image is taken for each lighting pattern. The images are taken by using a same camera setting, including the camera focused on a same substrate area. The lighting patterns can be provided by a first set of light sources disposed above the substrate near the camera. The lighting patterns can be provided by a second set of light sources disposed under the substrate in opposite side of the camera. The lighting patterns can be provided by both sets of light sources.

Each set of light sources can include multiple light sources, such as LEDs, lamps, or lasers. The light sources can be monochromatic or multicolored. For example, a light source can include a light bulb, providing a single color light or multiple different color lights. A light source can include one or more light bulbs, with each light bulb providing a different color light.

The light sources can be arranged in an array pattern, such as a rectangular pattern covering the substrate. A controller can be coupled to the light sources to control the activation, intensities and wavelengths, e.g., colors, of each light source. A lighting pattern can include one or more activated light sources, such as light sources shining directly on the substrate area, light sources shining at a different angles to the substrate area, light sources shining from the front side near the camera to the substrate area, light sources shining from the back side of the substrate area, light sources having different intensities, or light sources having different colors.

Operation 810 identifies points of interest in each image. The identification can include determining the locations of the points of interest, such as the coordinates of the points of interest. The points of interest are points in the images that can be used to identify a portion of the image, such as points at an edge or at a corner of an object in the image. The points of interest can be identified by applying a response function, such as an edge detecting function, a corner detecting function, or a blob detecting function to a function representing the image, such as a function showing the intensities or colors at different pixel locations of the image.

Operation 820 groups the points of interest to form one or more keypoints in each image. For example, a cluster algorithm can be applied to the points of interest, and can group the points of interest into groups, for example, based on proximity. The groups of points of interest are called keypoints, with each keypoint having multiple points of interest.

Each image can have one or more keypoints. The keypoints are locations in the images that, due to the characteristics of the points of interest, can be used to identify a portion of the image. Further, with proper response function, the keypoints also can be used to identify portions of the image regardless of various image transformations such as translation, rotation, scale or distortion.

Each keypoint in an image can have corresponding keypoints in other images, since all images in the stack of images are taken in a same camera setting, with lighting patterns being the variable. Each distinct keypoint in an image can belong to a set of keypoints, with each set of keypoints having a number of keypoints, which can be less than or equal to the number of images in the stack of images. The keypoints in each set of keypoints should be very similar, detected from same locations in the images, with any differences attributed to the variation of lighting conditions.

The sets of keypoints, e.g., each set of keypoints corresponds to a distinct keypoint in one image, show the keypoint characteristics with illumination variations. Thus, the sets of keypoints with large number of keypoints can provide a more stable and robust keypoints, or at least invariant with respect to illumination variations. The sets of keypoints also can provide a test for the response function with regard to claims of illumination invariance. For example, if the keypoints in a set of keypoints are detected in all images, e.g., in all illumination patterns, the response function can be considered to have good illumination invariance. If the keypoints in a set of keypoints are few, e.g., only detected in certain images, e.g., in certain illumination patterns, the response function can be considered to have poor illumination invariance.

Further, a same response function can have different characteristics regarding illumination invariance, depending on the impact of illumination on the substrate. A small variation in illumination can change significantly or negligibly how different elements in the substrate appear to the camera depending on the substrate quality. The number of keypoints in the sets of keypoints can also verify the suitability of a response function to a particular substrate.

Further, the sets of keypoints can assist in finding optimal illumination patterns for different types of substrate characteristics. By evaluating the cluster characteristics of the sets of keypoints, optimal illumination patterns can be obtained through the number of keypoints in the sets of keypoints.

Further, the sets of keypoints can assist in varying the illumination patterns to provide stable and robust keypoints. Different lighting patterns can be generated for different substrate based on the number of keypoints detected in the illumination patterns. Suitable lighting patterns for different substrates can be selected, also based on the number of detected keypoints in the image stack. A set of generally acceptable lighting patterns can be generated for a majority of substrate types.

For example, through an iteration process in evaluating cluster characteristics, better illumination patterns can be found. The recursive lighting patterns can be used to minimize pruned sets of keypoints based on the number of keypoints in the sets of keypoints.

Operation 830 clusters the sets of keypoints according to the number of keypoints in the sets of keypoints. The clustering process can be based on the response to illumination changes, e.g., a larger number of keypoints means a higher invariance to illumination changes.

A clustering algorithm can be based on the number of keypoints in each set of keypoints. The number of keypoints is detected by applying a response function to the image function under different illumination patterns, and thus, should have a same number of keypoints for a same number of illumination patterns, if the keypoints are invariant against illumination changes. An example of a clustering algorithm is based on a histogram of the number of keypoints in each set of keypoints, with x axis being the number of points, and y axis being the number of sets of keypoints. With different illumination patterns, the number of keypoints in each set of keypoints can provide an indication of the effectiveness of the response function using the illumination patterns. Thus, the number of detected keypoints should be similar to the number of illumination patterns. A low number of detected keypoints indicates a rare situation or an illumination-specific situation.

Operation 840 prunes the sets of keypoints. The pruning process can remove the outlier sets of keypoints, for example, removing the sets of keypoints having a number of keypoint less than a threshold value. The remaining sets of keypoints are now illumination invariant, e.g., occurring for large variations of illumination.

Figure 9:
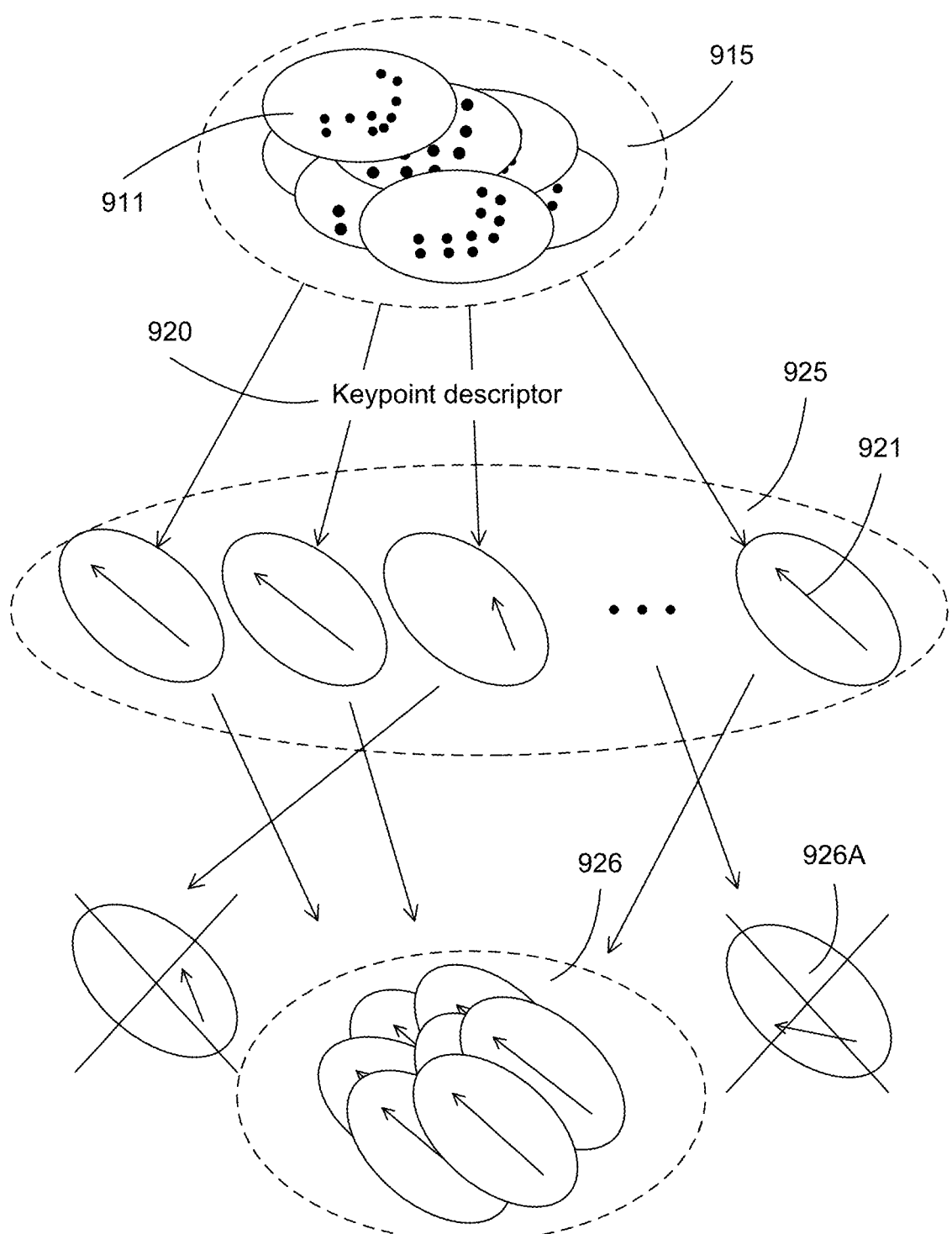
FIG. 9 illustrates a process to prune feature descriptors according to some embodiments.

FIG. 9 illustrates a process to prune feature descriptors according to some embodiments. Keypoints 911 in a set of keypoints, such as pruned set of keypoint 915 can be described in a feature description process 920, such as providing scale and orientation, in addition to the available keypoint locations, to form feature descriptors 921 in a set of feature descriptors 925. The feature descriptors 921 can be in the form of a multidimensional vector, which can include a collection of values such as locations, scale and orientation of the keypoints.

The feature descriptors can be grouped to form sets of feature descriptors, with each set of feature descriptors corresponding to a set of keypoints. For example, the set of keypoints 915 can be described to form the set of feature descriptors 925.

The set of feature descriptors 925 can be optionally pruned to remove feature descriptors that are different from a majority of other feature descriptors. For example, the feature descriptors in the set of feature descriptors 925 can be clustered to form a feature descriptor cluster 926 having outliers 926A, e.g., the feature descriptors that are outside the cluster area of the feature descriptors 926.

Since the feature descriptors are formulated as vectors, a pruning algorithm can be based the lengths of the difference vectors. If two feature descriptor vectors are similar, their difference vector is small in magnitude. If two feature descriptor vectors are different, such as having a difference in magnitude or a difference in orientation, their difference vector is much larger in magnitude. Thus, feature descriptors having a difference larger than a threshold value can be considered as outliers to the feature descriptor cluster, and can be removed. For example, an average value for the feature descriptors can be determined, and any feature descriptors having a large difference with the average feature descriptor, e.g., larger than a threshold value, can be removed. The process can be iterative, to ensure that the average feature descriptor is a representative of the feature descriptors within the cluster.

The pruning algorithm can be based on a Hamming difference, which is a distance comparator operation that can tell the error step to move from one binary vector to another binary vector. The pruning algorithm can be based on an L2 norm, which is a distance comparator operation between two continuous vectors.

After the optional pruning step, the feature descriptors can be evaluated to determine the similarity between the feature descriptors, together with calculating a representative feature descriptor, in a synthesis step, which can represent the feature in the image.

In some embodiments, the synthesis step can be a modified average operation. For example, for analog descriptor vectors without any constraints or limitation, then the synthesis step would be an average operation. With constraints or limitations, the synthesis step would be an average operation within the constraint or limit conditions imposed on the descriptor vectors. For example, for digital or binary descriptor vectors, the synthesis step can be rounding average operation, since the synthesis step would return a digital or binary vector.

In some embodiments, the synthesized feature descriptor can be calculated from the feature descriptors, which can be obtained from the detected keypoints, without any pruning step of the feature descriptors. The synthesized feature descriptor can be calculated from the feature descriptors, which can be obtained from the detected keypoints after being pruned, without the pruning step of the feature descriptors. The synthesized feature descriptor can be calculated from the feature descriptors after being pruned, with the feature descriptors obtained from the detected keypoints also after being pruned.

Figure 10:
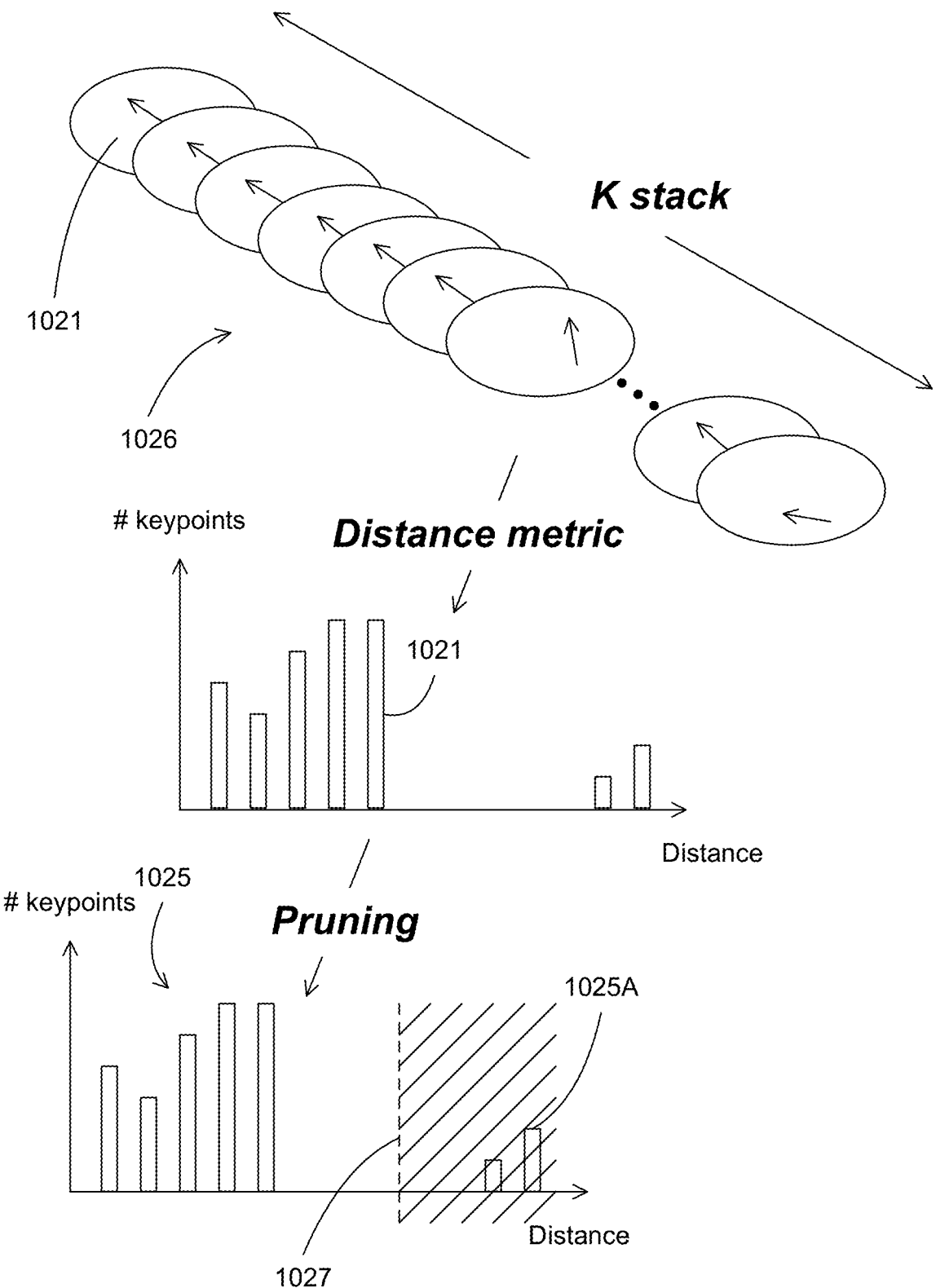
FIG. 10 illustrates a pruning process for a set of feature descriptors according to some embodiments.

FIG. 10 illustrates a pruning process for a set of feature descriptors according to some embodiments. A set of feature descriptors 1026 can have a same number of feature descriptors as the number of keypoints in a set of keypoints, e.g., each keypoint generates a feature descriptor.

The feature descriptors 1021 in the set of feature descriptors 1027 can be clustered together, for example, in a histogram according to a distance difference such as a Hamming distance or an L2 norm, which indicates the variations of the feature descriptors.

In some embodiments, the clustering of the feature descriptors can be characterized by the Hamming distance or the L2 norm between the feature descriptors. If the Hamming distance or the L2 norm of feature descriptors 1025A is high, it means that the feature descriptors 1025A are significantly different from other feature descriptors, such as from the group 1025 of feature descriptors.

A threshold value 1027 can be used as a criterion to prune or remove feature descriptors. If the distance metric of feature descriptors greater than the threshold value 1027, the feature descriptors can be removed from the set of feature descriptors.

Figure 11A:
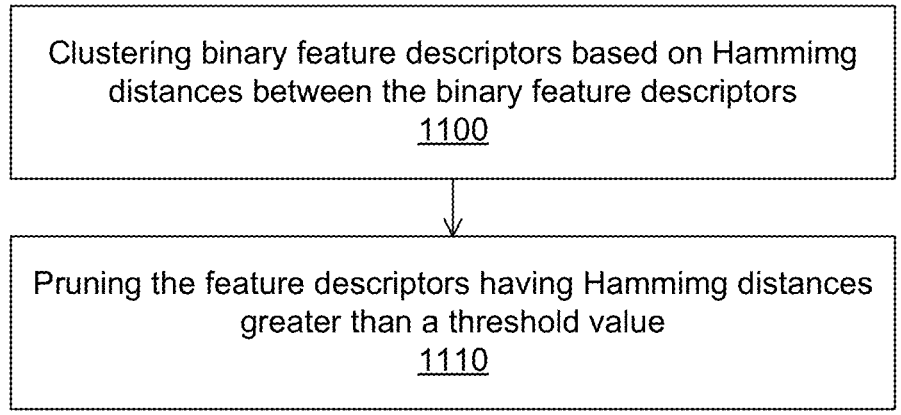
FIGS. 11A-11B illustrate flow charts for pruning feature descriptors according to some embodiments.
Figure 11B:
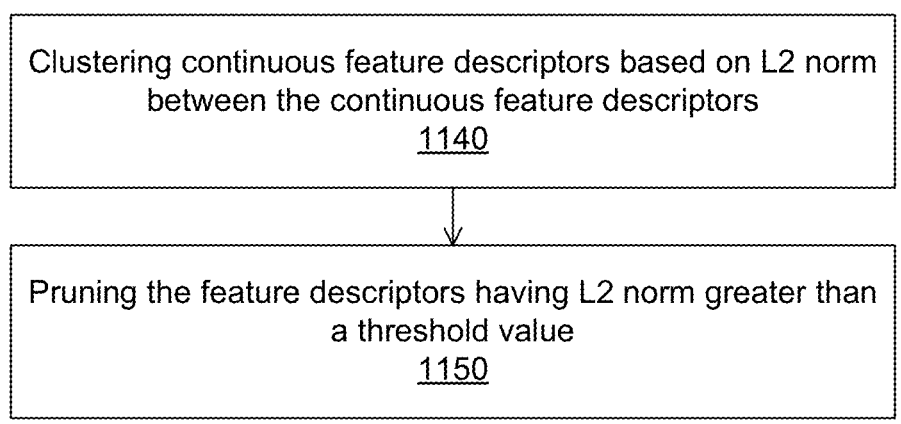

FIGS. 11A-11B illustrate flow charts for pruning feature descriptors according to some embodiments. A set of feature descriptors for a feature in a stack of images is formed from a set of keypoints, after the set of keypoints is considered to be illumination invariant, e.g., passing the pruning process to remove less robust sets of keypoints. The feature descriptors can be optionally pruned, in a first step of feature descriptor pruning process, to remove feature descriptors that are separated from other feature descriptors in a set of feature descriptors. For example, the pruning process can be based on a distance metric, such as a Hamming distance for binary descriptors or an L2 norm for continuous descriptors.

In FIG. 11A, Hamming distance is used for binary feature descriptors. The Hamming distance between two binary vectors is the number of bit positions in which the two vectors are different. For example, the Hamming distance between vectors (001) and (011) is 1 since these two vectors have only 1 bit (the second bit in the binary vector) differing from each other. The Hamming distance between vectors (001) and (010) is 2 since these two vectors have 2 bits (the second and third bits) differing from each other. The Hamming distance can be used to determine the similarity between binary feature descriptors.

Operation 1100 optionally clusters binary feature descriptors in a set of feature descriptors based on Hamming distances between the feature descriptors. The Hamming distance between two binary feature descriptor vectors is the number of bits that must be changed to change one vector into the other vector. The Hamming distance can be used to determine the difference between two vectors, with small Hamming distance indicating two similar vectors and large Hamming distance indicating two different vectors. Operation 1110 optionally prunes the feature descriptors having Hamming distances greater than a threshold value.

In FIG. 11B, L2 norm is used for continuous feature descriptors. L2 norm is a standard method to compute the distance of a vector coordinate from the origin of the vector space. Thus, L2 norm between two vectors is the distance between the vectors, calculated as the length of the difference vector, e.g., the square root of the sum of all squares of the coordinate differences. The L2 norm can be used to determine the similarity between continuous feature descriptors. For example, if L2 norm is zero, there is no difference between the two vectors. If L2 norm is large, the two vectors are different, in magnitudes and/or in directions.

Operation 1140 optionally clusters continuous feature descriptors in a set of feature descriptors based on L2 norm between the feature descriptors. The L2 norm can be used to determine the difference between two vectors, with small L2 norm indicating two similar vectors and large L2 norm indicating two different vectors. Operation 1150 optionally prunes the feature descriptors having L2 norm greater than a threshold value.

Figure 12:
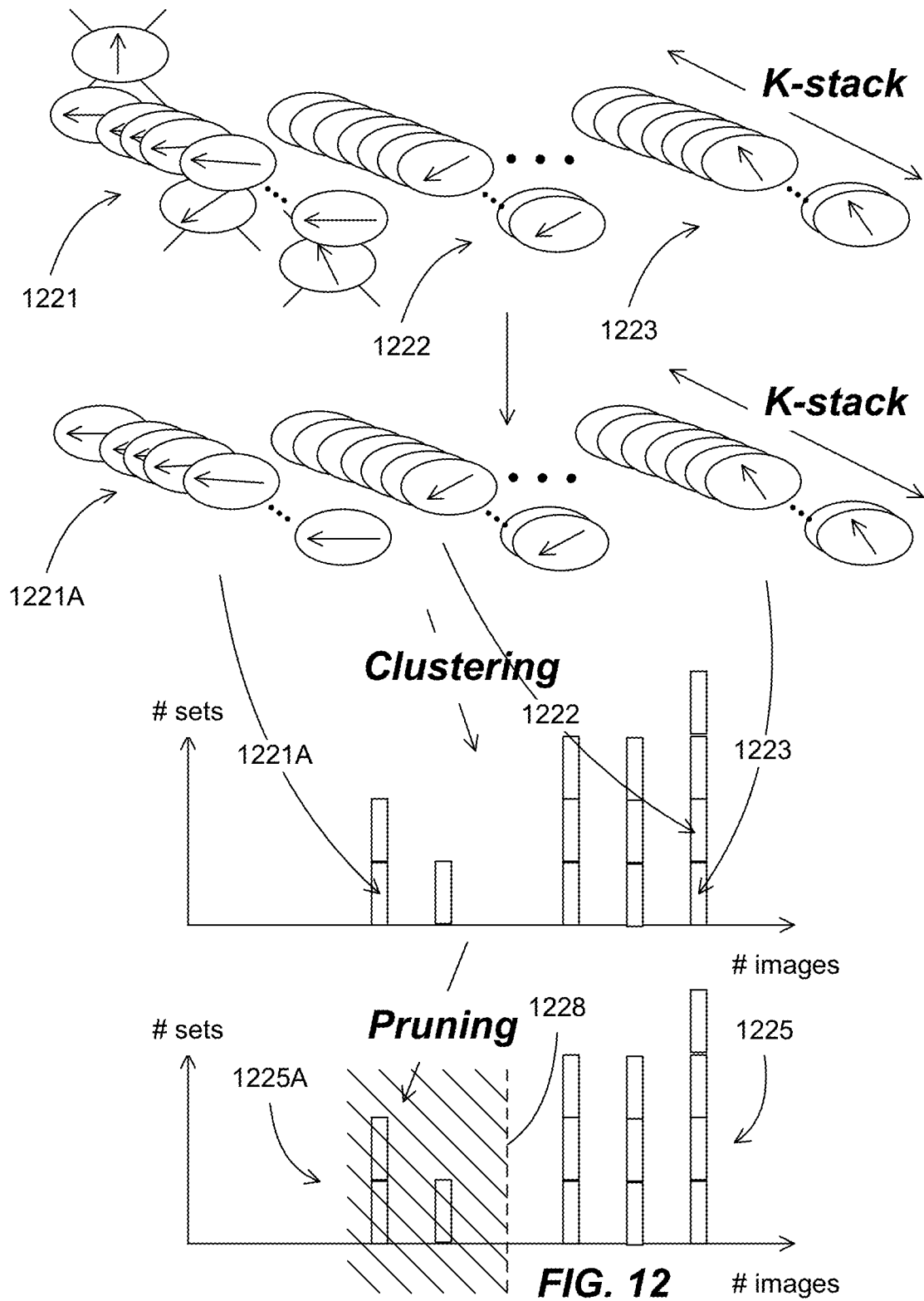
FIG. 12 illustrates a pruning process for sets of feature descriptors according to some embodiments.

FIG. 12 illustrates a pruning process for sets of feature descriptors according to some embodiments. Multiple sets of feature descriptors 1221, 1222, and 1223 can each have a different number of feature descriptors. A set of feature descriptors can have a number of feature descriptors equal to the number of images in a k stack, e.g., equal to the number of illumination patterns. For a set of keypoints detected from all images of the k stack, the number of keypoints is equal to the number of images in the k stack. In this case, each keypoint can be described to form a feature descriptor, and thus, the number of feature descriptors in this set of feature descriptors is equal to the number of images.

The feature descriptors in a set of feature descriptors can be pruned according to a distance metric, such as a Hamming distance or an L2 norm. After being pruned, the number of descriptors in some sets of descriptors can be reduced. For example, the set of descriptor 1221 can have some descriptors removed due to having a high distance with the other descriptors. After removing the high distance descriptors, the set of descriptors 1221 becomes a pruned set of descriptors 1221A.

The pruned sets of descriptors, e.g., pruned according to a distance metric, can be clustered and pruned, or can be pruned without being clustered, according to a number metric 1228. For example, if a set of descriptors 1225A having a number of descriptors less than the number threshold value 1228, the sets of descriptors can be pruned, e.g., removed. The sets of descriptors 1225 having a number of descriptors greater or equal to the number threshold value 1228 can be saved.

FIG. 13A-13B illustrate flow charts for forming feature descriptors according to some embodiments. The sets of feature descriptors can be optionally pruned in a two step pruning process. In a first pruning step, individual sets of feature descriptors are pruned, e.g., the feature descriptors in each set of feature descriptors are pruned based on a distance metric, such as a Hamming distance for binary descriptors and an L2 norm for continuous descriptors. In a second pruning step, the sets of feature descriptors are pruned, e.g., some sets of feature descriptors are pruned based on a number metric, such as a number of feature descriptors in the sets of feature descriptors. After the optional pruning process, synthesized feature descriptors can be formed, with one synthesized feature descriptor for each set of feature descriptors.

In FIG. 13A, operation 1300 optionally prunes sets of feature descriptors having a number of descriptors less than a threshold value. After the feature descriptor pruning step in each set of feature descriptors, the numbers of feature descriptors in some sets of feature descriptors can be reduced. The number of feature descriptors in the sets of feature descriptors can have a distribution, with the largest number of feature descriptors being the number of images in the stack of images. The sets of feature descriptors having the largest number of feature descriptors can be formed from sets of keypoints having keypoints detected in all images, followed by a well clustering of the feature descriptors so no feature descriptors are removed in the first descriptor pruning step.

Some sets of feature descriptors can have smaller numbers of feature descriptors, for example, due to the reduced number of keypoints detected in the image stack, or due to the reduced number of feature descriptors pruned in the first descriptor pruning step. Some sets of feature descriptors can have even smaller numbers of feature descriptors, for example, due to the reduced number of keypoints detected in the image stack together with the reduced number of feature descriptors pruned in the first descriptor pruning step.

In some embodiments, the sets of feature descriptors are pruned based on the distribution of the number of feature descriptors. Sets of feature descriptors having number of feature descriptors less than a threshold value, e.g., a threshold value for number of feature descriptor, or a number of feature descriptor threshold, or simply a number threshold, are removed. Only sets of feature descriptors having number of feature descriptors equal or greater the threshold value are saved to form synthesized feature descriptors for the features.

In FIG. 13B, operation 1320 generates a feature descriptor for each keypoint of each set of keypoint clusters. Thus, a set of feature descriptors for a feature in a stack of images is formed from a set of keypoints, after the set of keypoints is considered to be illumination invariant, e.g., passing the pruning process to remove less robust sets of keypoints. The set of feature descriptors thus has the same number of member as the set of keypoints. The feature descriptors can include scale and orientation of the keypoints, e.g., of the locations of the image indicated by the keypoints.

Once a keypoint has been detected, it typically contains location information. The keypoint then is described, to form a feature descriptor, which further contains scale and orientation information, for example, to allow the identification and matching of the keypoint.

The keypoint description process takes in a patch of an image, centered at the keypoint pixel location and extending across the keypoint pixel location. The area and the orientation of the patch can allow the construction of a high dimensional vector which represents the patch. The vector is constructed such that it is invariant across common, naturalistic image transforms. These can include viewpoint change and naturalistic lighting changes.

The keypoint orientation can be determined based on the local gradients of the pixels around the keypoint area, such as calculating an average local gradient direction or creating a histogram of local gradient directions in the keypoint area.

For example, the average local gradient direction of the keypoint area can be used as the orientation of the feature descriptor. Alternatively, major orientation directions can be assigned to the peaks of a histogram of local gradient directions at a selected scale. The gradient histogram can provide orientation information to address ambiguity, such as having a circular characteristic shape of a region.

For example, a circular neighborhood around the point of interest can be computed. The obtained responses are weighted by a Gaussian function centered at the point of interest. The dominant orientation is estimated by calculating the sum of all responses within a sliding orientation window. The responses are combined to yield a local orientation vector. The longest such vector overall defines the orientation of the point of interest.

In some embodiments, a window can be divided into grids of areas. Orientation histogram for each grid area is computed, and multiple orientation directions are obtained from the orientation histograms.

Operation 1330 optionally prunes each set of feature descriptors, with a set of feature descriptors having feature descriptors associated with keypoints in a pruned keypoint cluster. The pruning process can include removing outliers in each set of feature descriptors. A pruning process is to remove feature descriptors based on large Hamming distance or L2 norm.

For example, a Hamming distance is used for binary feature descriptors, and an L2 norm is used for continuous feature descriptors. Each set of feature descriptors can be individually pruned, e.g., removing the feature descriptors within the sets of feature descriptors if the Hamming distances or the L2 norm greater than a threshold value.

Operation 1340 optionally prunes sets of feature descriptors having a number of descriptors less than a threshold value. The number of feature descriptors in the sets of feature descriptors can have a distribution, with the largest number of feature descriptors being the number of images in the stack of images. The sets of feature descriptors can be pruned based on the distribution of the number of feature descriptors. Sets of feature descriptors having number of feature descriptors less than a threshold value, e.g., a threshold value for number of feature descriptor, or a number of feature descriptor threshold, or simply a number threshold, are removed. Only sets of feature descriptors having number of feature descriptors equal or greater the threshold value are saved to form synthesized feature descriptors for the features.

Operation 1350 synthesizes the feature descriptors in each set of pruned feature descriptors. The synthesis process can be an average process or a modified average process for the feature descriptors in each set of pruned feature descriptors, with or without considerations for constraints or limitations of the feature descriptors, such as subjected to constraints or limitations of the feature descriptors. The synthesis process can be a concatenation process for the feature descriptors in the set of feature descriptors.

The feature descriptors in each set of feature descriptors, after optionally being clustered to evaluate the similarity between them, and after optionally being pruned to remove outlier sets of descriptors, are synthesized to form a representative feature descriptor, e.g., a feature descriptor that can represent the feature across the stack of images formed with multiple illumination patterns.

The synthesizing process can be an average process or a modified average process, depending on the limitations, constraints, or weights of the individual keypoints descriptors. The clustering, pruning, and synthesizing processes can use a distance measure on the feature descriptors, with appropriate data type, such as Hamming distance for binary descriptors, and L2 distance for continuous descriptors.

For binary feature descriptors, a synthesized feature descriptor can be formed by minimizing the Hamming distances to other feature descriptors. Let Z be the synthesized feature descriptor, and k the dimensionality of the descriptor space. For N descriptors, Z is the argument that minimizes the Hamming distance between Z and every descriptor.

$$Z = \underset{x \in \{0,1\}^k}{\mathrm{argmin}} \left( \sum_{i=1}^{N} \|x \otimes F_i\| \right)$$

Here the encircled symbol represents an XOR operation.

For continuous feature descriptors, a synthesized feature descriptor can be formed by minimizing the L2 norm to other feature descriptors. Let Z be the synthesized feature descriptor, and k the dimensionality of the feature descriptor space. For N feature descriptors, Z is the argument that minimizes the L2 norm between Z and every feature descriptor.

$$Z = \underset{x \in \mathbb{R}^k}{\mathrm{argmin}} \left( \sum_{i=1}^{N} \|x - F_i\|_2 \right)$$

After the synthesis step, each feature can be described by a synthesized descriptor. The synthesized descriptors can be used for different applications such as depth detection and defect detection, in addition to image stitching. The synthesized descriptor can be more robust to changes in illumination as compared to features extracted from a single image or from a series of images in video.

In some embodiments, the features extracted from the mages can be used to perform image stitching. Synthesized feature descriptors can be calculated from the images captured by different cameras of the camera array. A matching process can be performed to match the feature descriptors. After matching, the images having matched descriptors can be positioned so that the matched descriptors are overlapped. The positioning can include image transformations to obtain overlapping descriptors.

FIGS. 14A-14C illustrate a stitching process for two images according to some embodiments. Image 1400A can have multiple features 1411A and 1412A. Image 1400B can have multiple features 1411B and 1412B. The features can be compared, for example, feature 1411A can be matched with feature 1411B. Features 1412A and features 1412B have no matched features. The two images 1400A and 1400B can be positioned to have overlapped features 1411A and 1411B, forming a large image having two images 1400A and 1400B stitched together.

In some embodiments, the method of feature extraction is used, for example, for image stitching, in a computational microscope system that reconstructs images using multiple cameras, multiple illumination patterns, and computational post-processing. The computational microscope system typically employs an array of micro cameras, and is also known as a micro-camera array microscope (MCAM) system. Details about the MCAM system can be found in patent application Ser. No. 16/066,065, filed on Jun. 26, 2018, hereby incorporated by reference in its entirety.

The MCAM system can be viewed as a group of multiple individual microscopes tiled together in an array to image a large sample. The individual microscopes can be configured into a micro camera package, e.g., forming a tightly packed array of micro-cameras with high resolution (5-10 µm) over a large area (hundreds of square centimeters). The images taken from the individual micro cameras, which include overlapped image patches of the sample, can be stitched together to form the image of the sample.

The MCAM system can include a programmable illumination system, such as a large array of light sources, with individual light sources or groups of light sources capable of being controlled separately, for example, by a controller. The light sources can be visible light sources, infrared light sources or ultraviolet light sources such as light emitting diodes (LEDs) or lasers with appropriate wavelengths. The illumination system can be placed below or above the sample, to provide transmissive or reflective light to the micro cameras.

It is an innovative feature of the MCAM system that uses multiple micro-cameras to capture light from multiple sample areas, with each micro camera capturing light from a sample area sequentially from multiple patterned illumination configurations provided on the same sample area.

The illumination system can provide the sample with different illumination configurations, which can allow the micro cameras to capture images of the sample with different light angles and wavelengths. The illumination angle and wavelength are an important degree of freedom that impacts specimen feature appearance. For example, by slightly changing the incident illumination angle, a standard image can be converted from a bright field image into a phase-contrast-type image or a dark field image, where the intensity relationship between the specimen and background is completely reversed.

Further, by providing the sample with different light angles and wavelengths, both intensity and phase information of the received illumination can be recorded, which can allow the reconstruction of the image, for example, with higher resolution. The MCAM system can offer size, weight, complexity, and cost advantages with respect to standard microscopes. The MCAM system does not require any moving parts, with its micro-cameras fit within a compact space without requiring a rigid support structure and can thus operate within a small, confined space.

In some embodiments, the feature extraction process using a set of images of a substrate area captured by a camera under multiple illumination patterns is used in a computational microscope such as an MCAM system. The feature extraction process can be specifically well-suited for applications in the MCAM system, since the MCAM system also generates sets of images of overlapped substrate areas captured by cameras of a camera array under multiple illumination patterns.

The MCAM system is in effect an array of multiple microscopes tiled together in an array to image a large sample. By miniaturizing the general format of a microscope into a small "micro-camera" package, it is possible to create a tightly packed array of micro-cameras to enable high resolution over a large area. This setup also includes a large array of light emitting diodes (LEDs), which can be individually controlled via electronics and forms our programmable illumination system. The LEDs are placed below, above, or both below and above a sample. Multiple images of different overlapped areas of the sample can be captured by the micro-camera package under different illumination conditions to find and utilize illumination-invariant features.

The features extracted from the images acquired by the MCAM system can be used for stitching together the images captured by each individual micro-camera. Image stitching or photo stitching is the process of combining multiple photographic images with overlapping fields of view to produce a segmented panorama or high-resolution image. Commonly performed through the use of computer software, most approaches to image stitching require nearly exact overlaps between images and identical exposures to produce seamless results. Using the illumination-invariant features that are extracted from the present set-of-images feature extraction process can improve the stitching process, as compared to using features extracted from a single-image feature extraction process.

Further, the present feature extraction process can be used to identify features, for example, to help crop videos to specific regions-of-interest to reduce the amount of saved image data. Accordingly, the present high-quality detection and extraction of illumination-invariant features presents a high priority advantage, especially in computational microscope design and operation.

Figure 15A:
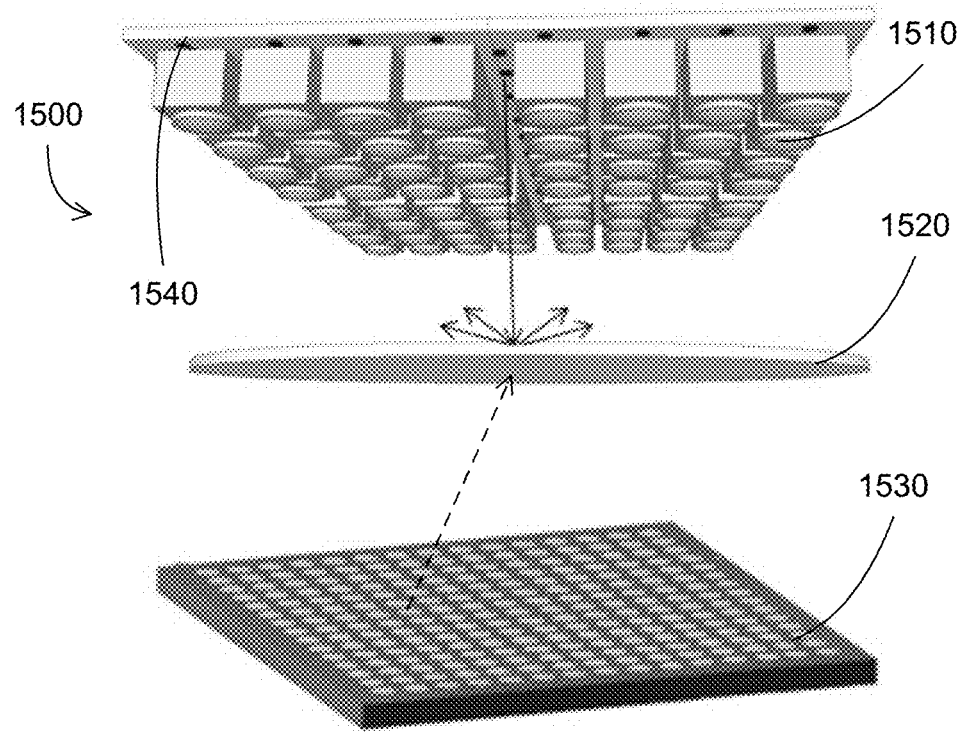
FIGS. 15A-15B illustrate a schematic MCAM system according to some embodiments.
Figure 15B:
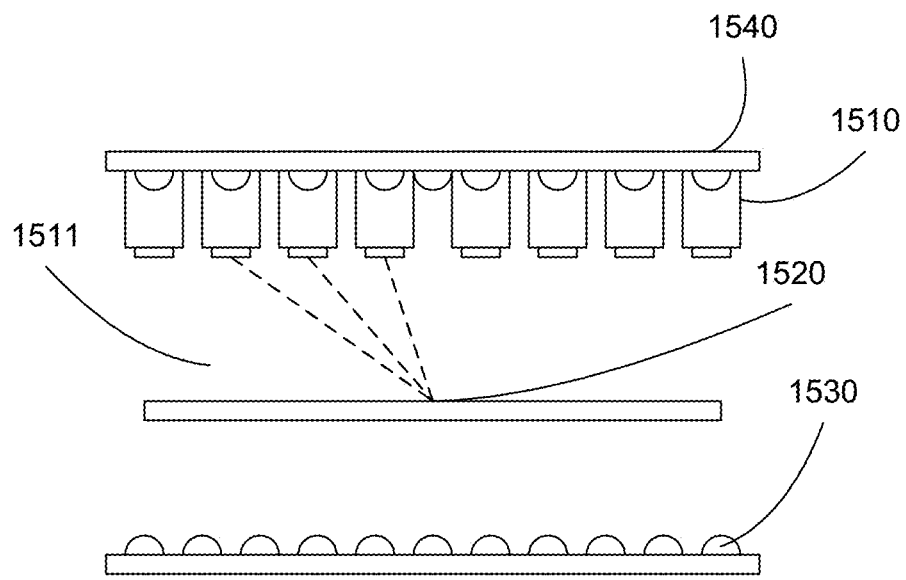

FIGS. 15A-15B illustrate a schematic MCAM system according to some embodiments. FIG. 15A shows a perspective view and FIG. 15B shows a cross section view of major components of an MCAM system 1500.

The MCAM system 1500 can include an array of micro-cameras 1510 and a patterned illumination source 1530 and 1540 for microscopic imaging. The micro-cameras 1510 are configured to image partially overlapping field of views (FOV) 1511 of image areas of a sample 1520. The patterned illumination source 1530 and 1540 can be configured to shine light on the sample 1520 from a plurality of angles and spatial patterns, so that the spatial-angular distribution of light reaching the sample changes over time. At each illumination pattern in the spatial-angular distribution of light generated from the illumination source 1530 and 1540, each micro-camera can acquire an image. The set of images acquired from the micro-cameras for the image areas for the illumination patterns can be processed to form an image reconstruction of the sample. The image reconstruction can also offer at least a measure of sample depth, spectral (i.e., color) properties, or the optical phase at the sample plane.

The illumination source can include a bottom set of light sources 1530, a top set of light sources 1540, or both bottom and top sets of light sources 1530 and 1540. The illumination source can provide illumination patterns to the sample 1520 of the MCAM system 1500, in which there is either a transmission illumination through the bottom set of light sources 1530, or a reflection illumination through the top set of light sources 1540, disposed near the micro cameras. The illumination source can also provide a dual illumination geometry, in which there are a transmission illumination through the bottom set of light sources 1530, and a reflection illumination through the top set of light sources 1540.

Figure 16A:
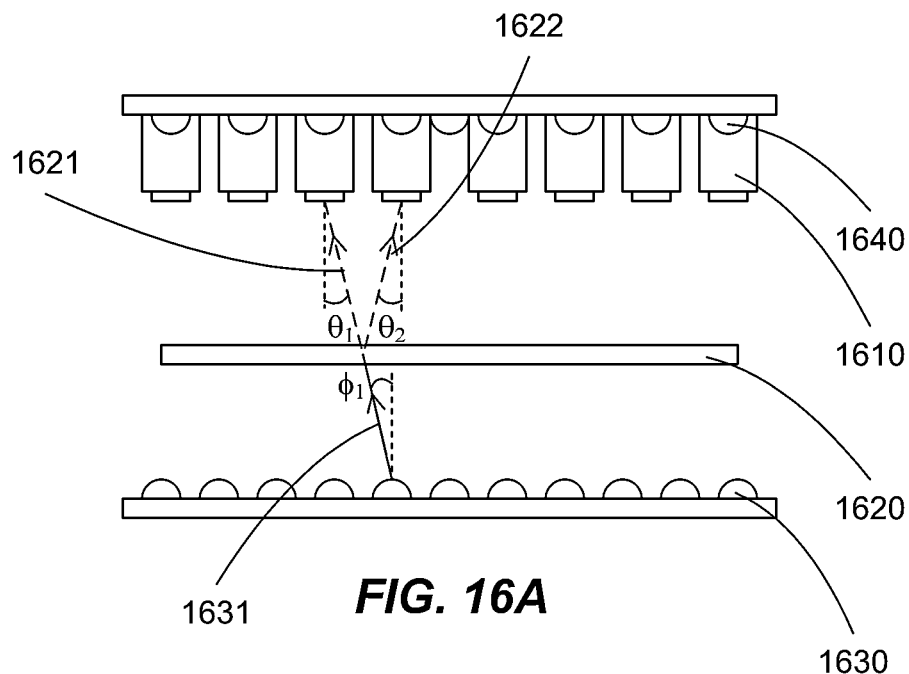
FIGS. 16A-16B illustrate configurations of different patterns of an illumination source according to some embodiments.
Figure 16B:
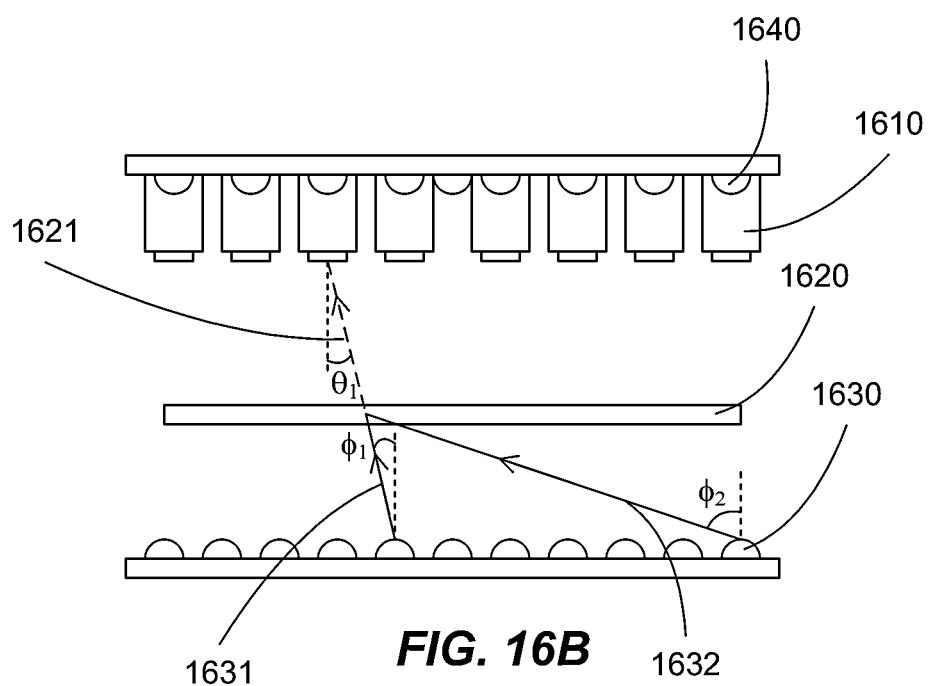

FIGS. 16A-16B illustrate configurations of different patterns of an illumination source according to some embodiments. An MCAM system can have a sample 1620 disposed under an array of micro-cameras 1610. Light illumination sources 1630 and 1640 are disposed under and above the sample 1620, respectively.

Light from a sample area can reach the cameras that are configured to see the sample area, e.g., the area is within the FOV of the cameras. For example, in the sample area that is overlapped by two adjacent cameras, light from the sample area can be captured by these cameras.

FIG. 16A shows a light beam 1631 generated from the light illumination source 1630 in an illumination pattern, which contains only the light beam 1631. The light beam 1631 can pass through the translucent or transparent sample 1620, to reach the camera array 1610. For example, after passing the sample, the light beam can reach two adjacent cameras with rays 1621 and 1622, if the cameras are configured so that the sample area is within the FOV of the two cameras. Other cameras are positioned so that the light beam from the sample area is outside of their FOV, and thus does not reach the detector area of the cameras.

The ray 1621 can reach a camera with a same angle as the beam 1631 generated from the light source, thus can contribute to a bright field image on the camera. The ray 1622 can reach another camera with a different angle compare to the beam 1631, thus can contribute to a dark field image on the other camera. Thus, while ray 1622 originates from the spatial location at the sample area as ray 1621, it contains a different type of angular information for different cameras. Similar image capturing processes can occur for different areas of the sample on different cameras. Thus, from an illumination pattern, such as a pattern with one light source that shines on the whole sample, each camera of the camera array can capture a different area of the sample with different characteristics.

Different light beams from the illumination source, for example, in different illumination patterns, can reach a same camera after passing through a same sample area. For example, a light source can provide a bright field image of the sample area to the camera, while another light source can provide a dark field image of the same sample area to the same camera.

FIG. 16B shows two light beams 1631 and 1632 generated from two different illumination patterns, with one pattern forming a bright field and one pattern forming a dark field of a same sample area to a same camera. Thus, while a same ray 1621 reaches the camera, it contains a different type of angular information in different illumination patterns, such as bright field information in the light beam 1631 from one illumination pattern and dark field information in the light beam 1632 from another illumination pattern. The difference in information captured by the camera array generated by different illumination patterns can be used by the MCAM system to improve image resolution and detect depth.

In operation, multiple illumination patterns can be sequentially provided, and the camera array can capture images of the sample at each illumination pattern. For example, the MCAM illumination source can include an LED array. One LED within the LED array can be illuminated at a time and an image is captured from each and every micro-camera in the micro-camera array. For n micro-cameras and k LEDs, the MCAM system can capture and save a total of n×k images, with k images taken by a same camera viewing at a same area of the sample. The k images of a same sample area can contain information from reflective or transmissive light together with scattered light, which can allow a reconstruction of the image of the sample area in higher resolution or with depth information.

In some embodiments, the MCAM system can be configured to perform a feature extraction process on the images captured by the camera array under the multiple illustration patterns. Due to the possible artifacts generated by some illumination patterns and captured by the camera array, the present feature extraction process uses a feature extraction process on the images captured under multiple illustration patterns, which can allow the computer to find robust features, for example, through a clustering and pruning step to remove noise and artifacts.

Figure 17:
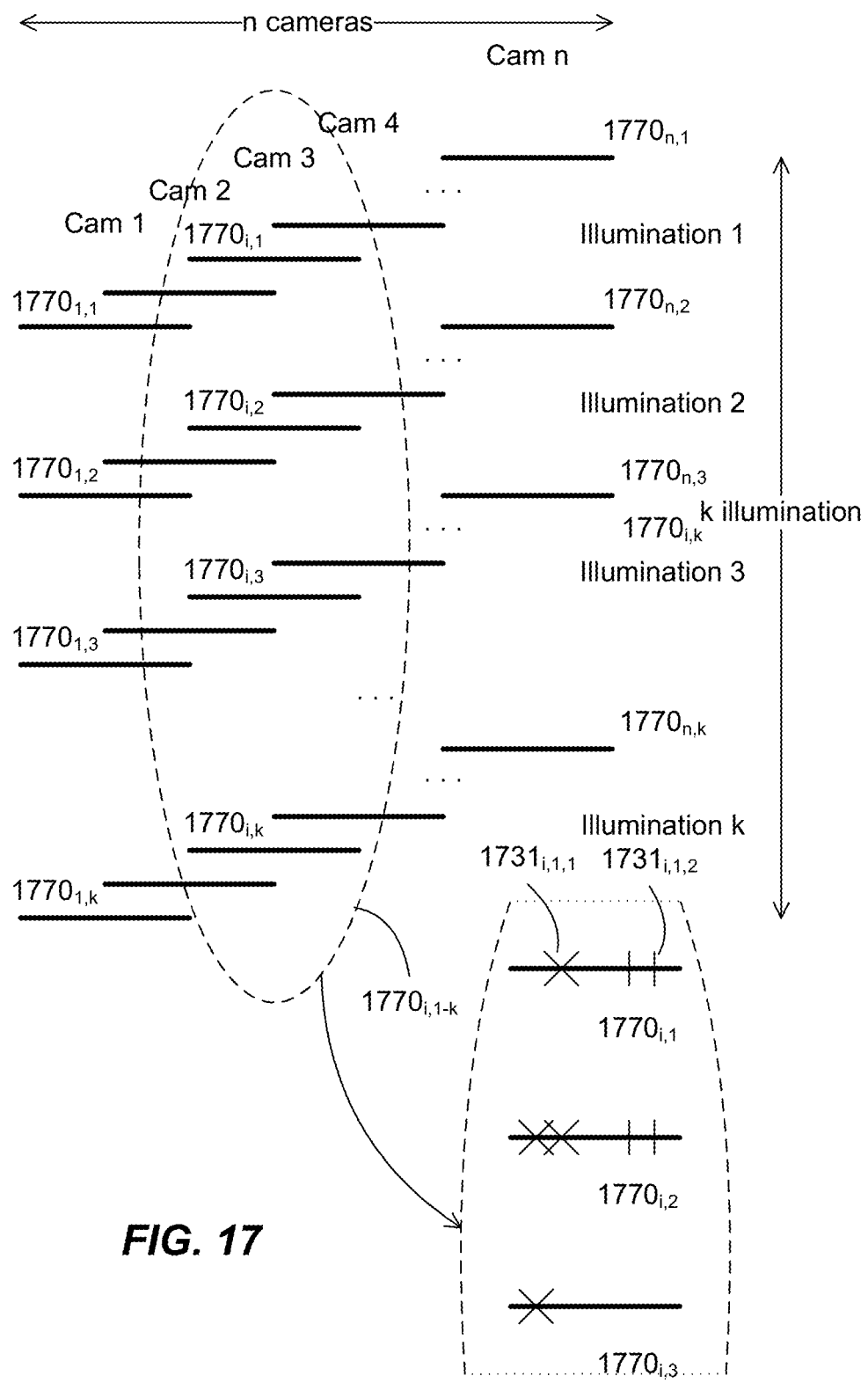
FIG. 17 illustrates images taken by a camera array of the MCAM system according to some embodiments.

FIG. 17 illustrates images taken by a camera array of the MCAM system according to some embodiments. There are images $1770_{1-n, 1-k}$ for all images taken by n cameras of a camera array of the MCAM system, under k illumination patterns generated by an illumination source of the MCAM system. Thus, there can be n×k images.

The images can be groups into multiple sets of images, with each set of images $1770_{i,1-k}$ including images captured by a camera i. Thus, there can be n sets of images $1770_{i,1-k}$, with camera i ranging from camera 1 to camera n. There are k images in each set of images $1770_{i,1-k}$.

As disclosed above, the feature extraction process can be applied to a set of k images, taken from a same camera using a same view point to a sample area, but under k different illumination patterns. The feature extraction process can include a first step of keypoint detection, followed by a step of feature description.

In some embodiments, blob response function can be preferred over corner response function, due to the additional characteristic of scale invariance, meaning a blob feature can still be detected for enlarged images, while a corner feature is not. However, a blob response function is more time consuming, due to the evaluation of a blob response function on multiple scales of the image. The keypoint detection process can use a corner response function, a blob response function, or any other keypoint detection function.

In some embodiments, the present invention discloses using a corner response function applied across the sets of k stack of images. The corner response function is not scale invariant, but with the images taken from the camera array calibrated, there is minimum variation in the scale between the images.

The corner response function applied to each image of the k stack can yield pixel coordinates that are likely the location of corners. Since the viewpoint has not changed (sample is unmoving and cameras cannot move), the correspondence is exact between each image $1770_{i,j}$ in a set of k-stack of images $1770_{i,1-k}$ for camera i. This can allow the detected keypoints to be clustered and pruned using statistical clustering algorithms across the entire k-stack.

By using statistical clustering across the entire stack, the keypoints which are illumination-specific (that is, only appear within a small number of images within the k-stack) can be eliminated as noise. In some embodiments, clustering is achieved by searching for at least N detected corresponded keypoints in a k stack, with N less than the k total number of images in the k-stack. This strategy is adopted using the logical assumption that if a keypoint is not present under a wide variety of illumination scenarios, that particular keypoint will not reliably be reconstructed (i.e., found by the keypoint detector, or detected by the sensor) from a camera with a different viewpoint. Thus, if a keypoint does not present in at least N images, the keypoint can be removed, e.g., pruned.

For example, using a corner response function, or other feature detecting function, on image 1 taken from camera i, e.g., image $1770_{i,1}$, there can be $m_1$ keypoints found, labeled from 1 to $m_1$. Continuing on other image 2 to k for the same stack, e.g. for images $1770_{i,2-k}$, there can be $m_2$-$m_k$ keypoints found for images $1770_{i,2-k}$, respectively. The number of keypoints $m_1$-$m_k$ found on the k stack for camera i can be different, e.g., there are keypoints found on some images and not on some other images.

Since the correspondence is exact between each image in a set of k-stack of images $1770_{i,1-k}$, the keypoints in the k stack, e.g., $m_1$-$m_k$ keypoints in k images of the k stack, can have exact pixel correlation, meaning there can be a total of M detected keypoints in the k stack. The numbers of keypoints $m_1$-$m_k$ are subsets of the M keypoints.

A histogram of the appearance of the M keypoints, e.g., the number of keypoints appearing in the k stack v. the keypoint numbers from 1 to M, can be used for pruning. For example, keypoint #1 of M can appear in all images of the k stack, or the number of appearance of keypoint #1 is k. Keypoint #2 of M can be missing in images 3 and 6 of the k stack, or the number of appearance of keypoint #2 is k−2. In general, keypoint #g of M can be missing in h images of the k stack, or the number of appearance of keypoint #g is k-h.

The clustering and pruning process can be performed for removing the keypoints (among the M keypoints of the k stack) that have the number of appearance less than N. For example, N can be less than 95%, less than 90%, less than 85%, less than 80%, less than 75%, less than 370%, less than 65%, less than 60%, less than 55%, or less than 50% of k, or of the number of images in the k stack, or of the number of illumination patterns.

Since the removed keypoints do not appear in many of the images of the k stack, the removed keypoints are considered to be not invariant with respect to the illumination changes, and thus should be removed to create a more robust cluster of keypoints.

By pruning non-robust key points away, subsequent use of keypoint for more accurate camera-to-camera correspondence within our MCAM device, for example, is made easier and the chances of an erroneous camera-to-camera correspondence are reduced.

Once a keypoint has been extracted via the procedure outlined above, it needs to be described via a compact numerical descriptor, termed a feature descriptor. The feature description process takes in an image area, which is centered at the keypoint pixel location and extending outward for more than one pixel. The feature description process can return a high dimensional vector which represents an encoding of the image area. The vector is constructed such that it is invariant across common, naturalistic image transforms. These can include viewpoint change and naturalistic lighting changes.

Feature descriptors are created for each keypoint in the pruned cluster in each image of the k-stack. The feature descriptors can include scale information, which can be calculated based on the pixel area of the image area represented by the keypoints. The feature descriptors can include orientation information, which can be calculated based on the gradients of the pixels in the image area represented by the keypoints. The orientation information can be represented by a single vector, which is the average of all pixel gradient vectors in the image area center at the keypoint location. The orientation information can be represented by a vector distribution, which is the distribution of the pixel gradient vectors in the image area center at the keypoint location. The vector distribution can include multiple vectors pointing in different directions. For example, a histogram of pixel gradient can be calculated, and an orientation vector at each local peak of the histogram can be formed. The collection of the orientation vectors at local peaks of the histogram can form the vector distribution that serves as the orientation of the feature descriptor.

The orientation information can be represented by a multiple vectors at multiple sub-areas of the center of the image area represented by the keypoint. For example, the image area can be subdivided into multiple sub-areas, such as 4 sub-areas or 16 sub-areas. The vector at each sub-area can be calculated to provide 4 or 16 orientation vectors for the keypoint. Alternatively, the vector orientation at each sub-area can be calculated, for example, by performing a histogram of pixel gradients for each sub-area, to provide a collection of orientation vectors for each sub-area of the 4 or 16 sub-areas.

Once feature descriptors, e.g., vectors having location, scale, and orientation representing the keypoint areas, have been constructed for each keypoint at each image of the k stack, an optional round of descriptor clustering and possible pruning can be performed on the feature descriptors in each k-stack. The clustering process can be performed by computing a similarity metric per descriptors between the feature descriptors in each image of the k-stack.

It is an innovative feature of the present feature extraction to cluster the feature descriptors. While the feature descriptor is designed to be invariant across lighting conditions, this invariance can break down for microscope images captured under variably-illuminated patterns. Accordingly, by comparing feature descriptors representing the exact same spatial location, but captured under various different lighting conditions, the descriptor clustering and possible pruning process can test this invariance, and can remove descriptors not meeting the invariance criterion.

The similarity metric between descriptors can be a distance comparator, such as a Hamming distance for binary descriptor vectors or an L2 norm for continuous descriptor vectors. The feature descriptors can be clustered based on the Hamming distance or the L2 norm, e.g., the descriptors having small Hamming distance or L2 norm are clustered next to each other, while the descriptors having large Hamming distance or L2 norm are far apart. The clustering of feature descriptors can allow a verification of illumination invariance, with a closely descriptor cluster possessing illumination invariance and spread out descriptor cluster not possessing illumination invariance.

The descriptor cluster can be optional pruned, for example, to remove descriptor not meeting the illumination invariant characteristic. The descriptor pruning process can be a two step process. In the first step, for each descriptor in an image, a distance threshold can be set for the distance comparator between corresponded feature descriptors in each image of the k-stack. The feature descriptors in the k stack having the distance comparator less than this distance threshold are saved, and the remaining feature descriptors in the k stack are discarded. The distance threshold can be less than 5%, less than 10%, less than 15%, less than 20%, less than 25%, less than 30%, less than 35%, less than 40%, less than 45%, or less than 50% of the magnitude of a feature descriptor. For example, descriptor #1 in image #1 of the k stack, e.g., $KP_{1,1}$, is first considered. The distance comparator between all descriptors #1 in all k images of the k stack, e.g., $KP_{1,1-k}$, is computed. Only descriptors that have distance comparator less than the distance threshold value are saved, and other descriptors are discarded. For example, 3 descriptors in images 3, 7, and 9 in the k stack are discarded because of large distance comparator. The number of saved descriptors is thus k−3, e.g., $KP_{1,1-2}$, $KP_{1,4-6}$, $KP_{1,8-k}$.

The maximum number of saved descriptors is k, meaning all corresponded descriptors within the k stack are all saved, e.g., all feature descriptors in the k stack are close to each other, with the distance comparator less than the distance threshold. In this case, the saved descriptors are $KP_{1,1-k}$.

The minimum number of saved descriptors is 0, meaning all corresponded descriptors within the k stack are all discarded, e.g., all feature descriptors in the k stack are well separated from each other, with the distance comparator greater than the distance threshold.

In the second step, the descriptors with a large number of saved feature descriptors will be kept. This means that the descriptors having a number of saved feature descriptors less than a descriptors threshold will be pruned or discarded. The descriptors threshold can be less than 5%, less than 10%, less than 15%, less than 20%, less than 25%, less than 30%, less than 35%, less than 40%, less than 45%, or less than 50% of the number of images in a k stack or the number of illumination patterns. For example, if the descriptor threshold is 30%, then the descriptors having the number of saved descriptors less than 30% of the number of images in the k stack will be pruned. Since the discarded descriptors only being saved in less than 70% of the images, e.g., in less than 70% of the illumination patterns, this implies that the discarded descriptors are not invariant to illumination changes. Since the kept descriptors are being saved in greater than 70% of the illumination patterns, this implies that the kept feature descriptors are similar to one another, which indicates a high correspondence across lighting conditions, or illumination invariant.

After obtaining the sets of pruned descriptors for each descriptor in the images in the k stack, the feature descriptors can be synthesized to form synthesized feature descriptors, which can be considered as the feature descriptors for the features detected by the keypoint detection process and described by the feature descriptor process. The synthesis process can be dependent on the type of feature descriptor used, such as binary descriptors or continuous descriptors. The synthesis process can be considered as an average process or a modified average process, e.g., an average process modified by considering the constraints and limits of the descriptors. For example, the synthesis process for binary descriptor vectors, which are constrained to have only 0 and 1, is not an exact average process. Similarly, if there are other constraints, the synthesis process will not be a direct average process.

After the feature synthesis process, there is a set of synthesized feature descriptors, with the feature descriptors representing features in an image area $1771_{i,j}$ of the images taken from camera i of the camera array. As shown, there are synthesized feature descriptors $1731_{i,1,1}$ and $1731_{i,1,2}$ for image $1770_{i,1}$.

The synthesized feature descriptors can be more robust to changes in illumination as compared to feature vectors extracted from a single image, such as from standard microscope images. The synthesized feature descriptors can be used for different applications including depth detection, defect detection, or image stitching.

Within the k stack, each image in the k stack has pixelwise correspondence, meaning the images is from a same sample area, taken by a same camera, positioned at a same view point, with the difference being the images taken in different illumination patterns. Therefore, the synthesized feature descriptors in an image of the k stack can represent the distinguished features found in images taken by a camera, e.g., images of a single sample area.

The synthesized feature descriptors can be used for stitching images taken from cameras in a camera set in the MCAM system. The stitching process involves finding correspondence between the k stacks, e.g., from one camera to another camera, or from one sample area to another sample area. Image matching is an important concept in computer vision and object recognition. Images of the same item can be taken from any angle, with any lighting and scale. This, together with possible image occlusion, can cause problems for recognition. Therefore, it is important to find descriptive and invariant features, such as synthesized descriptors, in order to categorize the images.

Image stitching can first relate pixel coordinates in one image to pixel coordinates in another image to align the two images. The pixel correlation can include direct pixel-to-pixel comparisons and pixel gradient descent, together with other optimization techniques. Distinctive features can be found in each image and then efficiently matched to rapidly establish correspondences between pairs of images.

The stitching process can include finding matched pairs of features, e.g., of synthesized feature descriptors, in different images. To match synthesized feature vectors, a distance metric, such as the Hamming distance or the L2 norm, can be computed for inter-image feature pairs. The matching candidates can be ranked and the best matched features can be found using the distance metric, In addition, if the sample being imaged is flat, an affine transformation can be assumed to be a suitable transformation to apply to each image before image stitching, to ensure the final stitched result is high-quality. Using knowledge of the restrictions from the transform, a final denoising step can be applied. For example, RANSAC can be used to find a set of points that agrees upon the transform through random sampling of the matching point set. Using the features matches and optionally the geometric transform restrictions, pixel correspondence can be found to perform image stitching.

Figure 18A:
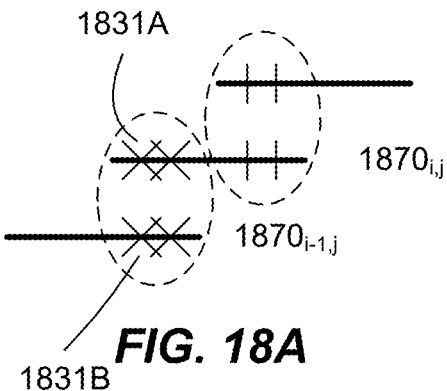
FIGS. 18A-18B illustrate a stitching process for images captured in an MCAM system according to some embodiments.
Figure 18B:
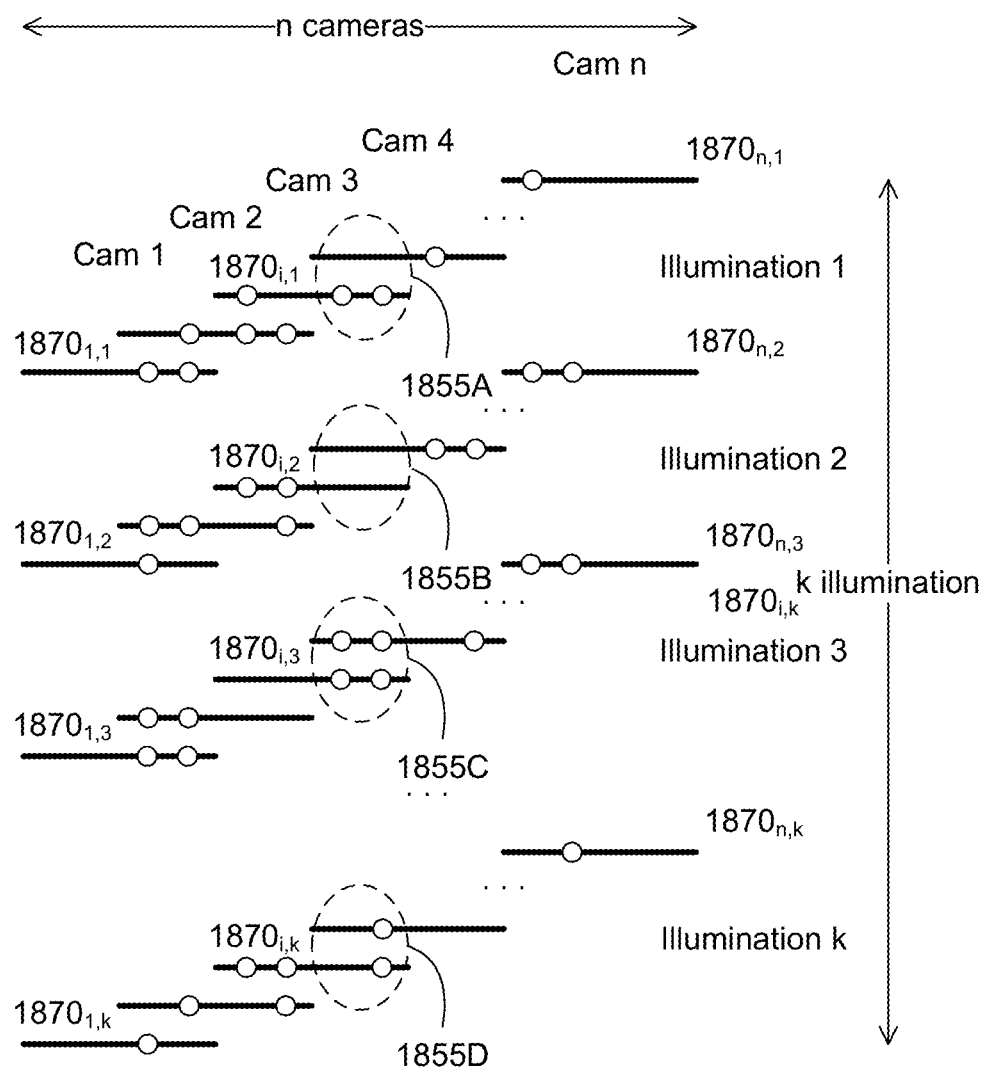

FIGS. 18A-18B illustrate a stitching process for images captured in an MCAM system according to some embodiments. Camera i-1 and camera i can see one or more features of the sample. From each camera, synthesized descriptors can be computed for the features, e.g., one synthesized descriptor for one feature, such as feature 1831A for a feature in image $1870_{i-1,j}$ captured by camera i-1, and feature 1831B for a feature in image $1870_{i,j}$ captured by camera i.

If two synthesized descriptors 1831A and 1831B in two images $1870_{i-1,j}$ and $1870_{i,j}$ captured by two cameras i-1 and i, respectively, are similar, for example, according to a distance metric, the features can be matched, and the image coordinates associated with each synthesized descriptor are used for image stitching.

All images captured by n cameras under k illumination patterns are stitched together using the synthesized feature descriptors calculated as above. A synthesized feature descriptor is determined for a set of images captured by a camera under multiple illumination patterns. Thus, in some embodiments, the feature matching is performed on sets of images, and not on individual images. In other words, even though a feature described by a synthesized feature descriptor is not present in an image, the image can still be stitched with another image based on the locations of the synthesized feature descriptor.

For example, each set of images $1870_{1-n,j}$ can be stitched together to form a large image of the whole sample, e.g., images of areas captured by cameras 1-n of the n camera array are stitched together according to matching feature descriptors to form a complete image of the sample. In total, there are k sets of complete images of the whole sample.

For example, the stitching of two images, such as the stitching 1855C of images $1870_{i,3}$ and $1870_{i+1,3}$ can be based on the features on the images, as determined by the synthesized descriptors for the sets of images $1870_{i,1-k}$ and $1870_{i+1,1-k}$. The stitching of two images, such as the stitching 1855A of images $1870_{i,1}$ and $1870_{i+1,1}$ can be based on the features on one image. The stitching of two images, such as the stitching 1855B of images $1870_{i,1}$ and $1870_{i+1,1}$ can be based on the features of the sets of images. The stitching of two images, such as the stitching 1855A of images $1870_{i,1}$ and $1870_{i+1,1}$ can be based on a smaller number of features on two images.

The sets of complete images can be partitioned into patches, which are small areas of the images. The patches can be used for the calculation of a fused image from all the images captured by the cameras. The patches can be smaller than the image areas captured by the cameras to allow reconstruction of the fused images from the patches with good approximation.

Figure 19:
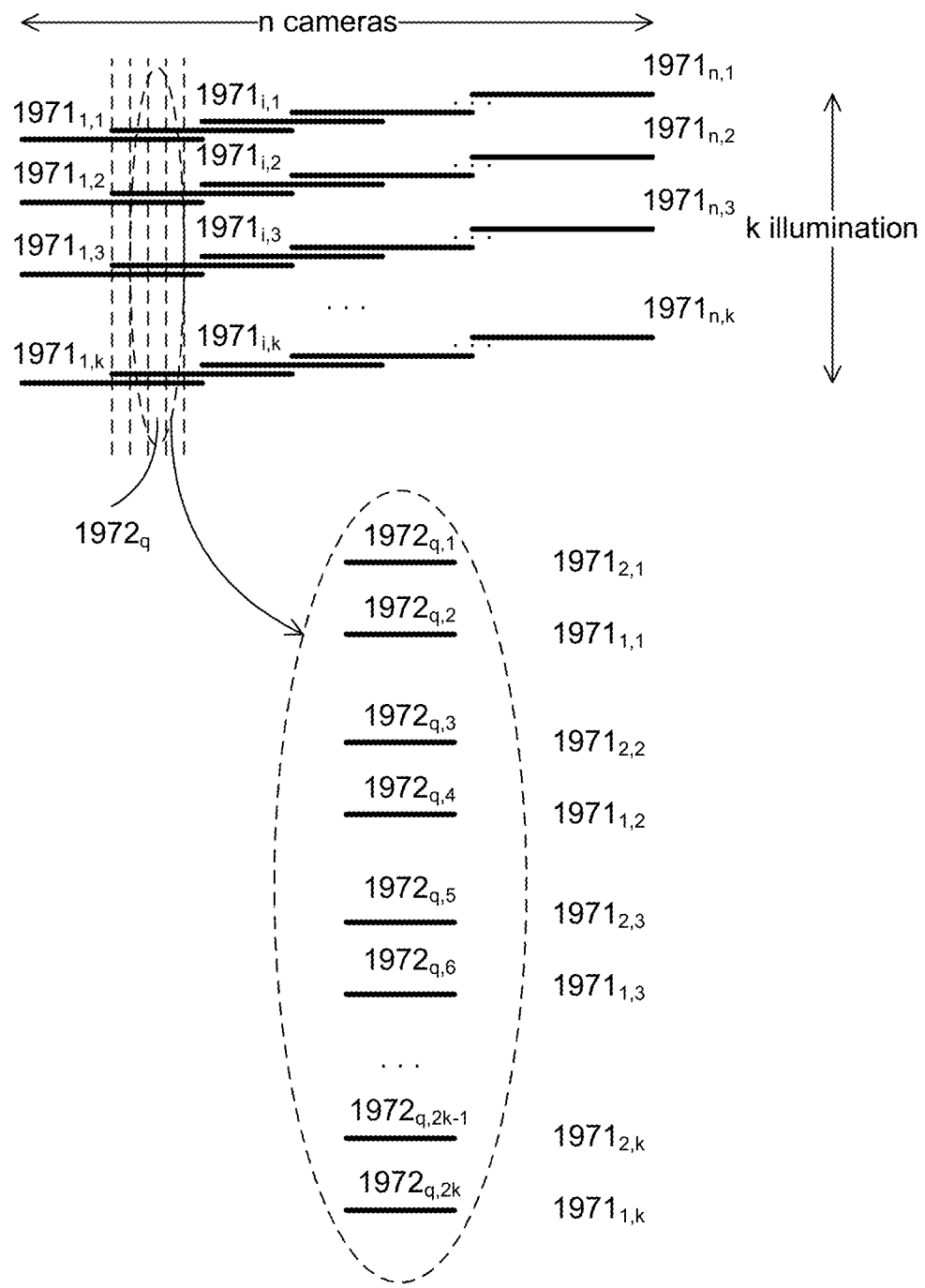
FIG. 19 illustrates a set of patches according to some embodiments.

FIG. 19 illustrates a set of patches according to some embodiments. The n×k images captured by n cameras under k illumination patterns can be stitched together to form k complete images of the whole sample. Each complete image includes n images $1971_{1-n,j}$, with j being the illumination pattern j among the k illumination patterns.

The complete images can be partitioned into p patches $1972_{i-p}$, with a patch $1972_q$ being a small area of the complete image of the sample. As shown, each partition in a complete image can include one or more patches, typically 2 patches for two overlapping areas from 2 adjacent cameras.

Each patch of the complete image can include multiple sets of k images, e.g., the patch can include k images from a camera, plus other k images from other cameras that capture the same overlapped area containing the patch. The multiple images of a patch can form a set of patches, which shows a same image area representing by the patch. For example, a set of patches can include patches $1972_{q,\ 1-2k}$, with a first patch $1972_{q,1}$ being partitioned from image $1971_{2,1}$, a second patch $1972_{q,2}$ being partitioned from image $1971_{1,1}$, a third patch $1972_{q,3}$ and a fourth patch $1972_{q,4}$ being partitioned from images $1971_{2,2}$ and $1971_{1,2}$, respectively, until the last patches.

Figure 20:
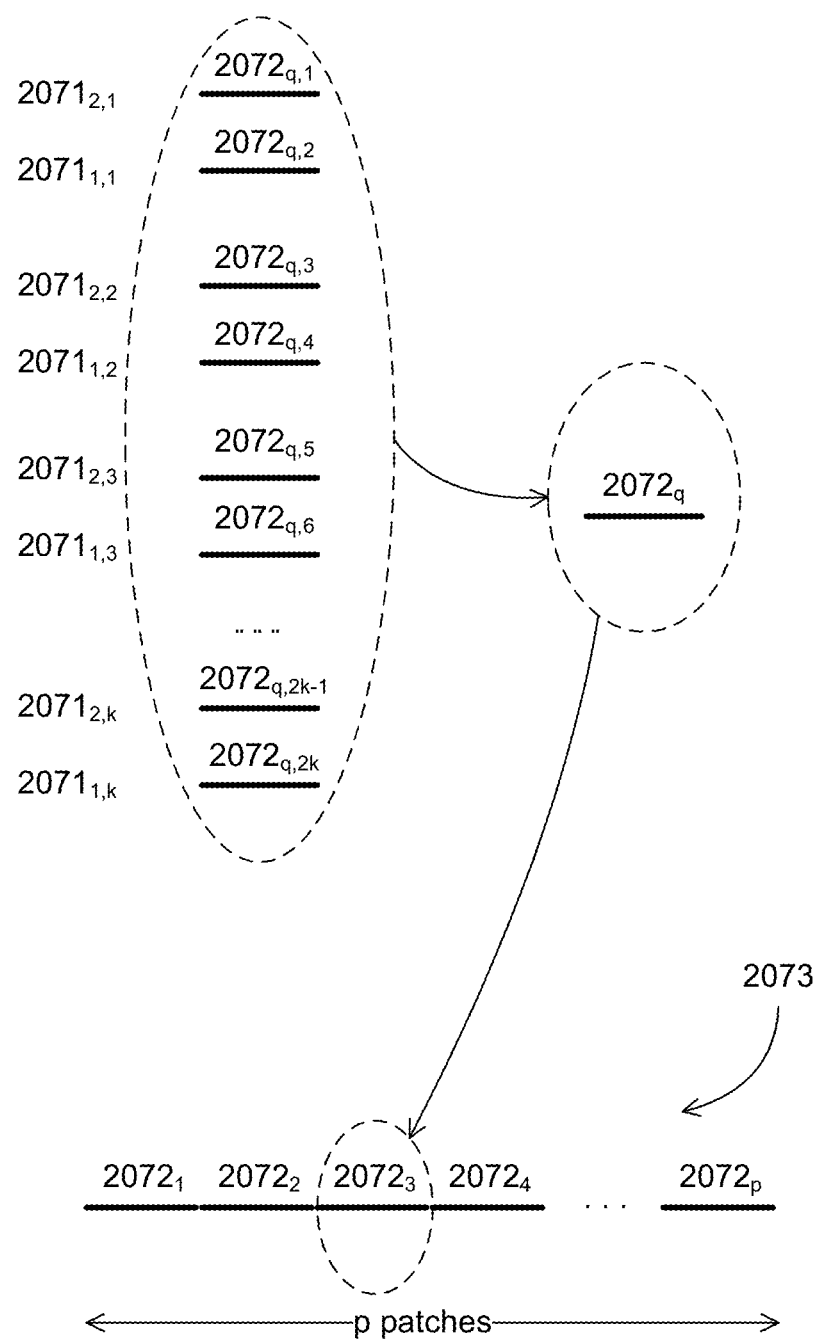
FIG. 20 illustrates a fusing operation for fusing patches according to some embodiments.

FIG. 20 illustrates a fusing operation for fusing patches according to some embodiments. The sets of patches can be fused to form sets of fused patches $2072_{1-p}$, with p being the number of patches. For example, a set of patches $2072_{q,\ 1-2k}$, for example, can be fused to form fused patch $2072_q$. After the patches are fused, the fused patches $2072_{1-p}$ are assembled together to form a final image 2073. The assembling process can be the inverse of the partition process, meaning the partition can separate the whole image into p patches number from 1 to p, with each patch having a partition coordinate. The fused patches can be placed at the portioned patches, to form a fused complete image 2073 of the whole sample.

In some embodiments, the present invention discloses a method, and a microscope system employing the method, for feature extraction in a microscope system using a camera array and an illumination source providing multiple illumination patterns to capture image of a sample. A sequence of images per micro-camera in the camera array is captured, with the illumination pattern varied between each image capture. This image sequence forms an image k-stack for each camera capturing an image area of the sample. The present feature extraction method can be performed on the image k stack for finding features of interest for the image area represented by the k-stack. These features can be used to assist with stitching together images from the micro-cameras of the camera array to form an image composite. These features can also be used for image compression, object tracking or other automated tasks.

In some embodiments, the feature extraction method can take advantage of the microscope illumination process to improve feature extraction algorithms. Specifically, since the microscope has acquired a set of images under variable illumination patterns, the feature extraction process can be performed jointly on this set of images, to provide features in a more robust and accurate manner than from performing feature extraction on just a single image.

In some embodiments, the illumination patterns of a microscope can be optimized, for example, to establish the patterns of the illumination source to allow a smallest number of illumination patterns, e.g., to obtain a smallest number of images in the k-stack, to obtain accurate stitching between the image areas. Since each illumination pattern will affect the image captured by not just one micro-camera, but instead all micro-cameras in the camera array, the effect of the illumination, such as the angle of light beam from each illumination source to the micro-cameras, can require an approach of evaluation and iteration.

Figure 21:
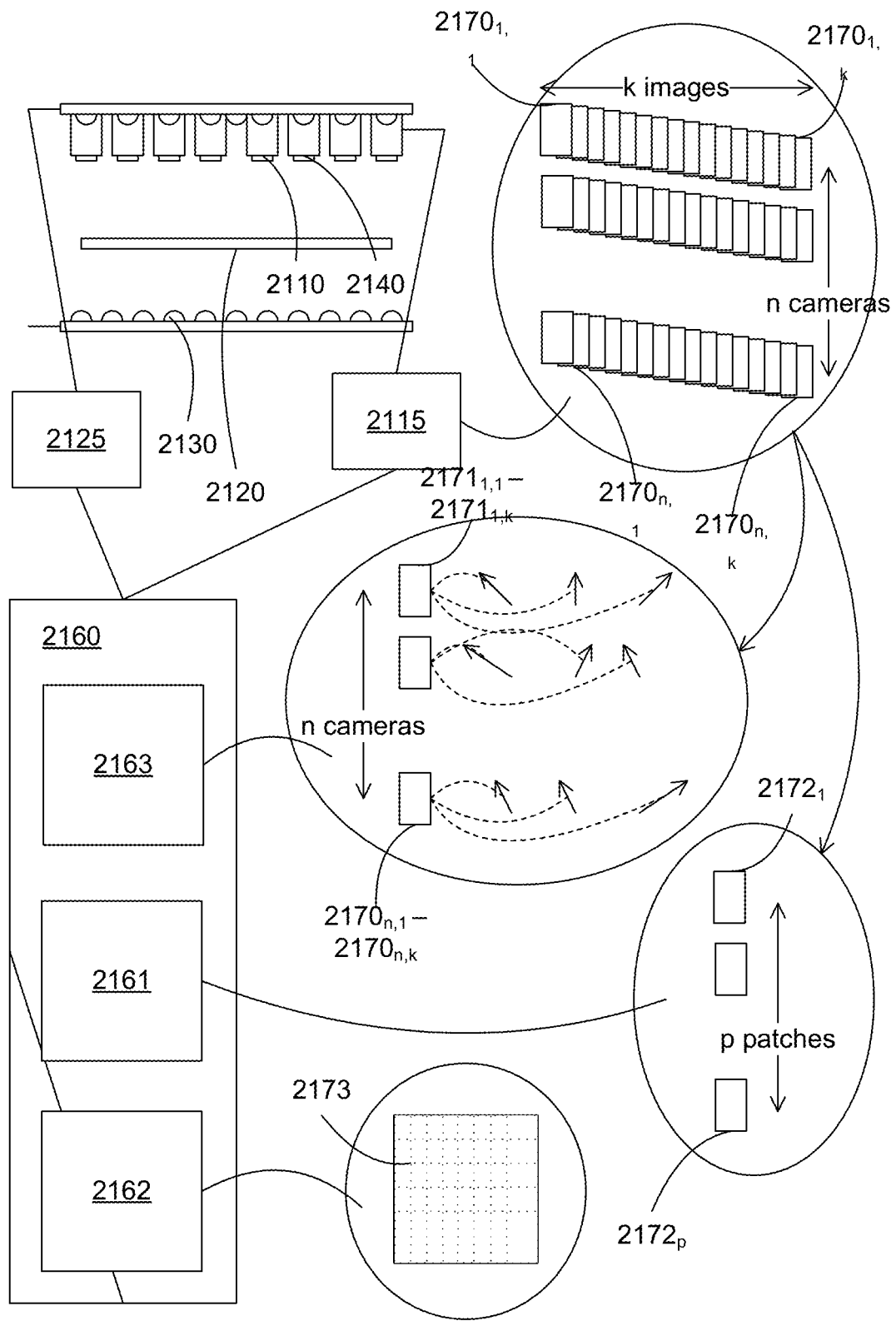
FIG. 21 illustrates an MCAM system configured with a feature extraction process according to some embodiments.

FIG. 21 illustrates an MCAM system configured with a feature extraction process according to some embodiments. The present MCAM system can include a module configured to perform the present feature extraction process.

The MCAM system can include an array of multiple cameras 2110 to image a large sample 2120. The camera array can be controlled by a camera controller 2115. A camera can contain one or more lenses for focusing light, an aperture, and a radiation detector or sensor for detecting and capturing light. For example, the radiation detector can contain 1-20 million pixels that are 0.5 µm-5 µm in size. The lenses for focusing light can contain two to ten optical elements, and can be designed to offer a 0.1-0.9 magnification at a sample working distance of 3-200 mm. The coherent resolution of an example micro camera setup can be approximately 1-15 µm at the sample plane, which is standard for 0.5×-2× objective lenses.

The array of cameras can include multiple cameras placed adjacent to one another in a planar configuration, such as a rectangular, hexagonal, or other form of periodic grid across a flat plane. In some embodiments, the camera array can be curved. In the curve configuration, the cameras towards the edge of the array can be angled such that their lenses can capture more light from the sample (i.e., are pointed towards the center of the sample), to improve detection efficiency.

The MCAM system may achieve an image resolution of approximately 3-15 µm in a single snapshot. The FOV of the MCAM system grows linearly with the number of cameras included in the array. For example, if the FOV of one camera is 1.25×1.25 cm, then an approximately 10×10 cm FOV is possible with 8×8=64 micro-cameras, and a 20×20 cm FOV is possible with 16×16=256 micro-cameras. In some embodiments, the FOV of each camera in the array at least partially overlaps with one or more other cameras. With this overlap, it is possible to determine the height profile (i.e., distance along the optical axis) of a sample of interest using standard stereoscopic imaging methods.

Each camera in the MCAM system can acquire an image, e.g., image of a small area of the sample) for each illumination pattern. Thus, each camera can acquire multiple images when the illumination source changes the angle and/or spatial distribution of illuminating light at the sample plane between each captured image. In some embodiments, it is possible to improve the resolution of the final image reconstruction, e.g., image of the whole sample, beyond that is defined by the diffraction limit of its imaging lenses, by up to a factor of 5 or more in either dimension (e.g. from 5 µm to 1 µm or less) using a patterned illumination and post-processing strategy. In some embodiments, the MCAM system can improve the final image reconstruction beyond that defined by the diffraction limit of the imaging lenses and also measure the height profile of the sample at a multitude of spatial locations. In some embodiments, the MCAM system can improve the final image reconstruction beyond that defined by the diffraction limit of the imaging lenses and also measure the optical phase of the sample. In some embodiments, the MCAM microscope can also measure and remove the aberrations within the imaging lenses, and/or measure the spectral properties of a sample.

The MCAM system can also include a programmable illumination source 2130 and 2140, which can include one or two large arrays of light sources, such as light emitting diodes (LEDs), which can be individually controlled. The illumination source can be placed in single geometry configuration of below 2130 or above 2140 the sample plane, or in dual geometry configuration of below and above the sample plane 2120. The illumination light source can be controlled by an illumination controller 2125, which is configured to activate the light sources in the illumination source. The illumination controller can be configured to generate multiple illumination patterns, with one or more light sources activated in each illumination pattern. For example, a set of illumination patterns can include the patterns in which each light source is activated one at a time. If an illumination source contains k light sources, each light source is activated in sequence to generate k illumination patterns for the sample.

The dual illumination geometry, e.g., the illumination source is placed above and below the sample, will work best with samples that are both partially reflective and transparent, as in certain types of semiconductor wafer. Both single and dual illumination geometries can follow the same principles, operations, and processing steps to obtain images of the sample.

The illumination source can illuminate the sample with light from a multiple directions, wavelengths and spatial patterns. In some embodiments, the illumination source can include an array of LEDs positioned at different locations. For example, the illumination source can have the form of an LED array of 32×32 LEDs, having a center wavelength of 632 nm, arranged at 4 mm LED pitch, with 150 µm active area diameter. Other arrays of any number of LEDs can be used in any sort of circular, hexagonal, random or other geometric spatial arrangement, either on a flat or curved surface. The wavelength of the light emitted by the light sources can be in the range of 200 nm-2 µm. Wavelengths outside this range are also possible. Each light source may emit the same wavelength or a different wavelength of light.

In some embodiments, the illumination source can include one or more laser sources or laser diode sources, which can remain in a stationary position or can move positions between each captured image to provide different angular or spatial patterns light to the sample. The laser or laser diode sources can be sent through one or more optical fibers positioned at different locations or angles with respect to the sample to reach the sample at different angular or spatial arrangements. In some embodiments, the illumination source can include a spatial light modulator (SLM) of a liquid crystal or a liquid crystal on a silicon display for displaying an illumination pattern. By changing the patterned displayed on the SLM, the illumination pattern can be changed between captured images. In some embodiments, the illumination source can include a digital micromirror device, with the micromirror devices oriented at different angles to reflect light towards the sample for capturing images.

Light from the illumination source exits the sample from many spatial locations and direction to reach the camera array. Each camera can be positioned to image a distinct sample region and will record the image, e.g., the intensity of this optical field, on a digital detector array (e.g., a CMOS or CCD pixel array). In some embodiments, the cameras form sharp images. In some embodiments, the cameras do not necessarily form sharp images (e.g., the images can be blurred, the lenses system can be defocused or otherwise optically modified, e.g., as by a coded aperture). The area of the sample from which light has interacted with, and then enter into a camera, is seen as a field-of-view (FOV). The FOVs of nearby cameras can be overlapped, e.g., a same position on the sample can appear within the FOVs of two or more adjacent micro-cameras.

The illumination light source can be used to provide different illumination patterns to multiple images, e.g., each image under a different illumination pattern, which can allow the feature extraction process to find and utilize illumination-invariant features. For example, the images that are produced by the cameras in the camera array must be stitched together, and this stitching process can be improved when illumination-invariant features are extracted and used instead of features extracted from a single image under standard illumination. In addition, the feature extraction process can be used to help crop videos to specific regions-of-interest to reduce the amount of saved image data. Thus, the present feature extraction process using high-quality detection and extraction of illumination-invariant features presents a significant advantage in this type of computational microscope design.

Light from the illumination source can reach and interact with the sample, such as being absorbed, reflected, transmissive, or scattered from the sample. The light then can exit the sample carrying information about the sample to the micro-camera array, which can be configured in a periodic array such as a flat or a curved surface like a hemispherical shape.

The impact of illumination on a sample varies depending on the sample's qualities. For a translucent substrates illuminated in transmissive mode, small variations in illumination can change how the elements within the substrate appear to the camera detectors. The same is true with opaque (i.e., semi-reflective) substrates illuminated in a reflection geometry.

For opaque, non-scattering substrates, it is beneficial to place the individual illumination elements are placed above the sample. For these types of opaque substrates, the light not only impacts the substrate features, but also impacts the type of illumination artifacts. These illumination artifacts are unwanted and can trigger false positive pixel correspondence when an array of cameras is used. Due to the nonlinear relationship between the optical intensity that is detected, and the absorption and phase shifting-nature of the sample as it interacts with the partially coherent radiation provided by the variable illumination, an iterative process can be used to predict which illumination patterns result in highlighted features and/or unwanted artifacts. Accordingly, in some embodiments, the feature extraction process with pruning characteristics can detect illumination patterns that result in few detected keypoints, e.g., illumination specific patterns, or result in many detected keypoints, e.g., invariant with illumination changes. The process can provide an algorithm for the computer to find features within the plurality of detected images via a modified keypoint extraction algorithm and feature description step.

The camera controller 2115 can be configured to activate the cameras in the camera array to capture images from the sample. Typically, all cameras are activated at a same time for capturing overlapping images of the sample. The cameras can be activated for each illumination pattern generated by the illumination light source. For example, a light source in the illumination light source is activated to shine on the sample. The cameras are then activated to capture images of the sample for this illumination pattern. If the camera array has n cameras, there can be n images in the first illumination pattern. A second light source is then activated, followed by the activation of the cameras to capture other images of the sample for the second illumination pattern. There can be other n images in the second illumination pattern. The process can be continued until the last illumination pattern. If there are k illumination patterns, there can be n×k images of the samples.

The MCAM system can include a system controller 2160 to control or synchronize the illumination controller 2125 and the camera controller 2115. For example, the system controller can tell the illumination controller to provide the first illumination pattern. The system controller can then tell the cameras to take images of the sample. The process can continue until the last illumination pattern.

After each camera captures a digital image, the image data can then be passed to the camera controller, which can provide logic and local memory for each camera. The camera controller can then pass the image data to a system controller, which can contain a display, a processor, and a storage medium. The system controller can receive the images from the cameras for processing. The system controller can also control the illumination source, either directly or through the illumination controller.

The MCAM system can capture one or more images over time. Between each captured image, the system controller or the illumination controller can change the illumination pattern generated by the illumination source. After capturing the images, the system controller can perform an image post-processing step that can create a final high resolution, wide FOV MCAM image reconstruction.

The system controller can be configured to receive and store the images captured by the cameras. For example, the images received by the system controller can include n sets of images, with each set corresponded to a camera in an n camera array. Each set of images can include k images, with each image corresponded to an illumination pattern in a k illumination pattern generation. For example, the MCAM system can capture a first set of images $2170_{1,1-k}$, with image $2170_{1,j}$ corresponded to the first camera taken at a $j^{th}$ illumination pattern. A k-stack has k images, with each image captured from the same camera and viewpoint, but taken under a different illumination pattern, such as k stack $2170_{i,1-k}$ for camera i. There are n sets of images $2170_{1-n,1-k}$, with image $2170_{i,j}$ corresponded to the $i^{th}$ camera from then n cameras taken at a $j^{th}$ illumination pattern under k illumination patterns.

For example, multiple different illumination patterns can be provided by a programmable light-emitting diode (LED) array, with a different set of one or more LEDs activated to emit optical radiation to illuminate the sample for each captured image. This LED array can include LEDs that are at different positions above or below the sample, as well as LEDs that emit different frequencies (i.e., colors) of radiation. Other light sources can be used to generate the illumination patterns, such as individual lasers, laser diodes, spatial light modulators or other electronically controllable light emission elements.

The system controller 2160 can include a feature extraction module 2163, which can be configured to extract features from the images $2170_{1-n,1-k}$ captured by the camera array of the sample. As disclosed above, the feature extraction process can be applied to a set of k images, taken from a same camera using a same view point to a sample area, but under k different illumination patterns.

The feature extracting module 2163 can include a stitching operation, which can perform stitching the images taken by the camera array into a set of complete sample images, e.g., an image of the whole sample. For example, images $2170_{1-n,j}$ captured by the n cameras in the camera array for the illumination pattern j can be stitched together to form a complete image $2170_j$, which shows the image of the sample under the illumination pattern j. Thus, the stitching operation can generate a set of complete sample images.

The system controller 2160 can include a fusion engine 2161, which can be configured to process or fuse all the images captured at a same area from a same camera under different illumination patterns, such as fusing images in a set of images $2170_{i,1-k}$ into a single image $2170_i$. For example, a set of images taken by camera i can include images $2170_{i,1-k}$, which can contain information of a sample area taken be camera i under k illumination patterns. The set of images thus can contain information of the sample area, including intensity and phase data of the light captured by the camera i. By fusing the images together, a higher resolution image can be created.

After the fusing operation, the n sets of images taken by the n cameras under k illumination patterns can form a set of fused images $2171_{1-n}$, with image $2171_i$ corresponded to the fused image related to camera i.

In some embodiments, a complete sample image can be partitioned into patches, which are small areas of the complete sample image. The patches can be small enough to permit approximation calculation of the light paths, which can allow a reconstruction of fused images for different light paths. For example, a complete sample image can be partitioned in to p patches. A patch in a complete sample image can have corresponding patches, such as in other complete sample images in the set of complete sample images, or in overlapped images captured by another camera. For example, a patch can be a portion of an area of the sample that is overlaply captured by 2 cameras. In this case, there are two patches representing the area portion, with one patch in an image captured by a camera, and another patch in another image captured by another camera. Thus, there are a total of 2k patches representing a same area portion, captured by 2 cameras under k illumination patterns. The 2k patches can be fused together to form a fused patch.

After the fusing operation, the sets of p patches can form a set of fused patches $2172_{1-p}$, with fused patch 2171, corresponded to patch i partitioned from a complete sample image.

The system controller 2160 can include an assembling engine 2162, which can be configured to process or assemble, such as tiling, all the images in a set of fused patches $2171_{i-p}$ into a single image 2173. For example, a set of fused patches can be assembled using the partitioning information when partitioning the complete sample image into patches.

Figure 22:
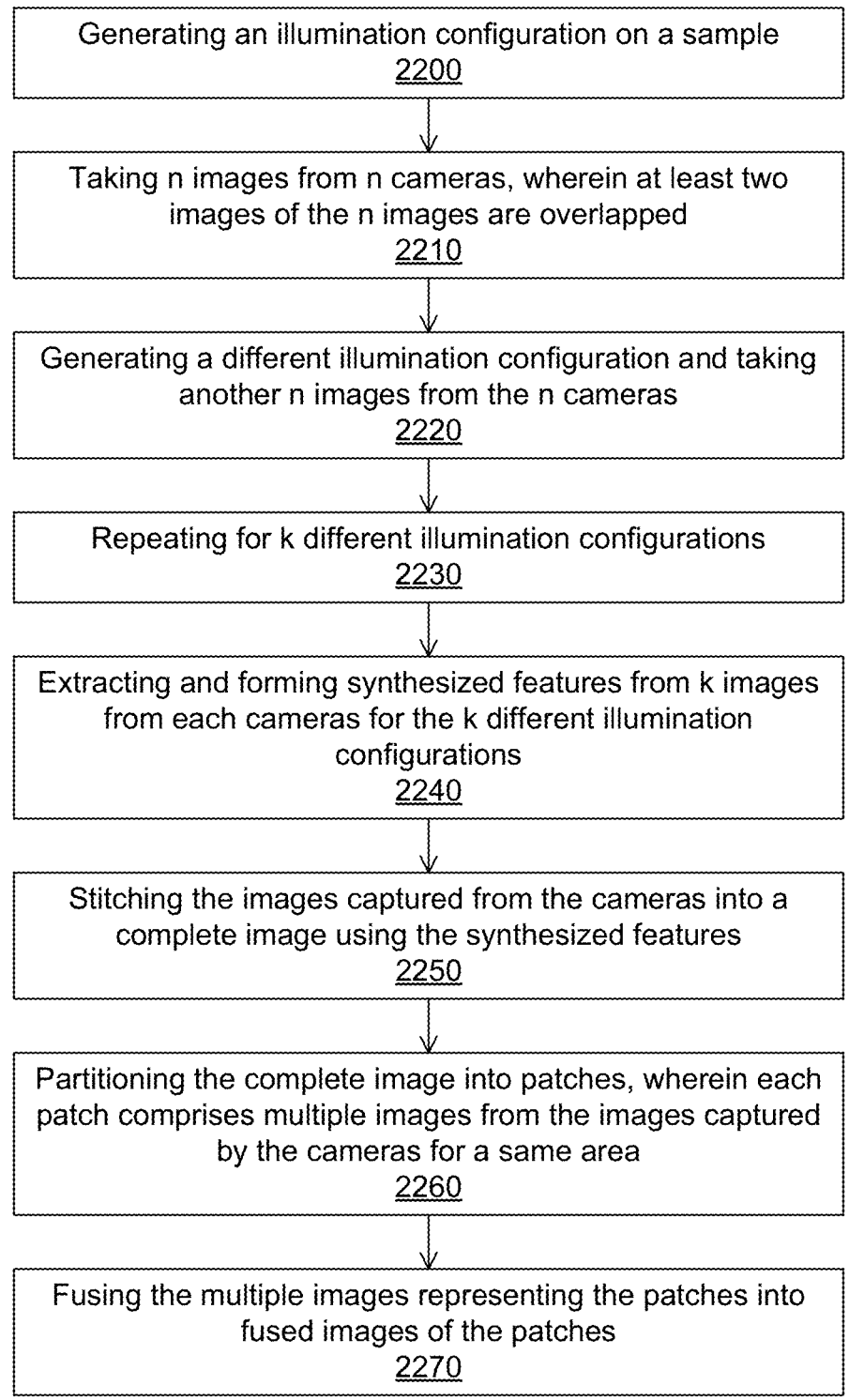
FIG. 22 illustrates a flow chart for the operation of a MCAM microscope with feature extraction according to some embodiments.

FIG. 22 illustrates a flow chart for the operation of a MCAM microscope with feature extraction according to some embodiments. The MCAM system can include a camera array and an illumination source, which are controlled by one or more controllers, such as a camera controller, an illumination controller, and a system controller.

Operation 2200 generates an illumination configuration or pattern on a sample. The illumination pattern can include one or more light sources from the illumination source. The illumination pattern can reach and interact with the sample, such as being partially or totally absorbed by the sample, being transmissive or reflective by the sample, depending on the location of the light sources, being scattered by the sample, or a combination of two or more interaction, such as partially absorbed and partially transmissive.

Operation 2210 captures images from the cameras, for example, n images can be taken for a camera array having n cameras. The images can be overlapped, meaning adjacent cameras can capture a same image area. The cameras can be positioned so that the camera array covers the whole sample, e.g., every areas of the sample are captured by one or more cameras.

Operation 2220 generates a different illumination pattern and taking n more images from the n cameras. Operation 2230 repeats generating illumination patterns and taking images for k different illumination patterns. Each illumination pattern can be different and the set of illumination patterns can be configured to provide complete information of the sample to be captured by the cameras. After k illumination patterns, there can be n sets of images, with each set of images captured by a same camera and having k images representing k illumination patterns.

The MCAM system can capture multiple sets of images of the sample by the camera array under the multiple illumination patterns. Each set of images includes images of a different area of the sample captured by a different camera of the camera array, with an area having the images captured by a camera partially overlapped with one or more areas having the images captured by other cameras. Further, each image in the set of images is captured under a different illumination pattern.

Operation 2240 extracts and describes features to form synthesized feature descriptors from the sets of images captured by each cameras under the different illumination patterns. A feature can be described by a synthesized descriptor, with the synthesized descriptor synthesized from descriptors of keypoints in each set of images.

The feature extraction process can include a keypoint detection process, a keypoint pruning process, a feature descriptor process for the keypoints, an optional feature descriptor pruning process, and a synthesizing feature descriptor process, as disclosed above.

For example, extracting features from multiple sets of images can include detecting keypoints in each image of the multiple sets of images, followed by forming sets of keypoints by grouping the keypoints based on locations of the keypoints in the images, and then followed by pruning the sets of keypoints based on the number of keypoints in the sets of keypoints. The keypoint pruning process can include removing sets of keypoints having keypoints detected under specific illumination patterns, or by removing sets of keypoints having keypoints detected in the set of images for less than a number of images, wherein the number of images is less than a threshold value.

Describing features from the multiple sets of images can include forming sets of descriptors from pruned sets of keypoints, with the keypoints detected in the multiple images, followed by synthesizing the sets of descriptors to form a synthesized descriptor for the each set of descriptors, with the synthesized descriptors configured to characterize the features. The descriptors can be optionally pruned based on a distance metric, such as by removing descriptors in a set of descriptors having the distance metric larger than a first threshold value. The sets of descriptors can be optionally pruned based on the number of descriptors in the sets of descriptors, such as removing sets of descriptors having a number of descriptors less than a second threshold value.

The synthesizing process can include averaging the descriptors in the set of descriptors, with or without considerations for constraints or limitations of the feature descriptors, such as subjected to constraints or limitations of the feature descriptors. The synthesizing process can include concatenating the feature descriptors in the set of feature descriptors.

Operation 2250 stitches the images captured from the cameras into a set of sample images using the synthesized descriptors of the extracted features. A sample image is an image representing an area of interest on the sample. In some embodiments, the sample image can be considered as the image of the whole sample, since the whole sample is typically imaged. In some embodiments, only an area of interest on the sample is imaged.

The sample image is typically large, e.g., larger than an image captured by a camera of the camera array. Further, the sample image is configured, e.g., positioned in the microscope, in such as way so that the images captured by the camera array cover the area of interest on the sample, e.g., stitching the images captured by the camera array can allow the formation of sample image.

Further, each illumination pattern can produce a sample image, for example, by stitching the images captured by the cameras of the camera array. Thus, by stitching n×k images captured by n cameras in the camera array under k illumination patterns, a set of k sample images can be generated, with each sample image formed by stitching images captured by n cameras under one illumination pattern.

The feature descriptors in each image can be matched against feature descriptors in other images, and the images can be transformed to allow the overlapping of the matched descriptors to form the complete image. After the stitching process, the complete image can be a set of complete image members, e.g., having one complete image member for each illumination pattern.

A first step in the stitching process can include matching the identified synthesized descriptors in each set of images of the multiple sets of images. The synthesized descriptors have been extracted and described for the features on the sets of images. The matching of synthesized descriptors can allow the alignment of the sets of images to form a set of sample images. After matching the synthesized descriptors, the sets of images can be aligned to form a set of sample images.

Since a synthesized descriptor represents a feature for a set of images, the identification and matching of synthesized descriptors can be performed on sets of images, instead of on individual images. Thus, two images can be stitched together, even though there are no matched features on the two images. The two images can be stitched together based on the matching of the synthesized descriptors, which can perform the alignment for all images in the sets of images.

Operation 2260 partitions the set of complete images into patches. The partition process can partition a sample image into multiple patches. Thus, the partition process can partition the set of sample images into multiple sets of patches, with each patch in a set of patches being the same partitioned area in each sample image of the set of sample images. The patch partition can be selected to simplify the reconstruction of fused images from the sets of patches.

Each set of patches can include multiple patches, with a patch being the area portion on a sample image of the set of sample images. A patch can be a portion of a sample image, which can be smaller than the image captured by a camera. Thus, an image captured by a camera can include one or more patches. A patch can be at an overlapped area between multiple cameras, and thus there can be multiple patches representing an area on the sample image that is captured by multiple cameras. For example, if the patch is at the overlapped area of 2 cameras, there are two patches in a sample images stitched together from all cameras for a particular illumination pattern. For k illumination patterns, a set of patches can include 2k patches, for areas of the sample overlapped by two cameras.

In some embodiments, the patch partition process can result in patches without overlapped areas. Without any overlapped areas between patches, a complete image can simply be cut into multiple patches, with one patch borders other patches. Without overlapped areas, the patches can be re-assembled into the complete image by joining adjacent patches together, so that a border of one patch touches a border of the adjacent patch.

In some embodiments, the patch partition process can result in patches with overlapped areas. With overlapped areas between patches, a patch can overlap with one or more neighbor patches. With overlapped areas between patches, the total area of all patches is larger than the area of the complete image. With overlapped areas between patches, a patch can be similar to an image area captured by a camera. Two adjacent cameras can capture two images of two overlapped areas.

With overlapped areas, the patches can be re-assembled into the complete image by joining the overlapped areas. In some embodiments, a stitching process can be used to join the overlapped patches. A feature matching can be used for the stitching process, with the feature determined from the feature descriptors, or from the synthesized feature descriptors described above.

Operation 2270 fuses the multiple patches in each set of patches into fused patches. For example, the patches in a set of patches can be fused together to form a fused image of the patch. The fusing process thus can produce a high resolution image for the patches.

Each set of k images from each camera can be fused, e.g., processed to combine into one image. Since each image of the set contains different information about the image area, such as the transmissive or reflective light data and the scattered light data from different light angles, images in the set can be processed to combine this information to a fused image carrying both intensity and phase information.

In the fusing process, a complex function S, e.g., having intensity and phase information, representing the sample area, can be determined from the set of k images. When an image of the sample area is captured by a camera, only the intensity is captured, e.g., the phase information is lost to the camera, and a 2D image is formed to represent the 3D sample. By taking a set of images with different illumination patterns representing lights having different phases reaching the camera, the phase information can be reconstructed to generate a 3D image of the sample.

For example, the sample area represented by the set of k images can be described as a complex function S. The MCAM system can capture k images of the sample area, meaning the complex function S is transformed into a set of k images M through a system matrix T that describes the MCAM image formation process, which can determined from the geometry of the MCAM setup, including the light paths from the light sources to the camera.

$$M = \|T \cdot S\|^2 + n$$

The set of k images M is the result of the transformation of the system matrix M with the sample function S. Here, the absolute square term is due to the ability to detect only intensity by the camera, and n is an additive Gaussian noise.

The sample function S can be calculated from the above function by solving the inverse problem. A possible approach for the inverse problem is to minimize the mean-squared error between the measured magnitudes and an estimate of the sample function. Another possible approach is to minimize a related negative log-likelihood function, which is based on a Poisson noise prior. Another possible approach is to treat the problem as a cost function, using appropriate minimization algorithms, such as Douglas-Rachford algorithm.

In some embodiments, an approach for the inverse problem is to solve the minimization problem by constructing an Augmented Lagrangian and then minimizing the Augmented Lagrangian with gradient descent. In some embodiments, the inverse problem can be solved using an iterative optimization strategy that first determines the gradients, or the gradients and the Hessians, and then applying a Gauss-Newton method. In some embodiments, the sample may be fluorescent and function S can be a real, positive-valued function, and a minimization method similar to those used in structured illumination fluorescent microscopes to determine a high-resolution sample can be used. The image reconstructions process can also include an estimate of the sample height, the sample phase, and its spectral color content.

The fused patches can then be assembled to produce a final, large, high-resolution image reconstruction of the sample. The final image can include a measurement of depth at different spatial locations across the image. The final image can include a measurement of the optical phase at different spatial locations across the image. The final image can include a measurement of multi-spectral content at different spatial locations across the image.

What is claimed is:

1. A method comprising
capturing a set of images of an area of a substrate by a camera array under multiple illumination patterns,
wherein the set of images comprises images of the area captured by a camera of the camera array,
wherein each image of the set of images is captured under a different illumination pattern of the multiple illumination patterns;
detecting keypoints in the images of the set of images,
wherein the keypoints comprises points or areas in the images;
forming sets of keypoints by grouping the keypoints according to locations in the images;
pruning the sets of keypoints;
forming sets of descriptors for the keypoints in the pruned sets of keypoints,
wherein a descriptor in a set of descriptors is formed for each keypoint in a pruned set of keypoints;
synthesizing the descriptors in each set of descriptors to form a synthesized descriptor for each set of descriptors.

2. A method as in claim 1,
wherein pruning the set of keypoints comprises removing sets of keypoints having keypoints detected in a number of images of the set of images, wherein the number of images is less than a threshold value.

3. A method as in claim 1, further comprising
pruning the sets of descriptors by removing descriptors in a set of descriptors having a distance metric larger than a first threshold value, followed by removing sets of descriptors having a number of descriptors less than a second threshold value.

4. A method as in claim 1,
wherein synthesizing the descriptors in a set of descriptors comprises averaging the descriptors in the set of descriptors, with or without considerations for constraints or limitations of the descriptors.

5. A method as in claim 1,
wherein synthesizing the descriptors in a set of descriptors comprises concatenating the descriptors in the set of descriptors.

6. A method for operating a computational microscope, the method comprising
capturing multiple sets of images of a sample by a camera array of the computational microscope under multiple illumination patterns provided by the computational microscope,
   wherein each set of the multiple sets of images comprises images of a different area of the sample captured by a different camera of the camera array of the computational microscope,
   wherein an area of the different areas having the images captured by a camera of the different cameras is partially overlapped with one or more areas of the different areas having the images captured by other cameras of the different cameras,
   wherein each image of the each set of images is captured under a different illumination pattern of the multiple illumination patterns;
extracting and describing features from the multiple sets of images,
   wherein a feature of the features is described by a synthesized descriptor,
   wherein the synthesized descriptor is synthesized from descriptors of keypoints in each set of images,
wherein extracting features from the multiple sets of images comprises
   detecting keypoints in each image of the multiple sets of images;
   forming sets of keypoints by grouping the keypoints based on locations of the keypoints in the images;
   pruning the sets of keypoints based on the number of keypoints in the sets of keypoints.

7. A method as in claim 6,
wherein pruning the set of keypoints comprises removing sets of keypoints having keypoints detected under specific illumination patterns of the multiple illumination patterns.

8. A method as in claim 6,
wherein pruning the set of keypoints comprises removing sets of keypoints having keypoints detected in the set of images for less than a number of images, wherein the number of images is less than a threshold value.

9. A method as in claim 6,
wherein describing features from the multiple sets of images comprises
   forming sets of descriptors from pruned sets of keypoints,
      wherein the keypoints are detected in the multiple images,
   synthesizing the sets of descriptors to form a synthesized descriptor for the each set of descriptors,
      wherein the synthesized descriptors are configured to characterize the features.

10. A method as in claim 9, further comprising
pruning the descriptors in each set of descriptors based on a distance metric after forming the sets of descriptors;
pruning the sets of pruned descriptors based on the number of descriptors in the sets of descriptors before synthesizing the sets of descriptors.

11. A method as in claim 10,
wherein pruning the descriptors in each set of descriptors based on a distance metric comprises removing descriptors in a set of descriptors having the distance metric larger than a first threshold value,
wherein pruning the sets of pruned descriptors based on the number of descriptors in the sets of descriptors comprises removing sets of descriptors having a number of descriptors less than a second threshold value.

12. A method as in claim 6,
wherein synthesizing the descriptors in a set of descriptors comprises one of averaging the descriptors in the set of descriptors, with or without considerations for constraints or limitations of the descriptors, or concatenate the descriptors in the set of descriptors.

13. A method as in claim 6, further comprising
stitching the multiple sets of images into a set of sample images using the synthesized descriptors of the extracted features,
   wherein a sample image comprises an image representing an area of interest on the sample;
fusing patches in the set of sample images into fused patches,
   wherein a patch comprises a portion of a sample image,
   wherein a fused patch forms a portion of an image reconstruction of the sample;
assembling the fused patches into a final image.

14. A method as in claim 13, further comprising
forming sets of patches after stitching a set of sample images,
   wherein a patch comprises a portion of a sample image,
   wherein a set of patches comprises patched taken from a same sample image portion;
fusing the patches in each set of patches to form a set of fused patches,
   wherein a fused patch forms the portion of an image reconstruction of the sample.

15. A method as in claim 13,
wherein stitching the multiple sets of images into a set of sample images using the synthesized descriptors of the extracted features comprises
   matching the synthesized descriptors in each set of the images of the multiple sets of images;
   aligning the sets of images of the multiple sets of images based on the matched synthesized descriptors.

16. A computational microscope comprising
a camera array comprising multiple cameras,
   wherein a different camera of the multiple cameras is configured to capture images of a different area of a sample,
   wherein an area of the different areas having the images captured by a camera of the different cameras is partially overlapped with one or more areas of the different areas having the images captured by other cameras of the different cameras;
an illumination source,
   wherein the illumination source comprises multiple light sources, wherein the multiple light sources are disposed above, below, or both above and below the sample;

a controller,
- wherein the controller is configured to control the multiple light sources to generate multiple illumination patterns,
- wherein the controller is configured to control the camera array to capture images of areas of the sample under each illumination pattern of the multiple illumination patterns, wherein the controller is configured to extract and describe features from images of sample areas captured the camera array under the multiple illumination patterns,
- wherein a feature of the features is described by a synthesized descriptor,
- wherein the synthesized descriptor is synthesized from descriptors of keypoints in each set of images, wherein extracting features from the multiple sets of images comprises
- detecting keypoints in each images of the multiple sets of images,
- forming sets of keypoints by grouping the keypoints based on locations of the keypoints in the images,
- pruning the sets of keypoints based on the number of keypoints in the sets of keypoints.

17. A computational microscope as in claim 16, further comprising
- pruning the descriptors in each set of descriptors based on a distance metric after forming the sets of descriptors;
- pruning the sets of pruned descriptors based on the number of descriptors in the sets of descriptors before synthesizing the sets of descriptors.

18. A computational microscope as in claim 16,
wherein the controller is configured to stitch the multiple sets of images into a set of sample images using the synthesized descriptors of the extracted features,
- wherein a sample image comprises an image representing an area of interest on the sample;

wherein the controller is configured to fuse patches in the set of sample images into fused patches,
- wherein a patch comprises a portion of a sample image,
- wherein a fused patch forms a portion of an image reconstruction of the sample;

wherein the controller is configured to assemble the fused patches into a final image.

19. A computational microscope as in claim 16,
wherein describing features from the multiple sets of images comprises
- forming sets of descriptors from pruned sets of keypoints,
  - wherein the keypoints are detected in the multiple images,
- synthesizing the sets of descriptors to form a synthesized descriptor for the each set of descriptors,
- wherein the synthesized descriptors are configured to characterize the features.

20. A computational microscope as in claim 16,
wherein synthesizing the descriptors in a set of descriptors comprises one of averaging the descriptors in the set of descriptors, with or without considerations for constraints or limitations of the descriptors, or concatenate the descriptors in the set of descriptors.

* * * * *